(12) United States Patent
Hebbalamath et al.

(10) Patent No.: US 12,388,663 B2
(45) Date of Patent: Aug. 12, 2025

(54) PROVIDING AND INSTALLING DIGITAL CERTIFICATES

(71) Applicant: Siemens Healthcare GmbH, Erlangen (DE)

(72) Inventors: Sangamesh Hebbalamath, Erlangen (DE); Ivan Murphy, Baiersdorf (DE); Michael Rommel, Erlangen (DE); Martin Siegmung, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 11 days.

(21) Appl. No.: 18/188,646

(22) Filed: Mar. 23, 2023

(65) Prior Publication Data

US 2023/0308297 A1 Sep. 28, 2023

(30) Foreign Application Priority Data

Mar. 25, 2022 (EP) .................................. 22164403

(51) Int. Cl.
*H04L 9/00* (2022.01)
*H04L 9/32* (2006.01)

(52) U.S. Cl.
CPC .......... *H04L 9/3268* (2013.01); *H04L 9/3236* (2013.01)

(58) Field of Classification Search
CPC .. H04L 9/3268; H04L 9/3236; H04L 2209/88
See application file for complete search history.

(56) References Cited

U.S. PATENT DOCUMENTS

| | | | | |
|---|---|---|---|---|
| 11,134,058 | B1 * | 9/2021 | Sole | H04L 63/10 |
| 11,563,590 | B1 * | 1/2023 | Bowen | H04L 9/3247 |
| 2018/0234257 | A1 * | 8/2018 | Kommireddy | H04L 9/321 |
| 2021/0152545 | A1 * | 5/2021 | Park | H04L 9/3268 |
| 2021/0288821 | A1 * | 9/2021 | Young | H04L 9/3265 |
| 2022/0182246 | A1 | 6/2022 | Murphy et al. | |

(Continued)

FOREIGN PATENT DOCUMENTS

| | | | | |
|---|---|---|---|---|
| CN | 111147259 A | * | 5/2020 | H04L 63/0823 |
| EP | 4009602 A1 | | 6/2022 | |

OTHER PUBLICATIONS

Standard RFC 2986: "PKCS #10: Certification Request Syntax Specification", https://tools.ietf.org/html/rfc2986.

(Continued)

*Primary Examiner* — Kevin Ayala
(74) *Attorney, Agent, or Firm* — Harness, Dickey & Pierce, P.L.C.

(57) ABSTRACT

A method for providing a digital certificate to a device, comprises: receiving a device identification dataset, uniquely identifying the device; determining a key creation dataset including a certificate identifier, the certificate identifier being based on the device identification dataset; sending the key creation dataset to the device; receiving a certificate creation request related to a first domain name based on the key creation dataset from the device, the first domain name including the certificate identifier; sending the certificate creation request or a modified certificate creation request to a certificate authority; and providing the digital certificate to the device, the digital certificate being a wildcard certificate based on the first domain name signed by the certificate authority.

22 Claims, 21 Drawing Sheets

(56) References Cited

U.S. PATENT DOCUMENTS

2023/0115859 A1* 4/2023 Su .................. H04L 63/0485
                                                    713/151
2023/0128572 A1* 4/2023 Khatri ............... G06Q 30/018
                                                    705/28

OTHER PUBLICATIONS

Standard RFC 1035 "Domain Names—Specification and Implementation", https://tools.ietf.org/html/rfc1035.
Standard RFC 8555 "Automatic Certificate Management Environment", https://tools.ietf.org/html/rfc8555).
Signed Public Key and Challenge.
Standard RFC 7030: "The Enrollment over Secure Transport", ISSN: 2070-1721 https://datatracker.ietf.org/doc/html/rfc7030.
Extended European Search Report for European Application No. 22164403.2 mailed Sep. 15, 2022.
European Office Action for European Application No. 22164403.2 mailed Feb. 9, 2023.
European Office Action for European Application No. 22164403.2 mailed Mar. 24, 2023.
European Office Action for European Application No. 22164403.2 mailed Sep. 13, 2023.
European Communication under Rule 71(3) for European Application No. 22164403.2 mailed Mar. 13, 2024.

* cited by examiner

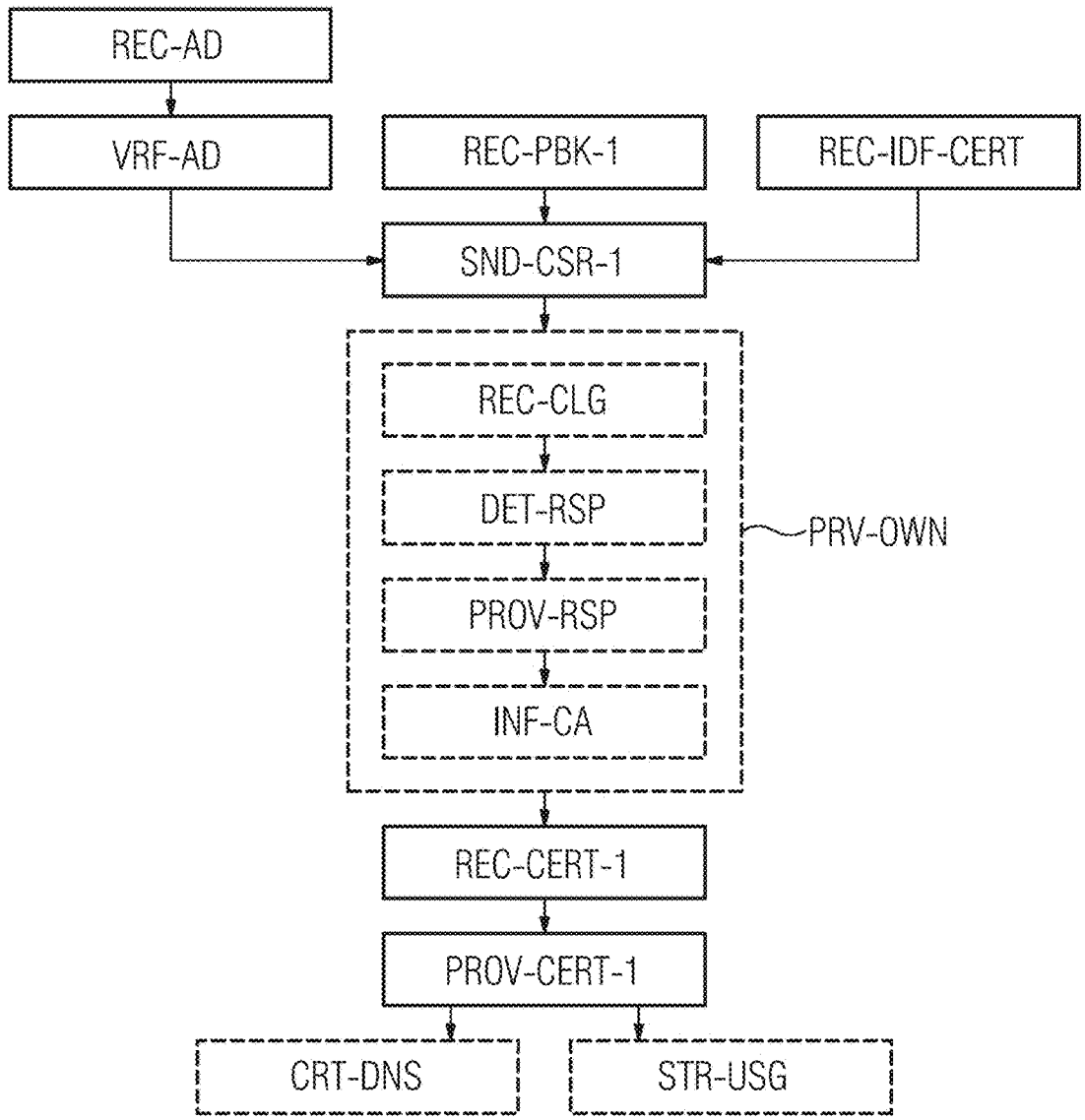
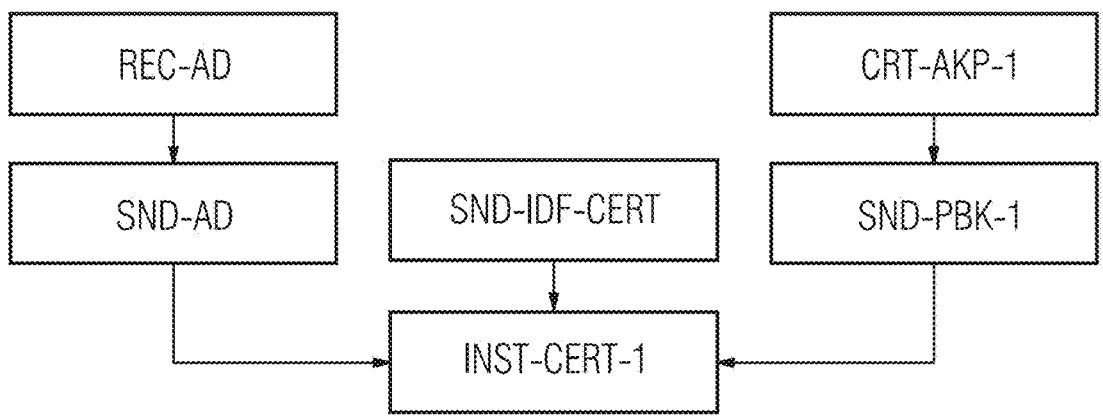

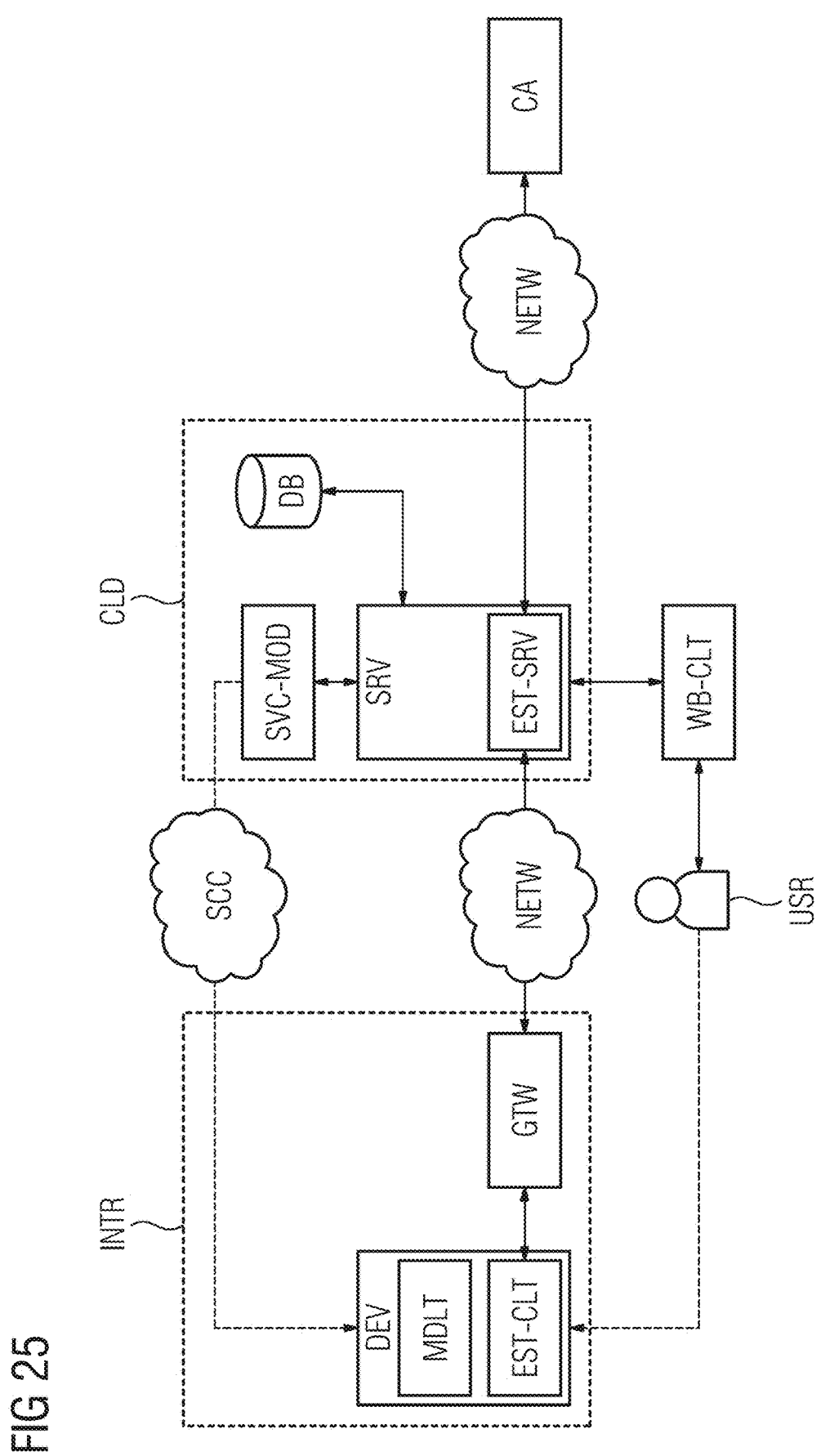

PROVIDING AND INSTALLING DIGITAL CERTIFICATES

CROSS-REFERENCE TO RELATED APPLICATION(S)

The present application claims priority under 35 U.S.C. § 119 to European Patent Application No. 22164403.2, filed Mar. 25, 2022, the entire contents of which are incorporated herein by reference.

BACKGROUND

Security of information technology (acronym IT) devices or systems is often based on digital certificates (or "trust anchors") usable for secure communication between different devices, e.g. based on the HTTPS protocol (acronym for "Hypertext Transfer Protocol Secure") or the FTPS protocol (acronym for "File Transfer Protocol Secure"). In particular, digital certificates can be used for client-server communication.

Security of IT systems is very important for medical technology, both because medical relevant systems need to be protected from malicious attacks (to ensure that patients are not harmed based on compromised data or compromised hardware), and because patient data is personal data and should not be exposed to the public due to data privacy concerns.

There are several existing solutions for creating and distribution digital certificates within a local IT infrastructure, in particular, within a hospital IT infrastructure.

For example, it is possible to use self-signed certificates (either signed by the manufacturer of the respective device, or internally within the local IT infrastructure) for every device in a local IT infrastructure to enable secured communication between the local devices. However, self-signed certificates are not trusted by modern internet browsers and results in either the communication being blocked by the browser or a at least a security warning being shown to the end user.

Alternatively, within the local IT infrastructure an Internal Trust Authority can be used, e.g. in the form of a dedicated server. However, setting up such an Internal Trust Authority is complicated and might also be cost-intensive.

SUMMARY

For many local IT infrastructures, it would be desirable to have a service provider for providing a certificate infrastructure (in the sense of "secure communication as a service", or "digital certificates as a service"). The digital certificates provided may be based on a domain controlled by the service provider (e.g., "abc.service-provider.com"), however, requests directed to those domains (e.g., HTTPS requests) could not be resolved to a local IP address within the local IT infrastructure. In the alternative, the digital certificates provided may be based on a domain controlled by the local IT infrastructure (e.g., "abc.hospital-xyz.com"), however, the service provider is not able to request a certificate based on such a domain, because he cannot prove the ownership, e.g., based on the ACME protocol.

Furthermore, it would be desirable if this service can be initiated and controlled by a user or administrator from the local IT infrastructure as a self-service, and to minimize the amount of work that is to be performed at the service provider.

At least one object of one or more embodiments of the present invention is to enable the creation and provisioning of digital certificates for devices inside a local IT infrastructure by a server outside of the local IT infrastructure. In particular, the local IT infrastructure corresponds to the IT infrastructure of a healthcare provider, e.g. a hospital.

At least this object is achieved by features of the independent claims, one or more dependent claims and/or embodiments of the presentation described herein.

In the following, a solution according to embodiments of the present invention is described with respect to the claimed systems as well as with respect to the claimed methods. Features, advantages or alternative embodiments herein can be assigned to the other corresponding claimed objects and vice versa. In other words, the systems can be improved with features described or claimed in the context of the corresponding method. In this case, the functional features of the methods are embodied by objective units of the systems.

Furthermore, in the following, a solution according to embodiments of the present invention is described with respect to different methods and systems (devices and servers) for providing and installing digital certificates. Features, advantages or alternative embodiments herein can be assigned to the other corresponding methods and systems and vice versa. In other words, a first methods and/or a first systems for providing or installing a digital certificate can be improved with features described or claimed in the context of a second method and/or a second system for providing or installing a digital certificate.

In the following, the term "in particular" is used to indicate an optional and/or advantageous additional feature. Furthermore, the terms "sending", "providing" or "transmitting" at least one object to an entity can mean directly sending, directly providing or directly transmitting the at least one object to the receiving entity, or sending, providing or transmitting the at least one object using at least one intermediate entity forwarding and/or processing the objects. Furthermore, the term "receiving" at least one object from an entity can mean directly receiving the at least one object from the entity, or receiving the at least one object using at least one intermediate entity forwarding and/or processing the objects.

In one aspect, an embodiment of the present invention relates to a computer-implemented method for providing a digital certificate to a device. The method comprises receiving a device identification dataset, the device identification dataset uniquely identifying the device. The method furthermore comprises determining a key creation dataset comprising a certificate identifier, the certificate identifier being based on the device identification dataset. The method furthermore comprises sending the key creation dataset to the device. The method furthermore comprises receiving a certificate creation request related to a first domain name based on the key creation dataset from the device, wherein the first domain name comprises the certificate identifier. The method furthermore comprises sending the certificate creation request or a modified certificate creation request to a certificate authority. The method furthermore comprises providing the digital certificate to the device, wherein the digital certificate is a wildcard certificate based on the first domain name signed by the certificate authority.

In particular, the method for providing a digital certificate to a device is executed by a server. In particular, the step of receiving the device identification dataset is executed by an interface, in particular, by an interface of the server. In particular, the step of determining the key creation dataset is executed by a computation unit, in particular, by a computation unit of the server. In particular, the step of sending the key creation dataset to the device is executed by the interface, in particular, by the interface of the server. In particular, the step of receiving the certificate creation request is executed by the interface, in particular, by the interface of the server. In particular, the step of sending the certificate creation request is executed by the interface, in particular, by the interface of the server. In particular, the step of providing the digital certificate is executed by the interface, in particular, by the interface of the server.

In particular, a device identification dataset is a set of information identifying the device to which the digital certificate shall be provided by the method. The device identification dataset can comprise information directly related to the device, and information related to the environment of the device, e.g., the medical institution where the device is located. In particular, the device identification dataset can be stored in a database, or can be manually entered by a user of a system, or can be stored directly within the device.

In particular, a digital certificate is an electronic document that can be used to prove the ownership of a public key. The terms "public key certificate" and "identity certificate" can be used as synonyms for the term "digital certificate". In particular, a digital certificate comprises the public key and/or information about the public key, the subject of the digital certificate, and a digital signature of the issuer. In particular, the subject of the digital certificate can be the owner of the digital certificate and/or information related to the owner of the digital certificate. In particular, the issuer is an entity that has verified the certificate's contents. In particular, the issuer can be a certificate authority.

In particular, the digital certificate can be an X.509 certificate. The digital certificate being a X.509 certificate means that the digital certificate conforms to the X.509 standard.

In particular, the digital certificate can be a TLS (acronym for "Transport Layer Security") or an SSL (acronym for "Secure Sockets Layer") server certificate. In particular, the subject of a TLS or SSL server certificate is a hostname and/or a domain name. In the following, the term "server certificate" can be used as synonym for the term "TLS or SSL server certificate".

In particular, a wildcard digital certificate is a server certificate with an asterisk within the hostname and/or the domain name. In particular, the asterisk can be replaced with any other valid string. For example, a wildcard digital certificate with the subject "*.example.com" is also valid for "abc.example.com" and "def.example.com".

In particular, a certificate identifier is a string that can be used to identify a certain certificate or a group of certain certificates. In particular, a certificate identifier can be a unique certificate identifier, so that for one unique certificate identifiers there is not more than one (non-withdrawn) certificate identified by the unique certificate identifier. In particular, the certificate identifier can be a hash value. In particular, the certificate identifier can be the hash of the device identification dataset. Alternatively, the certificate identifier can be based on public available information of the subject of the certificate (e.g., based on a material number and/or a serial number of a device authorized by said certificate). Certificates can be withdrawn under certain circumstances, e.g. after a certain amount of time or if they are compromised by the respective private key becoming public. In these situations, a new certificate based on a new pair of public and private keys is created, e.g. based on the methods according to embodiments of the present invention.

Such a new certificate can be based on the same certificate identifier as the previous, withdrawn certificate. This has the advantage that domain names stored in other communicating devices do not need to be changed.

In particular, a key creation dataset comprises information necessary for the device to initiate the creation of a digital certificate. In particular, the key creation dataset can comprise a certificate identifier that will be used subsequently for identifying and verifying the certificate. Furthermore, the key creation dataset can comprise a pre-shared secret, which will at a later stage be transferred from the device back to the server and can be used to authenticate a request for creation of a certificate. Instead of transmitting the pre-shared secret with the key creation dataset, it is also possible that the pre-shared secret is stored within the device already at a production stage at the manufacturer. Furthermore, the key creation dataset can comprise a certificate request domain name, which corresponds to an URL (acronym for "Uniform Resource Locator"), to an URI (acronym for "Uniform Resource Identifier") and/or to an IP address (acronym for "Internet Protocol), in particular, an IPv4 or IPv6 address.

In particular, a certificate request domain or a certificate request domain name is a domain name that is to be used for requesting a digital certificate. In particular, the certificate request domain can be an URL related to a certificate authority and/or an URL related to an Enrollment over Secure Transport (an acronym is EST) server.

In particular, a certificate creation request comprises information necessary for the server to verify and forward the creation of a digital certificate, after the device initiated the creation of the digital certificate. In particular, the certificate creation request can comprise a public key corresponding to a private key stored within a device, so that said public key and said private key form an asymmetric key pair. Furthermore, the certificate creation request can comprise a pre-shared secret, which equals the pre-shared secret transferred to the device and can be used to authenticate a request for creation of a certificate. In particular, the certificate creation request can comprise a first domain name that comprises the certificate identifier. In particular, a modified certificate creation request can be identical to a certificate signing request as disclosed within this specification.

In particular, a domain name is an identification string that defines a realm of administrative autonomy, authority or control within the Internet. In particular, a domain name identifies a network domain or a resource on the internet (associated with an IP address), e.g. a server or a webservice.

In particular, a domain name comprises an ordered set of labels (the term "level" can be used as synonym for the term "label"), each of them separated by a special character (a dot "."). The right-most level is denoted as top-level and can be a country top-level (e.g. "de", "uk", "nl") or a generic top-level (e.g. "com", "org", "net").

A domain name can comprise an asterisk (the character "*"). Such a domain name can be denoted as wildcard domain name. A wildcard domain name is a representative for a larger set of domain names, wherein each domain name in the larger set of domain names replaces the asterisk character with a string or a label.

A fully qualified domain name (acronym "FQDN") is a domain name that is completely specified with all labels in the hierarchy of the domain name system, having no parts omitted. In particular, a fully qualified domain name can be resolved by a DNS-server (acronym for "domain name system"). In particular, a fully qualified domain name does not comprise a wildcard.

A fully qualified domain name is denoted to specify a certain domain name, if said domain name is a wildcard domain name and if said fully qualified domain name can be created from the domain name by replacing the asterisk with a string or a label. Vice versa, a wildcard domain name is denoted to represent a certain domain name, if said domain name is a fully qualified domain name specifying said wildcard domain name.

A certificate authority (or sometimes "certification authority") is an entity that issues digital certificates which certify the ownership of a public key by the named subject of the digital certificate. In particular, issuing a digital certificate is based on signing the certificate using a private key of the certificate authority. This allows others (relying parties) to rely upon signatures or on assertions made about the private key that corresponds to the certified public key. A certificate authority acts as a trusted third party-trusted both by the subject (owner) of the digital certificate and by the party relying upon the digital certificate.

The inventors recognized that using the described method digital certificates can be provided to devices in a self-service mode. In particular, by receiving the device identification information that can be inputted in different means the process of providing the digital certificates can be started from hospital staff and without interference of the owner of the service.

According to a further aspect of an embodiment of the present invention, the device identification dataset comprises at least one of a serial number of the device, a material number of the device, a vendor name of the device and/or a model name of the device.

In particular, a material number is an alphanumeric string that identifies all devices with the same properties, i.e., devices that are identical. In particular, a serial number is an alphanumeric string that distinguishes between all devices with the same properties, i.e., devices that are identical. In particular, a serial number can also be an alphanumeric string that distinguishes between all devices of a vendor. The vendor name of the device can be an alphanumeric string identifying the vendor or manufacturer of the device. A model name of the device can be an alphanumeric string identifying a certain group of material numbers having different material numbers (e.g., a model series).

The inventors recognized that using those elements as device identification dataset a device can be uniquely identified. Furthermore, because certain of these elements are redundant, security checks can be performed to ensure that the device identification dataset is in fact valid.

According to a further aspect of an embodiment of the present invention, the method furthermore comprises querying a database for information related to the device and receiving the serial number of the device, the material number of the device, the vendor name of the device and/or the model name of the device from the database. In particular, the steps of querying the database and receiving the serial number can be executed by the computation unit, in particular, by the computation unit of the providing system, or by the interface, in particular, by the interface of the providing system. The database can be external to the providing system or a component of the providing system. In particular, only the information that is contained in the device identification dataset can be received from the database.

The inventors recognized that by querying a database for the respective data elements do not need to be entered by a user, which decreases the possibilities of errors in manually entering those data elements.

According to a further aspect of an embodiment of the present invention, the device identification dataset comprises an institution identifier, wherein the institution identifier identifies an institution hosting the device, and wherein the institution identifier is determined based on the credentials of an active user.

In particular, the institution identifier can be an alphanumeric string. In particular, the credentials of the active user can correspond to the username of the active user. In particular, the active user is the user that is currently logged in for using the system. In particular, there can be a unique mapping from the credentials of a user to the institution identifier stored in a database, but there can be several user credentials for a single institution identifier (i.e., there is a 1:n relation between institution identifiers and user credentials).

The inventors recognized that by using an institution identifier within the device identification dataset a relation between the institution requesting a certificate and the device identification dataset can be established. In particular, based on the fact whether the institution is eligible for requesting a certificate, it can be determined whether the device identification dataset is valid.

In particular, the device identification dataset comprises the institution identifier. In particular, the device identification dataset comprises the model name of the device. In particular, the device identification dataset comprises the model name of the device and the institution identifier. In particular, the device identification dataset comprises the vendor name of the device. In particular, the device identification dataset comprises the vendor name of the device and the institution identifier. In particular, the device identification dataset comprises the vendor name of the device and the model name of the device. In particular, the device identification dataset comprises the vendor name of the device, the model name of the device and the institution identifier. In particular, the device identification dataset comprises the material number of the device. In particular, the device identification dataset comprises the material number of the device and the model name of the device. In particular, the device identification dataset comprises the material number of the device, the model name of the device and the institution identifier. In particular, the device identification dataset comprises the material number of the device and the vendor name of the device. In particular, the device identification dataset comprises the material number of the device, the vendor name of the device and the institution identifier. In particular, the device identification dataset comprises the material number of the device, the vendor name of the device and the model name of the device. In particular, the device identification dataset comprises the material number of the device, the vendor name of the device, the model name of the device and the institution identifier. In particular, the device identification dataset comprises the serial number of the device. In particular, the device identification dataset comprises the serial number of the device and the institution identifier. In particular, the device identification dataset comprises the serial number of the device and the model name of the device. In particular, the device identification dataset comprises the serial number of the device, the model name of the device and the institution identifier. In particular, the device identification dataset comprises the serial number of the device and the vendor name of the device. In particular, the device identification dataset comprises the serial number of the device, the vendor name of the device and the institution identifier. In particular, the device identification dataset comprises the serial number of the device, the vendor name of the device and the model name of the device. In particular, the device identification dataset comprises the serial number of the device, the vendor name of the device, the model name of the device and the institution identifier. In particular, the device identification dataset comprises the serial number of the device and the material number of the device. In particular, the device identification dataset comprises the serial number of the device, the material number of the device and the model name of the device. In particular, the device identification dataset comprises the serial number of the device, the material number of the device, the model name of the device and the institution identifier. In particular, the device identification dataset comprises the serial number of the device, the material number of the device and the vendor name of the device. In particular, the device identification dataset comprises the serial number of the device, the material number of the device, the vendor name of the device and the institution identifier. In particular, the device identification dataset comprises the serial number of the device, the material number of the device, the vendor name of the device and the model name of the device. In particular, the device identification dataset comprises the serial number of the device, the material number of the device, the vendor name of the device and the model name of the device, the institution identifier.

According to a further aspect of an embodiment of the present invention, the certificate identifier is a hash of the device identification dataset. The inventors recognized that using a hash function the certificate identifier can have the same length even for different sizes of device identification datasets. Furthermore, a hash function is a one-way function, so that based only on the hash it is not possible to extract again the device identification dataset, which increases the security and privacy of the method.

In particular, a hash value is the result of the application of a hash function on a dataset. In particular, the hash function can take additional arguments, for example a seed.

In general, a hash function is a function that maps data of arbitrary size to data of a fixed size. In particular, the hash function is a cryptographic hash function. In particular, a cryptographic hash function is a deterministic function; in particular the output of the hash function does only depend on the input of the hash function. In particular, a cryptographic hash function can be calculated in a fast manner for all input values. In particular, a cryptographic hash function is only brute-force invertible, i.e. given the output of a cryptographic hash function it is only possible to calculate the corresponding input of the cryptographic hash function by calculating the cryptographic hash function for an large amount of input values (i.e. a brute-force attack). In other words, finding the input value corresponding to the output value of a cryptographic hash function is an intractable problem. In particular, finding a first input value and a second input value of a cryptographic hash function that led to an identical output value is an intractable problem.

According to a further aspect of an embodiment of the present invention, the key creation dataset furthermore comprises a pre-shared secret and/or a certificate request domain name. In particular, said pre-shared secret can be based on at least one of a pre-shared one-time password, a pre-shared key and/or a pre-shared hardware token. In particular, the pre-shared secret can be installed on the device during manufacturing and/or during installation of the device.

In particular, shared secret is a piece of data, known only to the parties involved, in a secure communication, shared beforehand between the communicating parties. A pre-shared one-time password can be a string (also denoted as "passphrase"), a number or an array of numbers (in particular, an array of bits or bytes). The pre-shared one-time password can be directly distributed between the communication partners for authenticating one of the communication partners. Alternatively, the pre-shared one-time password can be used to determine other data to be exchanged between the communication partners (e.g. used as a basis for a hash value). A pre-shared one-time key can be a symmetric or asymmetric key usable for encrypting and/or decrypting the communication between communication partners.

In particular, a hardware token stores a secret information that can be used to prove identity. A hardware token can be a static password token, wherein the static password token contains a password which is physically hidden (not visible to the possessor of the static password token), but which is transmitted for each authentication. A hardware token can be a synchronous dynamic password token, wherein within the synchronous dynamic password token timer is used to rotate through various combinations produced by a cryptographic algorithm. A hardware token can be an asynchronous password token, wherein within the asynchronous password token a one-time password is generated without the use of a clock, either from a one-time pad or cryptographic algorithm. A hardware token can be a challenge response token, wherein the server encrypts a challenge (typically a random number, or at least data with some random parts) with a public key, and the device connected with the challenge response token and/or the challenge response token itself proves it possesses a copy of the matching private key by providing the decrypted challenge.

The inventors recognized that based on a pre-shared secret a secure communication can be established, resulting in the fact that only an eligible device can receive a first digital certificate. In particular, interference by a third party into this process can be detected and prevented. In particular, by using a pre-shared hardware token, the pre-shared secret can not even be extracted by the physical owner of the device, so that also non-compliant behavior of the owner can be prevented. Furthermore, by using a certificate request domain in the key creation dataset necessary data for requesting the certificate can be transmitted, so that there needs to be no (publicly) available registry of certificate authorities or EST servers.

According to a further aspect of an embodiment of the present invention, the certificate creation request is an Enrollment over Secure Transport (an acronym is EST) request.

The Enrollment over Secure Transport, EST, is a cryptographic protocol that describes an X.509 certificate management protocol targeting public key infrastructure clients that need to acquire client certificates and associated certificate authority certificates. EST is described in RFC 7030 (https://datatracker.ietf.org/doc/html/rfc7030). In particular, an EST request is a request under Section 4.2 of the RFC 7030 standard.

The inventors recognized that using RFC requests the interoperability with existing information technology infrastructure can be improved.

According to a further aspect of an embodiment of the present invention, the key creation dataset comprises a pre-shared secret, wherein the certificate creation request comprises a further pre-shared secret, wherein the method furthermore comprises performing, as response to receiving the certificate creation request, a check whether the further pre-shared secret of the certificate creation request matches the pre-shared secret of the key creation dataset, wherein the step of sending the certificate creation request is only executed in case of a positive check. In particular, the step of performing the request can be executed by the computation unit, in particular, by the computation unit of the providing system.

The inventors recognized that by performing the described check one can ensure that only entities that have received the pre-shared secret can create valid certificate creation requests. This ensures that no unauthorized entity is allowed to request a certificate, which prevents a corruption of the certificate system.

According to a further aspect of an embodiment of the present invention, the certificate creation request comprises the certificate identifier, wherein performing the check furthermore comprises checking that the further pre-shared secret of the certificate creation request is related to the certificate identifier.

The inventors recognized that by checking that the certificate identifier relates to the pre-shared secret the knowledge of both datasets is necessary to create a valid certificate creation request. In particular, it would be not enough to access an arbitrary pre-shared secret. Thus, this additional aspect increases the safety of the method.

According to a further aspect of an embodiment of the present invention, sending the key creation dataset to the device comprises automatically transmitting the key creation dataset to the device via a secure communication channel. According to a further aspect of an embodiment of the present invention, providing the key creation dataset to the device comprises storing the key creation dataset on a portable storage medium and transmitting the key creation dataset to the device via the portable storage medium. A portable storage medium is a storage media that can be removed from a computer during operation. Examples are compact discs (acronym CD), digital video discs (acronym DVD), Blu-Ray discs as well as floppy disks and universal serial bus (acronym USB) sticks.

The inventors recognized that by automatically transmitting the key creation dataset the certificate generation process can be accelerated if there is a secure communication channel present to the device. By using a portable storage medium the key creation dataset can also be transmitted to devices without a secure communication channel.

According to a further possible aspect of an embodiment of the present invention, the first domain name comprises an asterisk label, wherein the asterisk label is the last label of the first domain name, and wherein the first certificate identifier is a label of the first domain name different from the last label of the first domain name, in particular, wherein the first certificate identifier is the second last label of the first domain name.

The inventors recognized that by using the asterisk label as the last label of the first domain a single DNS entry can be used for forwarding or sending information to the device. If using the first certificate identifier as the second last label of the first domain name, it is possible to use only a single DNS entry for several certificates for several clients, because an asterisk in a DNS entry (in particular, an asterisk in a resource record of the DNS entry) can represent all possible first certificate identifiers.

According to a further possible aspect of an embodiment of the present invention, the method comprises proving ownership of the domain related to the first domain name. In particular, this step is executed by the server, in particular, by the interface and/or the computation unit of the server.

In particular, the step of proving ownership can comprise at least one of the following substeps:

receiving a challenge from the certificate authority,
determining a response related to the challenge, wherein the response demonstrates control over the domain related to the first domain name,
providing the response to the certificate authority,
informing the certificate authority that the response has been provided.

The inventors recognized that by proving the ownership by the server such a proof does not need to be implemented by the device itself. In particular, by executing the proving centrally at the server for a potential plurality of devices, operation and maintenance of the overall system can be executed more efficiently.

According to a further possible aspect of an embodiment of the present invention, the method comprises creating a DNS resource record for the first domain name and/or for the modified first domain name. In particular, the method can comprise creating a first DNS A resource record or an AAAA resource record for the first domain name and a DNS CNAME resource record for the modified first domain name, or creating a first DNS A resource record or an AAAA resource record for the modified first domain name and a DNS CNAME resource record for the first domain name. In particular, the DNS resource record can be a wildcard resource record. In particular, the DNS resource record can be stored in a zone file. In particular, a DNS resource record can comprise type, an expiration time, a class, and type-specific data.

The inventors recognized that by creating a DNS resource record communication directed to the service based on the first domain name and/of on the modified first domain name can be enabled.

According to a further possible aspect of an embodiment of the present invention, the method comprises creating a DICOM node configuration based on the first digital certificate and/or the second digital certificate. The step of creating a DICOM node configuration can be executed by the server, by the device and/or by the client.

In particular, creating a DICOM node configuration can comprise creating an entry corresponding to the device and/or the client in a DICOM configuration for enabling encrypted communication based on the first digital certificate and/or the second digital certificate.

The inventors recognized that by creating a DICOM node configuration based on the first digital certificate and/or the second digital certificate an encrypted DICOM communication between several DICOM nodes can be established.

According to a further aspect of an embodiment of the present invention, the method for providing a digital certificate to a device furthermore comprising determining a modified certificate creation request based on the certificate creation request. In this aspect, the modified certificate creation request is sent to the certificate authority. In particular, the modified certificate creation request does not contain the pre-shared secret.

The inventors recognized that by determining and sending a modified certificate creation request to the certificate authority a leak of internal information can be avoided. By removing data that is not directly needed by the certificate authority for creating certificates no unnecessary information is provided to the certificate authority.

In a further aspect, an embodiment of the present invention relates to a computer-implemented method for installing a digital certificate on a device. The method comprises receiving, from a server, a key creation dataset comprising a certificate identifier, the certificate identifier being based on a device identification dataset being related to the device.

The method furthermore comprises determining a certificate creation request related to a first domain name based on the key creation dataset, wherein the first domain name comprises the certificate identifier. The method furthermore comprises sending the certificate creation request to a certificate authority via the server. The method furthermore comprises receiving the digital certificate, wherein the digital certificate is a wildcard certificate based on the first domain name signed by the certificate authority. The method furthermore comprises installing the digital certificate.

In particular, the step of receiving the key creation dataset is executed by an interface, in particular, by an interface of a device. In particular, the step of determining the certificate creation request is executed by a computation unit, in particular, by a computation unit of the device. In particular, the step of sending the certificate creation request is executed by the interface, in particular, by the interface of the device. In particular, the step of receiving the digital certificate is executed by the interface, in particular, the interface of the device. In particular, the step of installing the digital certificate is executed by the computation unit, in particular, the computation unit of the device.

According to a further aspect, an embodiment of the present invention relates to a server configured to for providing a digital certificate to a device, configured to:
  receiving a device identification dataset, the device identification dataset uniquely identifying the device,
  determining a key creation dataset comprising a certificate identifier, the certificate identifier being based on the device identification dataset,
  sending the key creation dataset to the device,
  receiving a certificate creation request related to a first domain name based on the key creation dataset from the device, wherein the first domain name comprises the certificate identifier,
  sending the certificate creation request to a certificate authority,
  providing the digital certificate to the device, wherein the digital certificate is a wildcard certificate based on the first domain name signed by the certificate authority.

In particular, the server can be configured to execute the method for providing a digital certificate to a device according to an embodiment of the present invention and its aspects. In particular, the server can comprise an interface and a computation unit. The server is configured to execute the method and its aspects by its interface and its computation unit configured to execute the respective method steps.

According to a further aspect, an embodiment of the present invention relates to a device for installing a digital certificate, configured to:
  receiving, from a server, a key creation dataset comprising a certificate identifier, the certificate identifier being based on a device identification dataset being related to the device,
  determining a certificate creation request related to a first domain name based on the key creation dataset, wherein the first domain name comprises the certificate identifier,
  sending the certificate creation request to a certificate authority via the server,
  receiving the digital certificate, wherein the digital certificate is a wildcard certificate based on the first domain name signed by the certificate authority,
  installing the digital certificate.

In particular, the device can be configured to execute the method for installing a digital certificate according to an embodiment of the present invention and its aspects. In particular, the device comprises an interface and a computation unit. In particular, the device is configured to execute the method and its aspects by its interface and its computation unit being configured to execute the respective method steps.

Another embodiment of the present invention is furthermore based on a computer program product comprising instructions which, when the program is executed by a computer, cause the computer to carry out the method of providing a digital certificate to a device and/or the method of installing a digital certificate on a device according to an embodiment of the present invention and its aspects.

Another embodiment of the present invention is furthermore based on a computer-readable storage medium comprising instructions which, when executed by a computer, cause the computer to carry out the method of providing a digital certificate to a device and/or the method of installing a digital certificate on a device according to an embodiment of the present invention and its aspects.

The realization of embodiments of the present invention or one of its aspects by a computer program product and/or a computer-readable medium has the advantage that already existing servers, devices and clients can be easily adapted by software updates in order to work as proposed by embodiments of the present invention.

The said computer program products can be, for example, a computer program or comprise another element apart from the computer program. This other element can be hardware, for example a memory device, on which the computer program is stored, a hardware key for using the computer program and the like, and/or software, for example a documentation or a software key for using the computer program.

According to a further possible aspect, an embodiment of the present invention relates to a computer-implemented method for providing a digital certificate to a device. The method is based on receiving, from the device, authentication data via a secure communication channel. In particular, the authentication data can be used for ensuring the identity of the device and the reliability and security of the communication. Furthermore, the method is based on receiving, from the device, or determining, by the server, a first certificate identifier. In particular, the first certificate identifier is a hash value. In other words, either a step of receiving, from the device, the first certificate identifier or the step determining, by the server, the first certificate identifier is executed. Further steps of the method are verifying the authentication data and receiving, from the device, a first public key created by the device.

The method is furthermore based on sending a first certificate signing request related to a first domain name based on the first public key to a certificate authority. Herein, the first domain name comprises the certificate identifier, and a domain related to the first domain name is controlled by the server. In particular, the first domain name is a wildcard domain. In particular, the first domain name comprises the certificate identifier, if the certificate identifier is a substring of the first domain name.

Advantageously, the certificate identifier can be identical with exactly one label of the first domain name. In particular, a domain related to the first domain name is controlled by the server, if said domain is at least a subdomain of a domain or equivalent with a domain the server can prove ownership of.

The method is furthermore based on receiving the first digital certificate from the certificate authority, wherein the first digital certificate is a wildcard certificate based on the first domain name and the first public key signed by the certificate authority, providing the first digital certificate to the device.

In particular, the step of receiving the first certificate identifier is executed by a server, in particular, by an interface of the server. In particular, the step of verifying the authentication data is executed by the server, in particular, by a computation unit of the server. In particular, the step of receiving the first public key is executed by the server, in particular, by the interface of the server. In particular, the step of sending the first certificate signing request is executed by the server, in particular, by the interface of the server. In particular, the step of receiving the first digital certificate is executed by the server, in particular, by the interface of the server. In particular, the step of providing the first digital certificate is executed by the server, in particular, by the interface of the server.

The inventors recognized that based on the proposed method the first digital certificate can be created by the server and provided to the client, so that the client is not involved in the certificate generation process and/or the interaction with the certificate authority. In particular, the server can demonstrate ownership of the first domain name and is eligible to have a digital certificate being created with respect to the first domain name.

At the same time, by using a wildcard certificate related to a domain name with an asterisk (e.g. in the lowest level), additional information can be provided that allows resolving or forwarding requests (e.g., DNS requests) directed to the first domain to the device. For example, an encoded IP address and/or an encoded domain name related to the device can be used replacing the asterisk within a DNS request, so that a DNS response redirecting to the IP address and/or decoded domain name related to the device can be provided based on the additional content that is submitted. In general, DNS is the acronym for "Domain Name System", e.g. specified in the standard RFC 1035 "Domain Names—Specification and Implementation", https://tools.ietf.org/html/rfc1035 or any later standard.

In particular, by using this wildcard certificate, a valid HTTPS communication can be established with the device, even though the first digital certificate is not related to a domain of the device, but to a domain of the server.

Additionally, the wildcard certificate is valid irrespective of which information is used replacing the asterisk, i.e., for every encoded domain name and/or encoded IP address used. However, by using a first certificate identifier related to the device within the certificate, the certificate can only be used for authenticating a specific device, and not another device relating to another first certificate identifier.

As a further advantage, based on using the authentication data and/or the secure communication channel the device can be authenticated by the server without the device already having installed a digital certificate. This allows for providing certificates by the server to a device without being a human interaction for authenticating the device (e.g., via a telephone call).

In particular, a secure communication channel is a communication channel with technical means to prevent that the respective communication is being manipulated and/or overheard. For example, a secure communication channel might be a VPN (acronym for "Virtual Private Network") connection or an SRS (acronym for "Smart Remote Service", a Siemens Healthineers Product).

Asymmetric encryption is based on pairs of keys comprising a public key, which may be disseminated widely, and a private key, which are known only to the owner. In particular, a public key of a receiver can be used for encrypting a message to be sent to the receiver, wherein the encrypted message can only be decrypted based on the private key. Furthermore, a private key of a sender can be used for signing a message to be transmitted, thereby proving authorship, wherein the signature can be verified based on the public key of the sender.

In particular, a certificate signing request is a dataset sent to a certificate authority (in a public key infrastructure) in order to apply for a digital certificate. In particular, a certificate signing request comprises a public key for which the digital certificate should be issued, identifying information (e.g., a domain name) and integrity protection (e.g., a digital signature). Certificate singing requests can be based on the RFC 2968 standard ("PKCS #10: Certification Request Syntax Specification", https://tools.ietf.org/html/rfc2986") or the "Signed Public Key and Challenge" standard (acronym SPKAC).

In particular, a certificate signing request can be contained in a certificate creation request as defined above. In particular, the certificate signing request can be identical with the modified certificate signing request.

According to a further possible aspect of an embodiment of the present invention, the authentication data comprises a pre-shared secret.

According to a further possible aspect of an embodiment of the present invention, the authentication data comprises a device identifier of the device, in particular, wherein the device identifier is based on a material number of the device and/or a serial number of the device. In particular, a device identifier is a unique device identifier, implying that there is a one-to-one correspondence between the device and the respective device identifier. In particular, the combination of the material number of the device and the serial number of the device is a unique device identifier.

The inventors recognized that by using a device identifier the provided digital certificate can be assigned to the device. Furthermore, by using the device identifier in the authentication data the security of the method can be increased, because it enables the server to only issue certificates for known devices. In particular, if the authentication data comprises both the device identifier and a pre-shared secret, the security of the method can be increased even further, because it enables the server to only issue certificates for known devices that store the pre-shared secret.

According to a further possible aspect of an embodiment of the present invention, the method furthermore comprises sending a modified first certificate signing request related to a modified first domain name based on the first public key to the certificate authority, wherein the modified first domain name comprises the certificate identifier. A further step is receiving a modified first digital certificate from the certificate authority, wherein the modified first digital certificate is a wildcard certificate based on the modified first domain name and the first public key signed by the certificate authority. A further step is providing the modified first digital certificate to the device.

In particular, the modified first domain name distinguishes from the first domain name in exactly one label, either by the modified first domain name comprising an additional label, or by exactly one of the labels of the modified first domain name being different from the corresponding label of the first domain name.

In particular, the first domain name can be used related to DNS A or AAAA resource records, and the modified domain name can be used related to DNS CNAME resource record, or vice versa. In particular, a DNS A resource record resolves a DNS request to an IPv4 address (acronym for "Internet Protocol, Version 4"), and a DNS AAAA resource record resolves a DNS request to an IPv6 address (acronym for "Internet Protocol, Version 6"). In particular, a DNS CNAME resource record resolves a DNS request to another domain name (in other words, it can be interpreted as referral).

The inventors recognized that by issuing a modified first digital certificate in addition to a first digital certificate, based on the domain name used in communication (e.g., in DNS requests), it can be determined solely based on the domain name what the expected reaction to the communication is. For example, based on the domain name it can be decided whether the sender of a DNS requests expects as a result an A/AAAA resource record or a CNAME resource record.

According to a further possible aspect of an embodiment of the present invention, the method furthermore comprises storing a usage information related to the authentication data to prevent re-using the authentication data. In particular, usage information can be stored by storing the authentication data in a database, wherein the database is checked in the step of validating the authentication data to determine whether the authentication data is already in the database. Alternatively, usage information can be stored by storing a flag related to the authentication data in a database of all authentication data that indicates that a certain authentication data already has been used. The flag can then by checked in the step of validation the authentication data to determine whether the authentication data has already been used.

The inventors recognized that based on the usage information stored using the same authentication data twice can be prevented. This increases the safety of the system by not allowing to have two digital certificates issued for the same set of authentication data.

According to a further possible aspect of an embodiment of the present invention, the method furthermore comprises an optional step of authenticating the device based on the first digital certificate. Furthermore, the method comprises receiving registration data from the device, wherein the registration data comprise a second certificate identifier and receiving a second public key created by a client of the device. In particular, the registration data can comprise additional data, e.g. a token provided from the device to the client.

Furthermore, the method comprises sending a second certificate signing request related to a second domain name based on the second public key to the certificate authority, wherein the second domain name comprises the second certificate identifier, and receiving a second digital certificate from the certificate authority, wherein the second digital certificate is a wildcard certificate based on the second domain name signed by the certificate authority. The method furthermore comprises providing the second digital certificate to the device and/or to the client.

In particular, the described additional steps of the method can be executed after providing the first digital certificate, and in particular, they can be executed some longer timespan after providing the first digital certificate.

The inventors recognized that based on these additional steps a second digital certificate can be created for a client that is trusted by the device or authenticated at the device, without an direct interaction between the server and the client. In particular, in this process, the first digital certificate can be used by the device to authenticate at the server. By using this method, it is for example not necessary to have a pre-shared secret at the client for authentication. If the pre-shared secrets within the previously described methods are already included during the manufacturing of the device (wherein manufacturing can comprise compiling certain code at the server side), digital certificates can be distributed to clients even if one has no access to the clients during the manufacturing. For example, a vendor could use this method to distribute digital certificates to third-party clients.

According to a further possible aspect of an embodiment of the present invention, the second certificate identifier comprises the first certificate identifier and a client identifier related to the client.

The inventors recognized that by using a second certificate identifier based on the first certificate identifier and the client identifier both the respective first digital certificate of the device (and potentially having been used to authenticate the device for creating the second digital certificate) and the respective client can be identified alone based on the second certificate identifier. This can be useful in situations where the second digital certificate has been corrupted and needs to be revoked, or to identify misappropriate use by a user of the device.

According to a further possible aspect of an embodiment of the present invention, the second domain name comprises an asterisk label, wherein the asterisk label is the last label of the second domain name, wherein the first certificate identifier is the second last label of the second domain name, and wherein the client identifier is the third last label of the second domain name. According to an alternative aspect of an embodiment of the present invention, the second domain name comprises an asterisk label, wherein the asterisk label is the last label of the second domain name, wherein the client identifier is the second last label of the second domain name, and wherein the first certificate identifier is the third last label of the second domain name.

The inventors recognized that by using the first certificate identifier and the client identifier in the presented name within the second domain name, the structure of devices and clients of these devices can be represented within the second domain names. Such a structure in the domain names can be preferably used by geographically distributing servers according to the location of the respective devices, in order to ensure fast response times, by using a structure of the DNS resource records related to the defined structure of the domain names.

Another embodiment of the present invention relates in another possible aspect to a computer-implemented method for providing a DNS response. This method is based on receiving, from a requestor, an DNS request for resolving a fully qualified domain name, wherein the fully qualified domain name comprises as a label an encoded domain name. The method furthermore comprises determining a decoded domain name based on the encoded domain name, and providing, to the requestor, a DNS response, wherein the DNS response comprises the decoded domain name. In particular, the DNS response comprise a CNAME resource record based on the decoded domain name.

In particular, the method for providing a DNS response is executed by a server. In particular, the step of receiving the DNS request and the step of providing the DNS response are executed by an interface, in particular, by an interface of the server. In particular, the step of determining the decoded domain name is executed by a computation unit, in particular by a computation unit of the server.

In particular, an encoded domain name is a domain name where special characters in the DNS system are replaced by one or more masking characters. In particular, an encoded domain name cannot be used directly within the DNS system as basis for a valid DNS request. In particular, an encoded domain name can be used as single label or single level within a fully qualified domain name.

An example for a special character in the DNS system is the dot "." separating different levels or labels of a domain name. In particular, the encoded domain name is a domain name where every dot "." has been replaced by the characters "- -" (double dash) or "- - -" (triple dash).

A decoded domain name is based on an encoded domain name. In particular, the decoded domain name can be determined based on the encoded domain name by replacing the one or more masking characters within the encoded domain name with the corresponding special characters within the DNS system. In particular, a decoded domain name can be used directly within the DNS system as basis for a valid DNS request.

The inventors recognized that by using the described method a DNS request directed to a fully qualified domain name comprising an encoded domain can be resolved to a decoded domain. In particular, the fully qualified domain name can relate to another server than the decoded domain, and the decoded domain does not need to be a publicly resolvable domain, but can correspond to a local domain only resolvable in an internal network. Furthermore, by using this method a secure communication can be established based on a digital certificate issued based on the fully qualified domain name, but the communication then being directed to the (potentially local) decoded domain name.

In the alternative, it would also be possible to use an encoded IP address and a decoded IP address instead of the encoded domain name and the decoded domain name. However, using encoded and decoded domain names has the advantage that in the (potentially local) network related to the decoded domain names no static IP addresses have to be used.

According to a further possible aspect of an embodiment of the present invention, the fully qualified domain name can comprise as alternative to the encoded domain name an encoded IP address. In this aspect, the method for providing a DNS response furthermore comprises determining, based on the fully qualified domain name, whether DNS request is related to an A resource record, to an AAAA resource record or to a CNAME resource record. If said determining results in the case that the DNS request is related to a CNAME resource record, the decoded domain name is determined based on the encoded domain name and the DNS response will be provided to the requestor, wherein the DNS response comprises the CNAME resource record, and wherein the DNS response comprises the decoded domain name. If said determining results in the case that the DNS request is related to an A resource record or an AAAA resource record, a decoded IP address is determined based on the encoded IP address and the DNS response will be provided to the requestor, wherein the DNS response comprises the A resource record or the AAAA resource record, and wherein the DNS response comprises the decoded IP address.

In particular, an encoded IP address is an IP address where special characters in the DNS system and/or the TCP/IP system are replaced by one or more masking characters. In particular, an encoded IP address cannot be used directly within the TCP/IP system as basis for a valid TCP/IP request (e.g. a valid HTTP or HTTPS request). In particular, an encoded IP address can be used as single label or single level within a fully qualified domain name.

An example for a special character in the DNS system is the dot "." separating different levels or labels of a domain name, and also separating different components of an IP address (within the IPv4 standard). In particular, the encoded IP address is an IP address where every dot "." has been replaced by the character "-" (dash), the characters "- -" (double dash) or the characters "- - -" (triple dash). Within the IPv6 standard, the special character ":" could be replaced in a similar fashion if necessary.

A decoded IP address is based on an encoded IP address. In particular, the decoded IP address can be determined based on the encoded IP address by replacing the one or more masking characters within the encoded IP address with the corresponding special characters within the DNS system and/or the TCP/IP system. In particular, a decoded IP address can be used directly within the TCP/IP system as basis for a valid TCP/IP request (e.g. a valid HTTP or HTTPS request).

The inventors recognized that based on the proposed method both requests directed to a domain name (resulting in an CNAME resource record) and to an IP address (resulting in an A resource record or an AAAA resource record) can be handled. By basing the determination on which resource record is requested on the fully qualified domain name the encoded domain name and/or the encoded IP address do not need to be inspected for their type, which is a possibly erroneous step. Furthermore, by said determining ambiguities (in the case a label in the fully qualified domain name can correspond to both an encoded IP address and an encoded domain name) can be handled by the method.

According to a further possible aspect the step of determining whether the DNS request is related to an A resource record, to an AAAA resource record or to a CNAME resource record, is based on the existence and/or the content of a label not being the lowest label of the fully qualified domain name. In the alternative, said step is based on the content of the lowest label of the fully qualified domain name.

The inventors recognized that by basing the determination on a label not being the lowest label wildcard domain names can be used more easily in the DNS system. By basing the determination on a label being the lowest label, only a defined part of the fully qualified domain name has to be inspected, and not the whole fully qualified domain name.

An embodiment of the present invention relates in another possible aspect to a server for providing a first digital certificate to a device, comprising an interface and a computation unit,
- configured for receiving, from the device, authentication data via a secure communication channel,
- configured for receiving, from the device, or determining, by the server, a first certificate identifier, in particular, wherein the first certificate identifier is a hash value or random value,
- configured for verifying the authentication data,
- configured for receiving, from the device, a first public key created by the device,
- configured for sending a first certificate signing request related to a first domain name based on the first public key to a certificate authority, wherein the first domain name comprises the certificate identifier, and wherein a domain related to the first domain name (DN-1) is controlled by the server,
- configured for receiving the first digital certificate from the certificate authority, wherein the first digital certificate is a wildcard certificate based on the first domain name and the first public key signed by the certificate authority, configured for providing the first digital certificate to the device.

In particular, the server can be configured to execute the method for providing a first digital certificate according to an embodiment of the present invention and its aspects. The server is configured to execute the method and its aspects by its interface and the computation unit being configured to execute the respective method steps.

An embodiment of the present invention relates in another possible aspect to a device comprising an interface and a computation unit, configured for:
- determining authentication data for authenticating the device at a server,
- optionally sending a first certificate identifier to the server, in particular, wherein the first certificate identifier is a hash value or a random value,
- creating a first asymmetric key pair, the asymmetric key pair comprising a first public key and a first private key,
- sending the first public key to the server,
- receiving and installing a first digital certificate on the device.

In particular, the device can be configured to execute the respective steps of the method for providing a first digital certificate according to an embodiment of the present invention and its aspects. The device is configured to execute the method and its aspects by its interface and the computation unit being configured to execute the respective method steps.

An embodiment of the present invention relates in another possible aspect to a client comprising an interface and a computation unit, the client being a client of a device, configured for
- determining registration data,
- sending the registration data to the device,
- creating a second asymmetric key pair, the second asymmetric key pair comprising a second public key PBK-1 and a second private key,
- sending the second public key to the device,
- receiving and installing a second digital certificate.

In particular, the client can be configured to execute the respective steps of the method for providing a first digital certificate according to an embodiment of the present invention and its aspects. The client is configured to execute the method and its aspects by its interface and the computation unit being configured to execute the respective method steps.

An embodiment of the present invention relates in another aspect to a system comprising a server according to an embodiment of the present invention and its aspects, a device according to an embodiment of the present invention and its aspects, and optionally a client according to an embodiment of the present invention and its aspects. In particular, the client and the device are located in an intranet.

An embodiment of the present invention relates in another possible aspect to a DNS server comprising an interface and a computation unit, configured for:
- receiving, from a requestor, a request for resolving a fully qualified domain name, wherein the fully qualified domain name comprises as a label an encoded domain name,
- determining a decoded domain name based on the encoded domain name,
- providing, to the requestor, a DNS response, wherein the DNS response comprises the decoded domain name.

In particular, the DNS server can be configured to execute the respective steps of the method for providing a DNS response according to an embodiment of the present invention and its aspects. The DNS server is configured to execute the method and its aspects by its interface and the computation unit being configured to execute the respective method steps.

An embodiment of the present invention relates in another possible aspect to a computer program product comprising instructions which, when the program is executed by a computer, cause the computer to carry out one of the methods according to an embodiment of the present invention and its aspects. Furthermore, an embodiment of the present invention relates to a computer-readable medium comprising instructions which, when executed by a computer, cause the computer to carry out one of the methods according to an embodiment of the present invention and its aspects.

The realization of an embodiment of the present invention or one of its aspects by a computer program product and/or a computer-readable medium has the advantage that already existing servers, devices and clients can be easily adapted by software updates in order to work as proposed by embodiments of the present invention.

The said computer program products can be, for example, a computer program or comprise another element apart from the computer program. This other element can be hardware, for example a memory device, on which the computer program is stored, a hardware key for using the computer program and the like, and/or software, for example a documentation or a software key for using the computer program.

The properties, features and advantages of this invention described above, as well as the manner they are achieved, become clearer and more understandable in the light of the following description and embodiments, which will be described in detail in the context of the drawings. This following description does not limit the present invention on the contained embodiments. Same components or parts can be labeled with the same reference signs in different figures. In general, the figures are not for scale.

The numbering and/or order of method steps is intended to facilitate understanding and should not be construed, unless explicitly stated otherwise, or implicitly clear, to mean that the designated steps have to be performed according to the numbering of their reference signs and/or their order within the figures. In particular, several or even all of the method steps may be performed simultaneously, in an overlapping way or sequentially.

BRIEF DESCRIPTION OF THE DRAWINGS

In the following.

DETAILED DESCRIPTION

Figure 1:
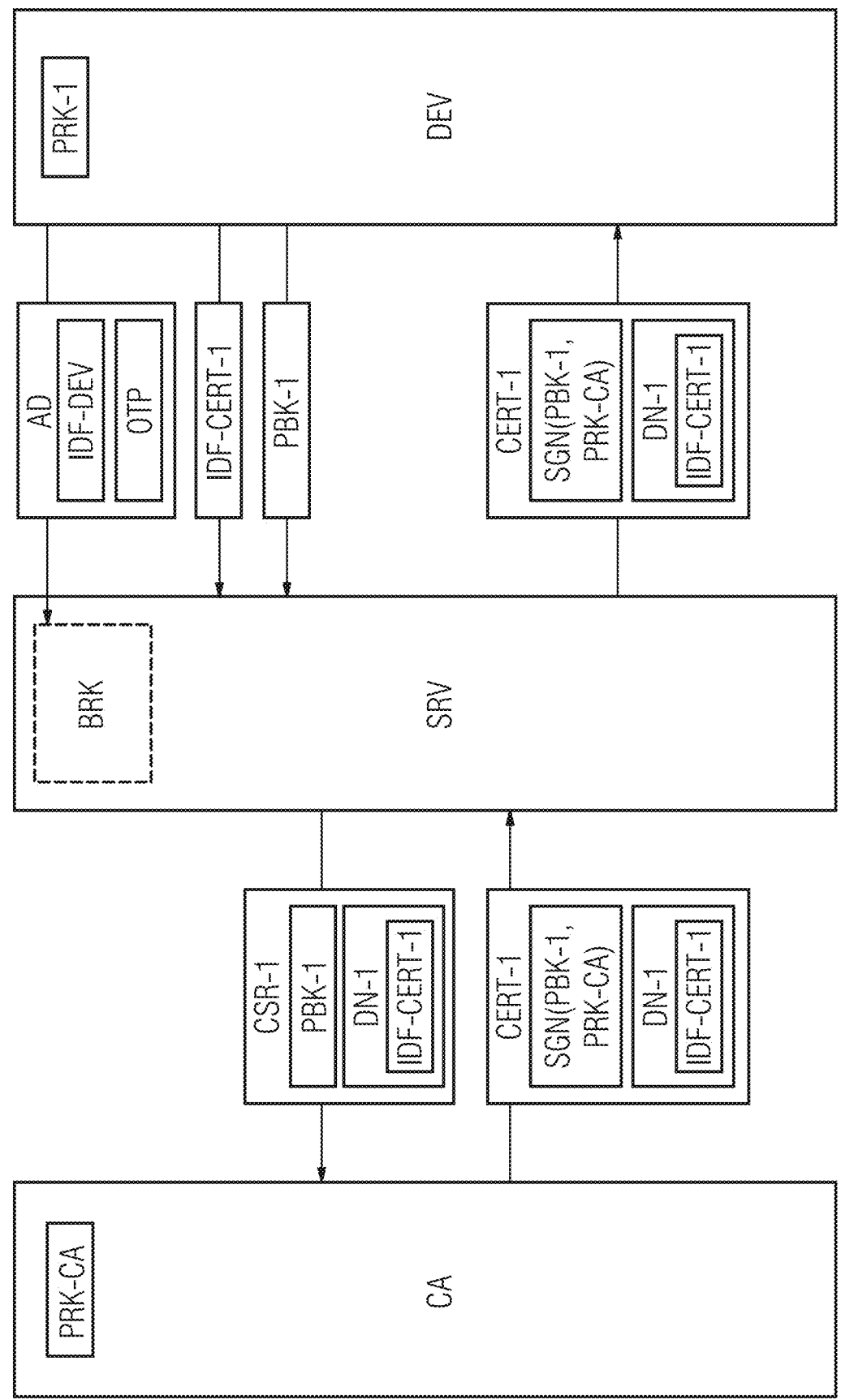
FIG. 1 displays a first data flow diagram for a method for providing a first digital certificate according to an embodiment of the present invention, FIG. 2 displays a modified first data flow diagram for a method for providing a first digital certificate according to an embodiment of the present invention, FIG. 3 displays a second data flow diagram for a method for providing a first digital certificate according to an embodiment of the present invention, or for a method for providing a second digital certificate according to an embodiment of the present invention, FIG. 4 displays a first process flow diagram of a method for providing a first digital certificate according to an embodiment of the present invention, FIG. 5 displays a second process flow diagram of a method for providing a first digital certificate according to an embodiment of the present invention, FIG. 6 displays a process flow diagram of a method for installing a first digital certificate according to an embodiment of the present invention, FIG. 7 displays a third process flow diagram of a method for providing a first digital certificate according to an embodiment of the present invention, FIG. 8 displays a fourth process flow diagram of a method for providing a first digital certificate according to an embodiment of the present invention, FIG. 9 displays a process flow diagram of a method for providing a second digital certificate according to an embodiment of the present invention, FIG. 10 displays a first process flow diagram of a method for installing a second digital certificate according to an embodiment of the present invention, FIG. 11 displays a fifth process flow diagram of a method for providing a first digital certificate according to an embodiment of the present invention, FIG. 12 displays a data flow diagram for a method for providing a DNS response according to an embodiment of the present invention, FIG. 13 displays a first process flow diagram of a method for providing a DNS response according to an embodiment of the present invention, FIG. 14 displays a second process flow diagram of a method for providing a DNS response according to an embodiment of the present invention, FIG. 15 displays a third process flow diagram of a method for providing a DNS response according to an embodiment of the present invention, FIG. 16 displays domain names used in different embodiments of the present invention, FIG. 17 displays fully qualified domain names used in different embodiments of the present invention, FIG. 18 displays a third data flow diagram for a method for providing a digital certificate and/or for a method for installing a digital certificate according to an embodiment of the present invention, FIG. 19 displays a sixth process flow diagram of a method for providing a digital certificate according to an embodiment of the present invention, FIG. 20 displays a second process flow diagram of a method for installing a first digital certificate according to an embodiment of the present invention, FIG. 21 displays a seventh process flow diagram of a method for providing a digital certificate according to an embodiment of the present invention, FIG. 22 displays a first embodiment of a server, a device, a certificate authority, and a client according to an embodiment of the present invention, FIG. 23 displays a second embodiment of a server, a device, a certificate authority, and a client according to an embodiment of the present invention, FIG. 24 displays a third embodiment of a server, a device, a certificate authority, and a client according to an embodiment of the present invention, FIG. 25 displays a fourth embodiment of a server, a device and a certificate authority according to an embodiment of the present invention.

FIG. 1 displays a first data flow diagram for a method for providing a first digital certificate CERT-1 according to an embodiment of the present invention. In this embodiment, data is exchanged between a server SRV, a device DEV and a certificate authority CA. Furthermore, in this embodiment the server SRV comprises a broker BRK that can be used for certain parts of the communication of the server SRV.

In this embodiment, the device DEV sends authentication data AD to the server SRV. Here, the authentication data AD comprises a device identifier IDF-DEV of the device DEV and a one-time password OTP. Alternatively, the authentication data AD may comprise other components that allow an authentication of the device DEV with the server SRV. In this embodiment, the device identifier IDF-DEV is based on the material number of the device DEV and/or the serial number of the device DEV. In this embodiment, the device identifier IDF-DEV comprises the material number and/or the serial number as plain text, alternatively, the device identifier IDF-DEV can comprise the material number and/or the serial number in an encoded way, for example, the device identifier IDF-DEV can comprise a hash value based on the material number and/or the serial number.

Furthermore, the device DEV sends a first certificate identifier IDF-CERT-1 to the server SRV. Alternatively, the first certificate identifier IDF-CERT-1 can also be created by the server SRV instead of being received from the device DEV. In this embodiment, the first certificate identifier IDF-CERT-1 is a unique identifier, for example, by being a hash value, for example, based on a random number or based on the material number and/or the serial number of the device DEV. In general, the first certificate identifier IDF-CERT-1 and the device identifier IDF-DEV are different, alternatively the first certificate identifier IDF-CERT-1 and the device identifier IDF-DEV can be identical.

Furthermore, the device sends a first public key PBK-1 to the server. The first public key PBK-1 corresponds to a first private key PRK-1 being stored on the device DEV. The first public key PBK-1 and the first private key PRK-1 form a first asymmetric key pair. The first asymmetric key pair was created by the device DEV. The first private key PRK-1 can be used to prove ownership of any digital certificate based on the first public key PBK-1.

In the displayed embodiment, the first certificate identifier IDF-CERT-1 and the first public key PBK-1 are sent independently from the device DEV to the server SRV. Alternatively, the first certificate identifier IDF-CERT-1 and the first public key PBK-1 can be part of a first certificate signing request CSR-1 created by the device DEV and sent to the server SRV.

In this first data flow diagram, the server SRV sends a first certificate signing request CSR-1 to the certificate authority CA. In this embodiment, the certificate signing request CSR1-1 comprises the first public key PBK-1 and the first domain name DN-1. The first domain name DN-1 comprises an asterisk label AL and the first certificate identifier IDF-CERT-1.

As a response, the certificate authority CA sends a first digital certificate CERT-1 to the server SRV. The first digital certificate CERT-1 comprises the first domain name DN-1, in particular, the first domain name DN-1 is the subject of the first digital certificate CERT-1. Furthermore, the first digital certificate CERT-1 comprises a signature based on the first public key PBK-1 signed with a private key PRK-CA of the certificate authority CA.

The server SRV receives the first digital certificate CERT-1 and send the first digital certificate CERT-1 to the device DEV. Alternatively, the certificate authority CA can directly provide the first digital certificate CERT-1 to the device DEV.

Figure 2:
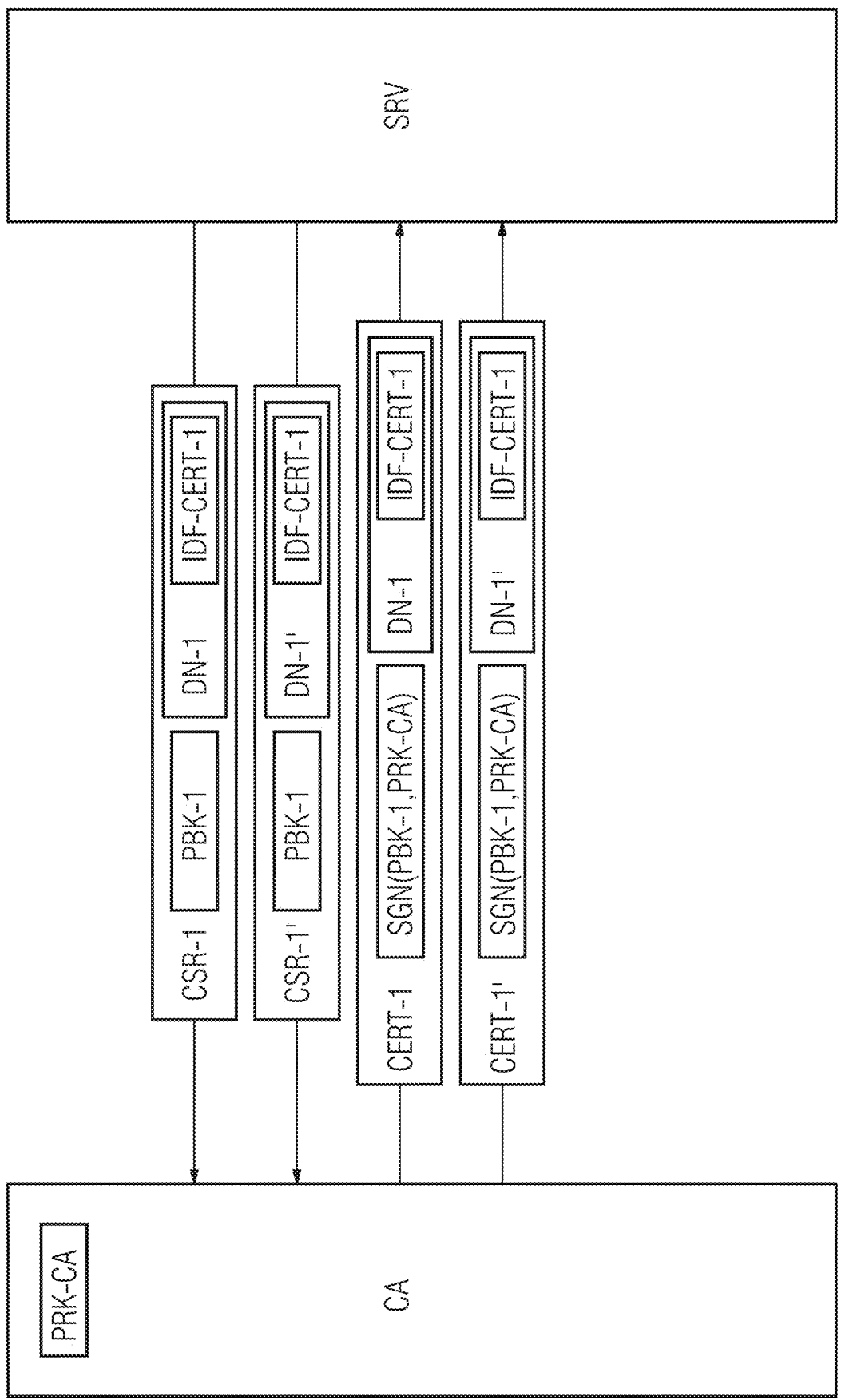

FIG. 2 displays a modified first data flow diagram displayed in FIG. 1, wherein FIG. 2 only displays the data flow between the server SRV and the certificate authority CA.

In contrast to the first data flow diagram, in the modified flow diagram a modified first certificate signing request CSR-1' is sent (in addition to the first certificate signing request CSR-1) from the server SRV to the certificate authority CA, and as a response, the certificate authority CA sends (in addition to the first digital certificate CERT-1) a modified first digital certificate CERT-1' to the server SRV, which can also provided to the device DEV by the server SRV. The modified first certificate signing request CSR-1' and the modified first digital certificate CERT-1' correspond to the same first public key PBK-1 as the first certificate signing request CSR-1 and the first digital certificate CERT-1, but to a modified first domain name DN-1'. In this embodiment, both the modified first domain name DN-1' and the first domain name DN-1 comprise the same first certificate identifier IDF-CERT-1.

Two first digital certificates CERT-1, CERT-1' for the same device DEV' are needed due to the fact that in general wildcard certificates are only accepted for a single level of the domain name, and that a DNS request to a wildcard domain can only be answered consistently only be a CNAME resource record (corresponding to a domain name) or by an A resource record (corresponding to an IP address), not by both. In general, a domain name server synthesizes an answer to a query based on the query type. A resolver will always ask for an A or AAAA resource record. If the server responds with a CNAME resource request, then the resolver follows the domain in the response until it receives the A or AAAA resource record. Therefore, the domain name spaces for answers that shall be CNAMEs must be separated from answers that shall be A or AAAA records.

Figure 3:
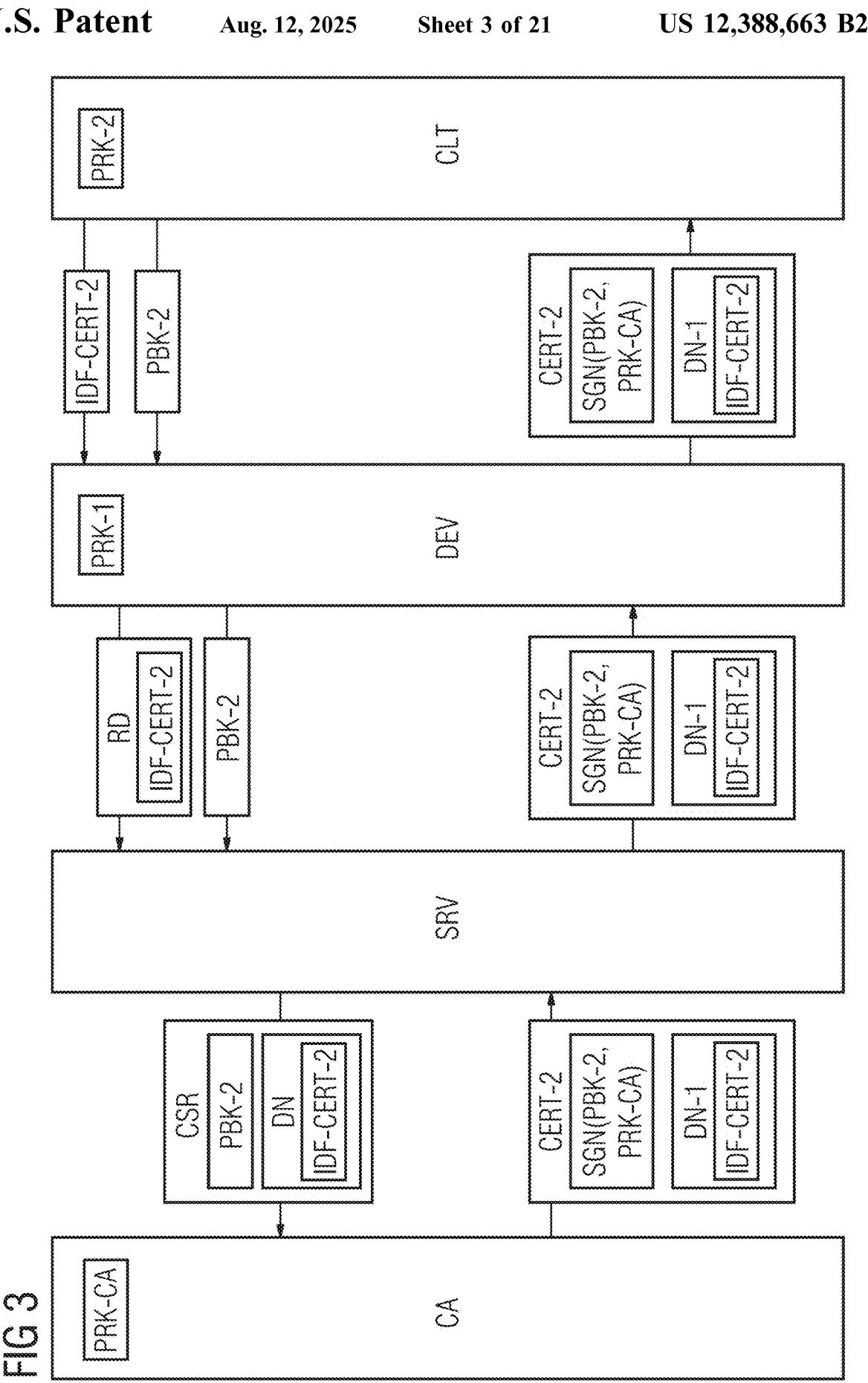

FIG. 3 displays a second data flow diagram for a method for providing a first digital certificate CERT-1 according to an embodiment of the present invention, or for a method for providing a second digital certificate CERT-1 according to an embodiment of the present invention. In this embodiment, data is exchanged between a server SRV, a device DEV, a client CLT related to the device DEV and a certificate authority CA.

The data flow according to the second data flow diagram can occur in connection with the data flow displayed in the first data flow diagram of FIG. 1 and/or the modified first data flow diagram of FIG. 2, or it can be a stand-alone data flow independent of the data flow displayed in the first data flow diagram of FIG. 1 and/or the modified first data flow diagram of FIG. 2.

For this data flow diagram, one can assume that the client CLT is authenticated and authorized to interact with the device DEV, and the device DEV is authenticated and authorized to interact with the server SRV, for example, via the first digital certificate CERT-1 and/or the modified first digital certificate CERT-1'.

In the displayed data flow diagram, the client CLT sends a second certificate identifier IDF-CERT-2 to the device DEV. Alternatively, the device DEV and/or the server SRV can create the second certificate identifier IDF-CERT-2, for example, being a hash value. In particular, the device DEV and/or the server SRV can create the second certificate identifier IDF-CERT-2 based on a client identifier IDF-CLT of the client CLT and on the first certificate identifier IDF-CERT-1. In particular, the second certificate identifier IDF-CERT-2 can comprise both the client identifier IDF-CLT and the first certificate identifier IDF-CERT-1. For example, the client identifier IDF-CLT can be a material number and/or a serial number of the client CLT, or a hostname of the client CLT in a local network environment both the client CLT and the device DEV operate in, or a hash value based on those input values. The second certificate identifier IDF-CERT-2 can be identical with the client identifier IDF-CLT. In particular, the first certificate identifier IDF-CERT-1 and the second certificate identifier IDF-CERT-2 are different. It is also possible that the client CLT receives from the device DEV a token that can be used for the client CLT to interact directly with the server SRV.

Furthermore, the client CLT sends a second public key PBK-2 to the server SRV, directly or indirectly via the device DEV. The second public key PBK-2 corresponds to a second private key PRK-2 being stored on the client CLT. The second public key PBK-2 and the second private key PRK-2 form a second asymmetric key pair. The second asymmetric key pair was created by the client CLT. The second private key PRK-2 can be used to prove ownership of any digital certificate based on the second public key PBK-2.

In the displayed embodiment, the second certificate identifier IDF-CERT-2 and the second public key PBK-2 are sent independently from the client CLT via the device DEV to the server SRV. Furthermore, the second certificate identifier IDF-CERT-2 is part of registration data RD. In particular, the registration data RD can be identical with the second certificate identifier IDF-CERT-2, alternatively, the registration data RD can comprise the second certificate identifier IDF-CERT-2 and additional data. In particular, this additional data can relate to an authentication of the device DEV with the client. In particular, the registration data RD can comprise both the second certificate identifier IDF-CERT-2 and the second public key PBK-2.

Alternatively, the second certificate identifier IDF-CERT-2 and the second public key PBK-2 can be part of a second certificate signing request CSR-2 created by the device DEV and/or the client and sent to the server SRV. In particular, the registration data RD can comprise this second certificate signing request CSR-2 or be identical with this second certificate signing request CSR-2.

In this second data flow diagram, the server SRV sends a second certificate signing request CSR-2 to the certificate authority CA. In this embodiment, the second certificate signing request CSR-2 comprises the second public key PBK-2 and the second domain name DN-2. The second domain name DN-2 comprises an asterisk label AL and the second certificate identifier IDF-CERT-2.

As a response, the certificate authority CA sends a second digital certificate CERT-2 to the server SRV. The second digital certificate CERT-2 comprises the second domain name DN-2, in particular, the second domain name DN-2 is the subject of the second digital certificate CERT-2. Furthermore, the second digital certificate CERT-2 comprises a signature based on the second public key PBK-2 signed with the private key PRK-CA of the certificate authority CA.

The server SRV receives the second digital certificate CERT-2 and sends the second digital certificate CERT-2 to the device DEV and/or the client CLT. Alternatively, the certificate authority CA can directly provide the second digital certificate CERT-2 to the client CLT, either directly or via the device DEV.

Figure 4:
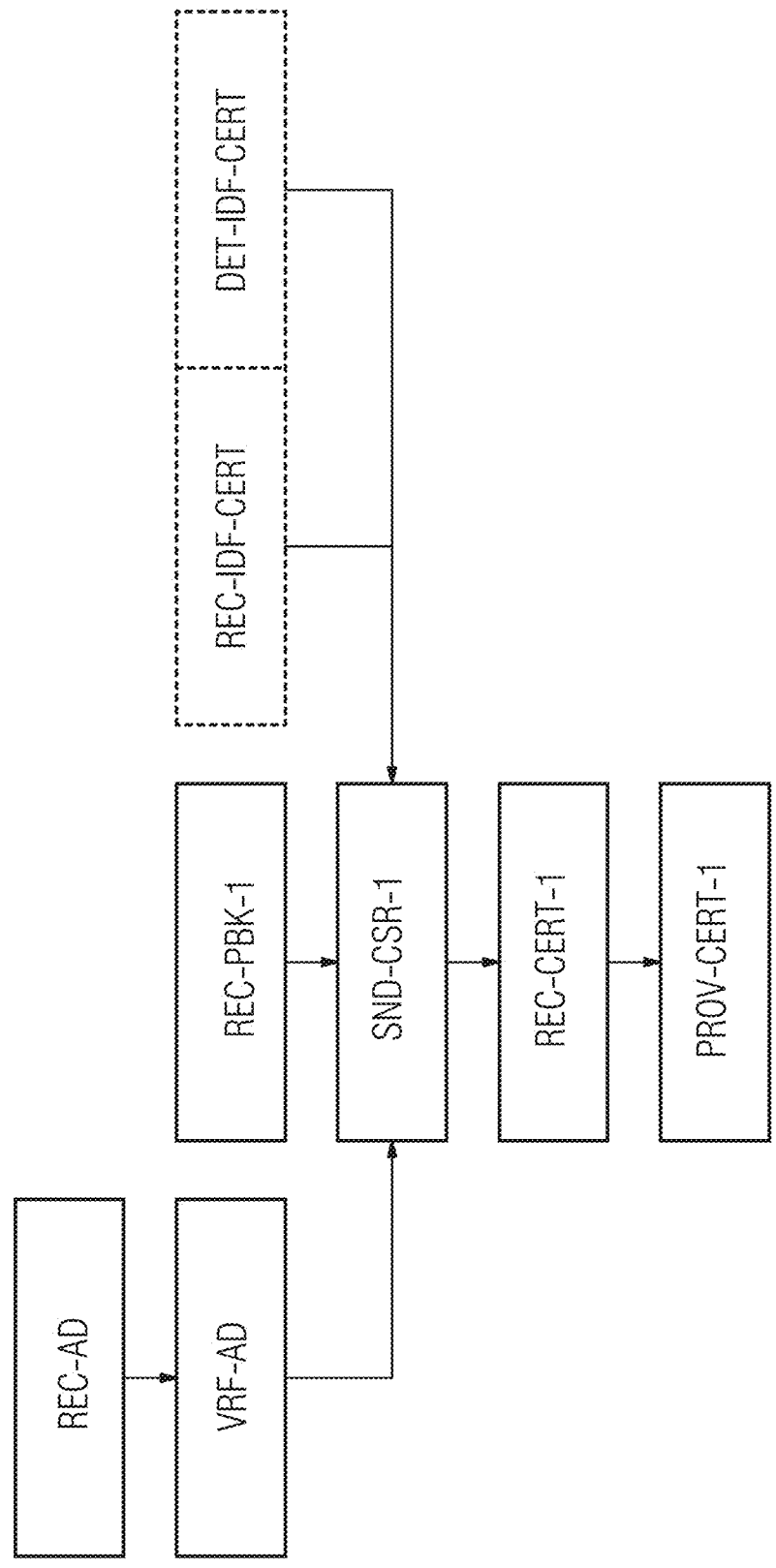

FIG. 4 displays a first process flow diagram according to an embodiment of the method for providing, by a server SRV, a first digital certificate CERT-1 to a device DEV. The first process flow diagram corresponds to the first data flow diagram displayed in FIG. 1.

The initial steps of the method are receiving REC-AD, from the device DEV, authentication data AD via a secure communication channel and receiving REC-PBK-1, from the device DEV, a first public key PBK-1 created by the device DEV. In this embodiment, the authentication data comprises a client identifier IDF-CLT and a one-time-password OTP. In particular, the client identifier IDF-CLT is based on a material number and/or serial number of the client CLT. In particular, the client identifier IDF-CLT and/or the one-time password OTP could have been stored on the device already at the manufacturing site.

A further step is verifying VRF-AD the authentication data AD. In this embodiment, VRF-AD the authentication data AD comprises checking whether a device database stores the client identifier IDF-CLT in relation to the one-time password OTP. Optionally, a flag within this database can be checked, wherein the flag indicates whether the combination of the client identifier IDF-CLT and the one-time password have already been used in authentication data AD received before. If the step of verifying VRF-AD has a positive outcome, the method will be continued, otherwise the further execution of the method will be stopped.

The method furthermore comprises either the step of receiving REC-IDF-CERT, from the device DEV, a first certificate identifier IDF-CERT-1 or the step of determining DET-IDF-CERT, by the server, the first certificate identifier IDF-CERT-1. In this embodiment, the first certificate identifier IDF-CERT-1 corresponds to a hash value, the hash value being based on a random number. Alternatively, the first certificate identifier IDF-CERT-1 can be based on a client identifier IDF-CLT of the client CLT or on the hash of the client identifier IDF-CLT. In the following it will be assumed that the first certificate identifier IDF-CERT-1 is the string "cald5f5f7ba45".

A further step of the displayed embodiment is sending SND-CSR-1 a first certificate signing request CSR-1 related to a first domain name DN-1 based on the first public key PBK-1 to a certificate authority CA, wherein the first domain name DN-1 comprises the certificate identifier IDF-CERT-1. In the following, it will be assumed that the first domain name DN-1 is the string "*.cald5f5f7ba45.cert. example.com". In particular, the first domain name DN-1 is a wildcard domain name. In this embodiment, the domain name comprises five levels: The first level (also denoted as top-level) is the label "com", the second level and the third level are "example" and "cert", the second last level is the certificate identifier IDF-CERT-1, and the last level is the asterisk character "*".

The displayed method furthermore comprises the step of receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA. In this embodiment, the subject of the first digital certificate CERT-1 is equivalent to the first domain name DN-1, in this example "*.cald5f5f7ba45.cert.example.com".

The last step of the displayed method is providing PROV-CERT-1 the first digital certificate CERT-1 to the device DEV. Providing PROV-CERT-1 the first digital certificate CERT-1 can comprise sending the first digital certificate CERT-1 directly to the device DEV and/or enabling the first digital certificate CERT-1 to be downloaded by the device DEV.

FIG. 5 displays a second process flow diagram of a method for providing a first digital certificate CERT-1 according to an embodiment of the present invention. The second process flow diagram comprises all steps of the first process flow diagram displayed in FIG. 4, those steps and the data structures described with respect to those steps can comprise all advantageous embodiments and features described in FIG. 4.

The second process flow diagram furthermore comprises the optional step of proving ownership PRV-OWN of the domain related to the first domain name DN-1. In particular, the step of proving ownership PRV-OWN is executed via the ACME protocol (acronym for "Automatic Certificate Management Environment" described in RFC 8555, https://tools.ietf.org/html/rfc8555).

In this embodiment, the step of proving ownership PRV-OWN comprises the substeps of receiving REC-CLG a challenge from the certificate authority CA, determining DET-RSP a response related to the challenge, wherein the response demonstrates control over the domain related to the first domain name DN-1, providing PROV-RSP the response to the certificate authority CA, informing INF-CA the certificate authority CA that the response has been provided.

In this embodiment, the challenge is to create a file with a given content at a certain location at the server being accessible based on the domain "cald5f5f7ba45.cert.example.com", for example a certain HTML file at "http://cald5f5f7ba45.cert.example.com/authentication.html". Determining the response comprises actually creating this file and making it accessible to the public. Alternatively, The ACME method DNS-01 can be used, wherein the challenge needs to be included into a TXT resource record for a specified domain.

In the displayed embodiment, the step of proving ownership PRV-OWN is executed after the step of sending SND-CSR-1 the first certificate signing request CSR-1. It is also possible that first the step of proving ownership PRV-OWN is executed, and afterwards the step of sending SND-CSR-1 the first certificate signing request CSR-1 is executed.

The method according to the process diagram displayed in FIG. 5 furthermore comprises the optional step of creating CRT-DNS a DNS resource record for the first domain name DN-1. A synonym for "DNS resource record" is "resource record". In particular, the DNS resource record is of type "A" (resolving to an IPv4 address), of type "AAAA" (resolving to an IPv6 address) or of type "CNAME" (resolving to another domain name).

The method according to the process diagram displayed in FIG. 5 furthermore comprises the optional step of storing STR-USG a usage information related to the authentication data AD to prevent reusing the authentication data AD. In this embodiment, a flag is stored in the database storing the eligible authentication data AD to indicate that certain authentication data has already been used.

FIG. 6 displays a process flow diagram of a method for installing a first digital certificate CERT-1 according to an embodiment of the present invention, According to the displayed embodiment, the method furthermore comprises the step of determining DET-AD, by the device DEV, authentication data for authenticating the device at a server SRV, the step of sending SND-AD, by the device DEV, the authentication data to the server via a secure communication channel, the step of sending SND-IDF-CERT, by the device DEV, a first certificate identifier IDF-CERT-1 to the server SRV, the step of creating CRT-AKP-1, by the device DEV, a first asymmetric key pair, the asymmetric key pair comprising a first public key PBK-1 and a first private key PRK-1, and the step of sending SND-PBK-1, by the device DEV, the first public key PBK-1 to the server SRV. Additionally, the method comprises the step of installing INST-CERT-1, by the device DEV, the first digital certificate CERT-1 on the device DEV.

Figure 7:
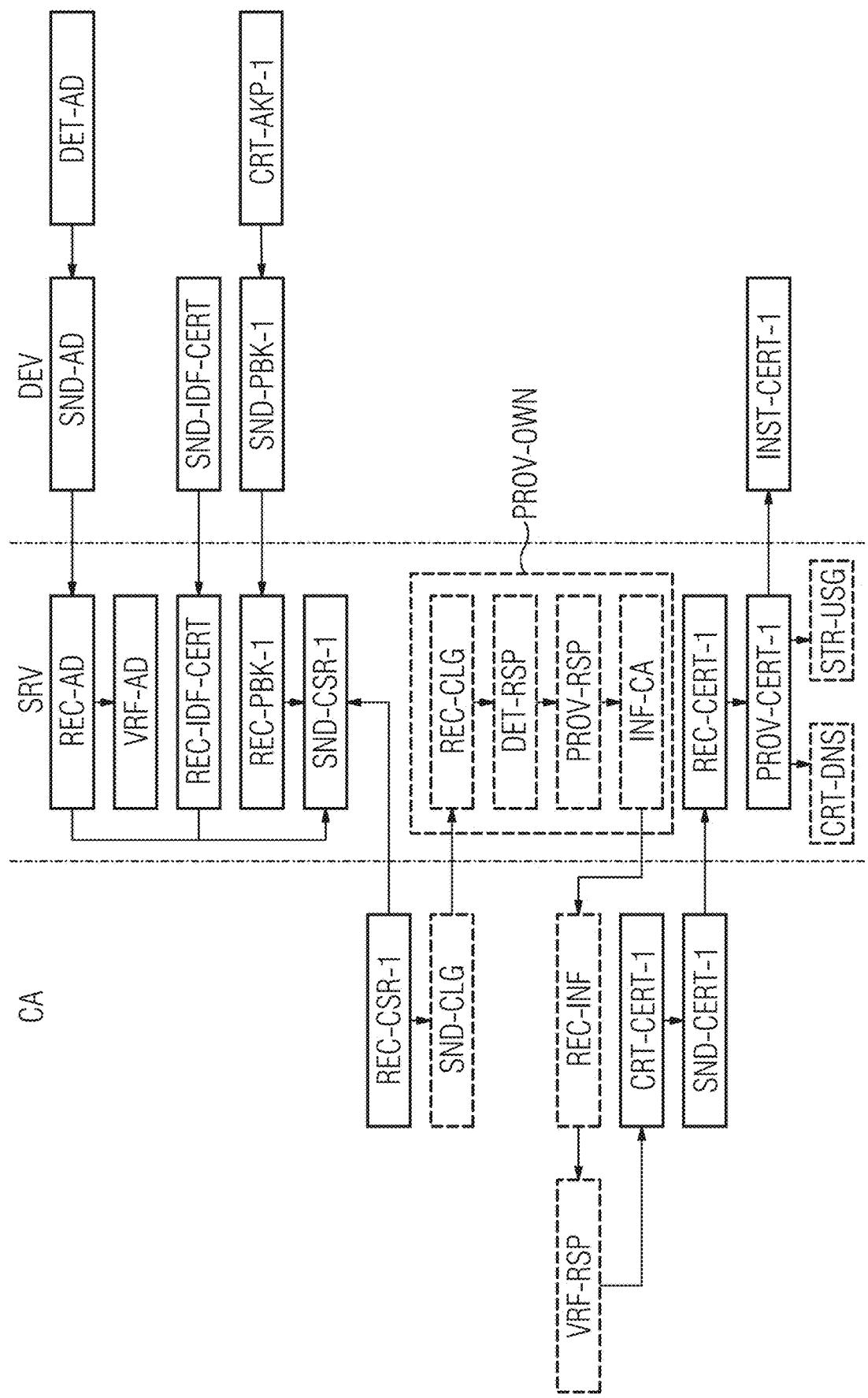

FIG. 7 displays a third process flow diagram of a method for providing a first digital certificate CERT-1 according to an embodiment of the present invention. The third process flow diagram comprises all steps of the first process flow diagram displayed in FIG. 4 and of the second process flow diagram displayed in FIG. 5, those steps and the data structures described with respect to those steps can comprise all advantageous embodiments and features described in FIG. 4 and FIG. 5. Furthermore, the third process flow diagram comprises all steps of the process flow diagram of a method for installing a first digital certificate CERT-1 displayed in FIG. 6, those steps and the data structures described with respect to those steps can comprise all advantageous embodiments and features described in FIG. 6. While FIG. 4 and FIG. 5 describe the steps that are executed by the server SRV, and FIG. 6 describes the corresponding steps that are executed by the device DEV, FIG. 7 also includes the corresponding steps that are executed by the certification authority CA.

In this embodiment, the method furthermore comprises receiving REC-CSR-1, by the certificate authority CA, the first certificate signing request CSR-1. Furthermore, the method comprises the step of receiving REC-INF, by the certification authority CA, information that the response has been provided by the server SRV, the step of verifying VRF-RSP, by the certification authority CA, the response provided by the server SRV, the step of creating CRT-CERT-1 the first digital certificate based on the first public key PBK-1 and the first domain name DN-1, and the step of sending SND-CERT-1, by the certificate authority CA, the first digital certificate CERT-1 to the server SRV.

Figure 8:
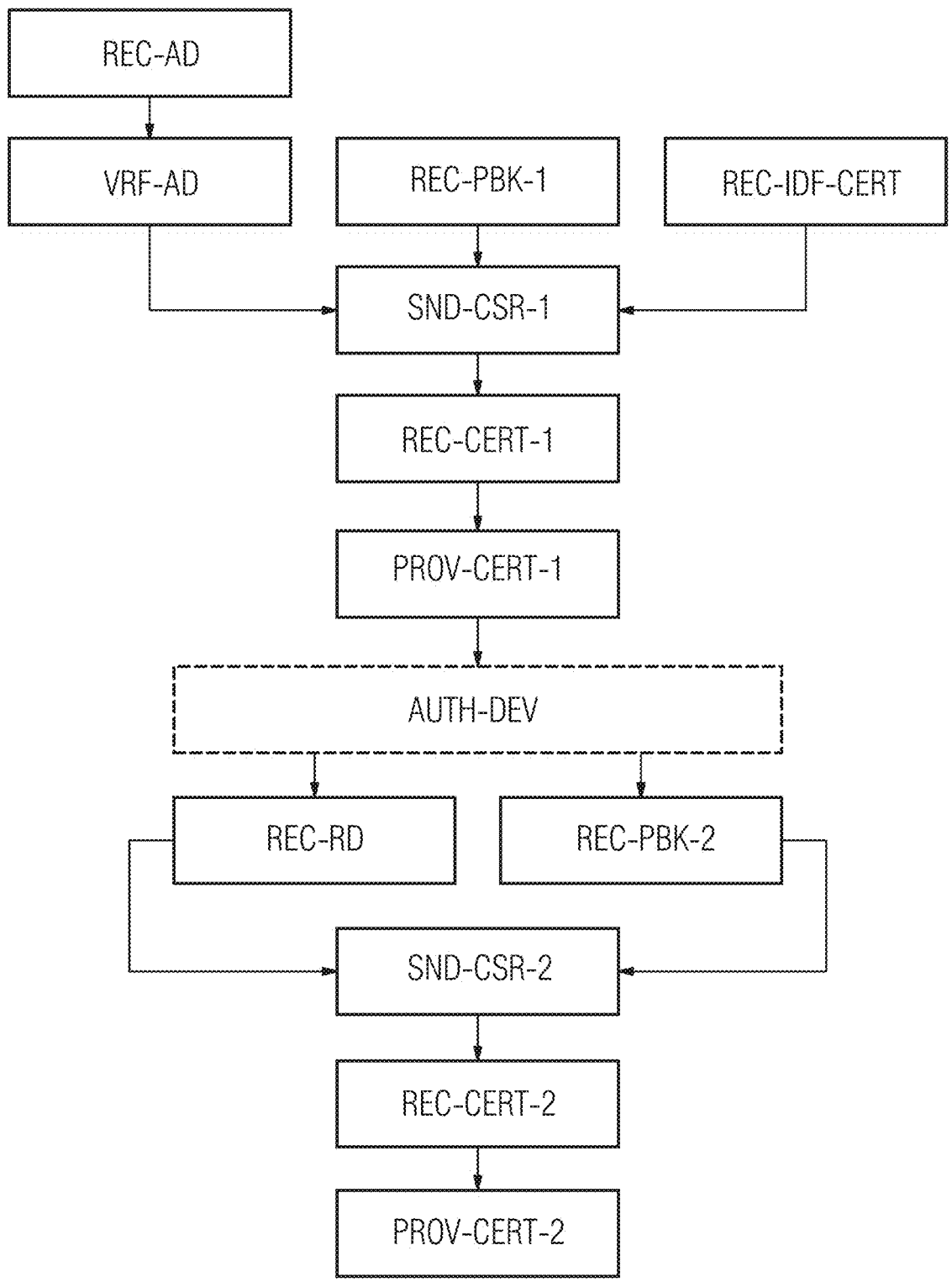

FIG. 8 displays a fourth process flow diagram of a method for providing a first digital certificate CERT-1 according to an embodiment of the present invention. The fourth process flow diagram comprises the steps that already have been described with respect to FIG. 4 and FIG. 5. Those steps and the data structures described with respect to those steps can comprise all advantageous embodiments and features described in FIG. 4 and FIG. 5.

The fourth process flow diagram is an extension of the previously described process flow diagrams that allows to distribute additional digital certificates to clients CLT of the device DEV. If creating the first digital certificate CERT-1 is based on a pre-shared secret being stored at the device DEV, this additional process step can be used for providing second digital certificates CERT-2 to a client CLT of the device DEV based on the client CLT being authenticated at and known to the device DEV. In other words, chain of trust is established between the server SRV and the device DEV on the one hand side, and the device DEV and the client CLT on the other hand side. In particular, this can be used if the client CLT is created by a different manufacturer than the owner of the server SRV. In particular, the method steps described in the following can be executed for several clients CLT of the device DEV.

The fourth process flow diagram furthermore comprises the optional step of authenticating AUTH-DEV the device DEV based on the first digital certificate CERT-1. In the embodiment, authenticating AUTH-DEV the device DEV is based on a challenge-response procedure. For example, this can be based on the TLS (acronym for "Transport Layer Security") handshake protocol or other kinds of handshake protocols.

An additional step is receiving REC-RD registration data RD from the device DEV, wherein the registration data RD comprise a second certificate identifier IDF-CERT-2. In this embodiment the second certificate identifier IDF-CERT-2 comprises the first certificate identifier IDF-CERT-1 and a client identifier CLT-IDF of the client CLT. In an alternative embodiment, the second certificate identifier IDF-CERT-2 can be independent of the first certificate identifier IDF-CERT-1 and the identifier CLT-IDF of the client CLT.

A further step is receiving REC-PBK-1 a second public key PBK-2 created by a client CLT of the device DEV. In particular, the second public key PBK-2 corresponds to a second private key PRK-2, the second public key PBK-2 and the second private key PRK-2 being created by the client CLT as a second asymmetric key pair. In particular, the second private key PRK-2 remains on the client CLT and can be used later on to proof the identity of the client CLT based on the second digital certificate.

An additional step of the fourth process flow diagram is sending SND-CSR-2 a second certificate signing request CSR-2 related to a second domain name DN-2 based on the second public key PBK-2 to the certificate authority CA. Here, the second domain name DN-2 comprises the second certificate identifier IDF-CERT-2. In particular, the second domain name DN-2 can be generated based on the first domain name DN-1 by replacing the first certificate identifier IDF-CERT-1 within the first domain name DN-1 by the second certificate identifier IDF-CERT-2 (wherein the first certificate identifier IDF-CERT-1 and/or the second certificate identifier IDF-CERT-2 can comprise several labels or levels of a domain name, and in particular, wherein the first certificate identifier IDF-CERT-1 and the second certificate identifier IDF-CERT-2 can comprise a different number of labels or levels of a domain name). Examples of corresponding first domain names DN-1 and second domain names DN-2 are displayed in FIG. 16.

After sending SND-CSR-2 the second certificate signing request CSR-2 to the certificate authority, the process flow comprises receiving REC-CERT-2 a second digital certificate CERT-2 from the certificate authority CA. Here the second digital certificate CERT-2 is a wild-card certificate based on the second domain name DN-2 signed by the certificate authority CA. As for the first certificate signing request CSR-1, there can be additional steps for proving PRV-OWN' similar to the steps displayed in FIG. 5 and FIG. 7.

The last step of the displayed flow diagram is providing PROV-CERT-2 the second digital certificate CERT-2 to the device DEV and/or to the client CLT. In particular, the second digital certificate CERT-2 can be sent directly to the device DEV and/or to the client CLT, or the digital certificate CERT-2 can be made available for being downloaded by the device DEV and/or the client CLT.

Figure 9:
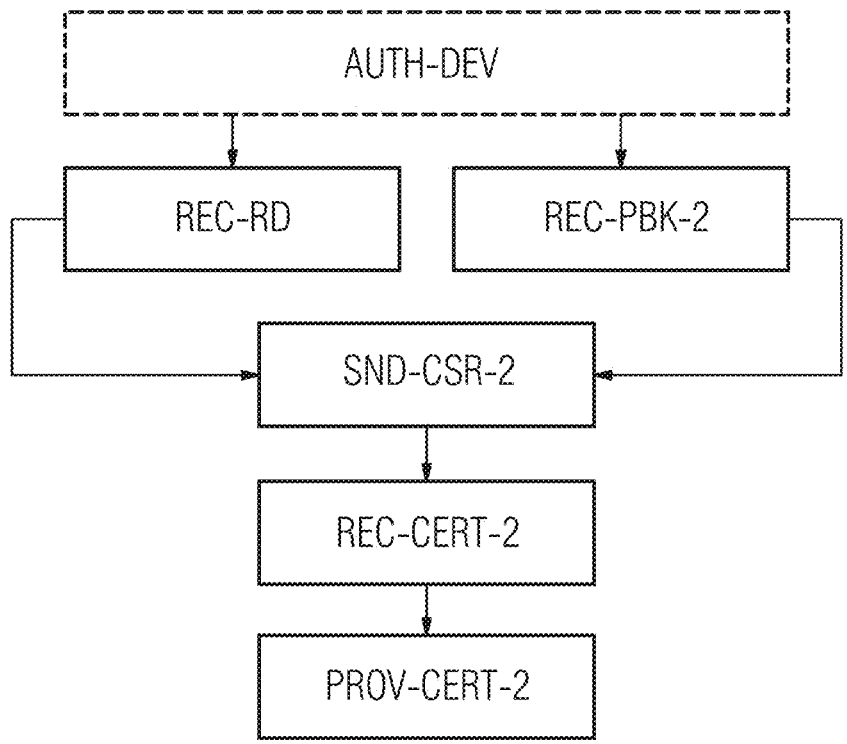

FIG. 9 displays a process flow diagram of a method for providing a second digital certificate CERT-1 according to an embodiment of the present invention. The method comprises the optional step of authenticating AUTH-DEV the device DEV based on the first digital certificate CERT-1, the step of receiving REC-RD registration data RD from the device DEV, the step of receiving REC-PBK-1 a second public key PBK-2 created by a client CLT of the device DEV, the step of sending SND-CSR-2 a second certificate signing request CSR-2 related to a second domain name DN-2 based on the second public key PBK-2 to the certificate authority CA, the step of receiving REC-CERT-2 a second digital certificate CERT-2 from the certificate authority CA and the step of providing PROV-CERT-2 the second digital certificate CERT-2 to the device DEV and/or to the client CLT. All these steps can comprise the advantageous and alternative embodiments and features as described with respect to the fourth process flow diagram of FIG. 8.

In particular, the process flow diagram of the method for providing a second digital certificate CERT-1 corresponds only to the steps for creating and providing the second digital certificate CERT-1 and can be executed independent of the method steps for providing the first digital certificate CERT-1.

Figure 10:
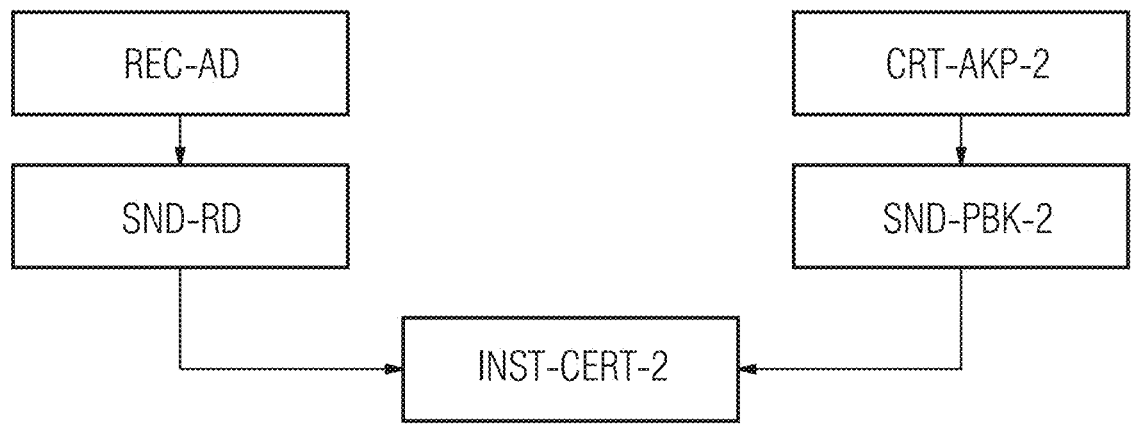

FIG. 10 displays a first process flow diagram of a method for installing a second digital certificate CERT-1 according to an embodiment of the present invention.

According to the displayed embodiment, the method comprises the steps of determining DET-RD, by the client CLT, registration data RD, sending SND-RD, by the client CLT, the registration data RD to the device DEV, creating CRT-AKP-2, by the client CLT, a second asymmetric key pair, the second asymmetric key pair comprising a second public key PBK-1 and a second private key PRK-1, sending SND-PBK-2, by the client CLT, the second public key PBK-2 to the device DEV, and installing INST-CERT-2, by the client CLT, the second digital certificate CERT-2.

Figure 11:
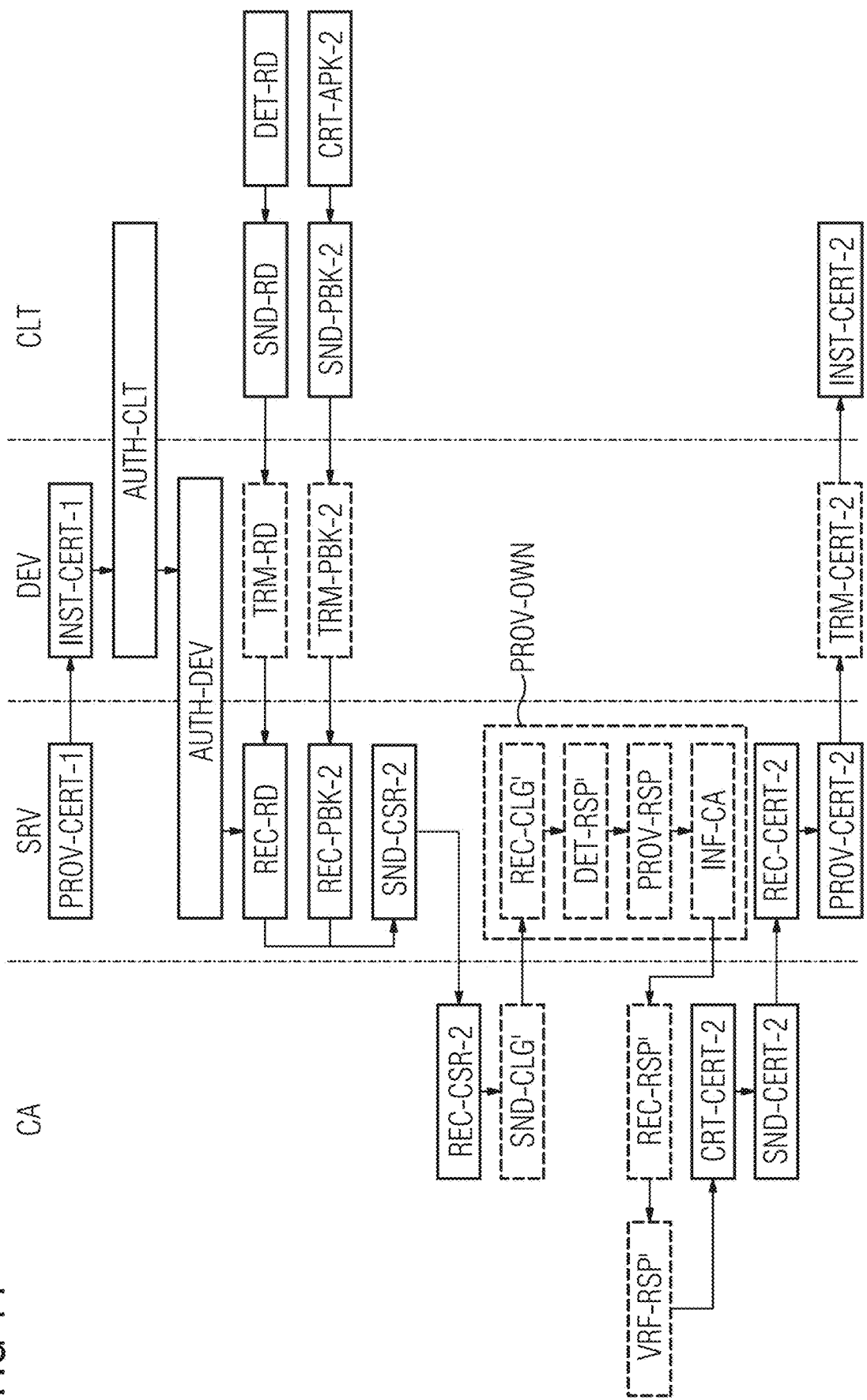

FIG. 11 displays a fifth process flow diagram of a method for providing a first digital certificate CERT-1 according to an embodiment of the present invention. The fifth process flow diagram can be understood as extension of the third process flow diagram in FIG. 7, or as a stand-alone process flow diagram. In the latter case, the steps of providing PROV-CERT-1 the first digital certificate CERT-1 and of installing INST-CERT-1 the first digital certificate CERT-1 are optional steps.

The fifth process flow diagram furthermore comprises steps of the fourth process flow diagram displayed in FIG. 8 and the process flow diagram of a method for installing a second digital certificate CERT-1 of FIG. 10. Those steps can comprise all advantageous features and embodiments as described with respect to the respective figures.

The fifth process flow diagram furthermore comprises the optional steps of transmitting TRM-RD, by the device DEV, registration data RD to the server, transmitting TRM-PBK-2, by the device DEV, a second public key PBK-2 created by a client CLT of the device DEV to the server SRV, and transmitting TRM-CERT-2, by the device DEV, the second digital certificate to the client CLT.

The fifth process flow diagram furthermore comprises the optional step of proving ownership PRV-OWN' of the domain related to the second domain name DN-2. In particular, the step of proving ownership PRV-OWN' is executed via the ACME protocol (acronym for "Automatic Certificate Management Environment" described in RFC 8555, https://tools.ietf.org/html/rfc8555).

In this embodiment, the step of proving ownership PRV-OWN' comprises the substeps of receiving REC-CLG' a challenge from the certificate authority CA, determining DET-RSP' a response related to the challenge, wherein the response demonstrates control over the domain related to the second domain name DN-2, providing PROV-RSP' the response to the certificate authority CA, informing INF-CA' the certificate authority CA that the response has been provided.

In this embodiment, the challenge is to create a file with a given content at a certain location at the server being accessible based on the domain "cald5f5f7ba45.cert.example.com", for example a certain HTML file at "http://cald5f5f7ba45.cert.example.com/authentication.html". Determining the response comprises actually creating this file and making it accessible to the public. Alternatively, The ACME method DNS-01 can be used.

In the displayed embodiment, the step of proving ownership PRV-OWN' is executed after the step of sending SND-CSR-2 the second certificate signing request CSR-2. It is also possible that first the step of proving ownership PRV-OWN' is executed, and afterwards the step of sending SND-CSR-2 the second certificate signing request CSR-2 is executed.

In this embodiment, the method furthermore comprises receiving REC-CSR-2, by the certificate authority CA, the second certificate signing request CSR-2. Furthermore, the method comprises the step of receiving REC-INF', by the certification authority CA, information that the response has been provided by the server SRV, the step of verifying VRF-RSP', by the certification authority CA, the response provided by the server SRV, the step of creating CRT-CERT-2 the second digital certificate CERT-2 based on the second public key PBK-2 and the first domain name DN-2, and the step of sending SND-CERT-2, by the certificate authority CA, the second digital certificate CERT-2 to the server SRV.

Figure 12:
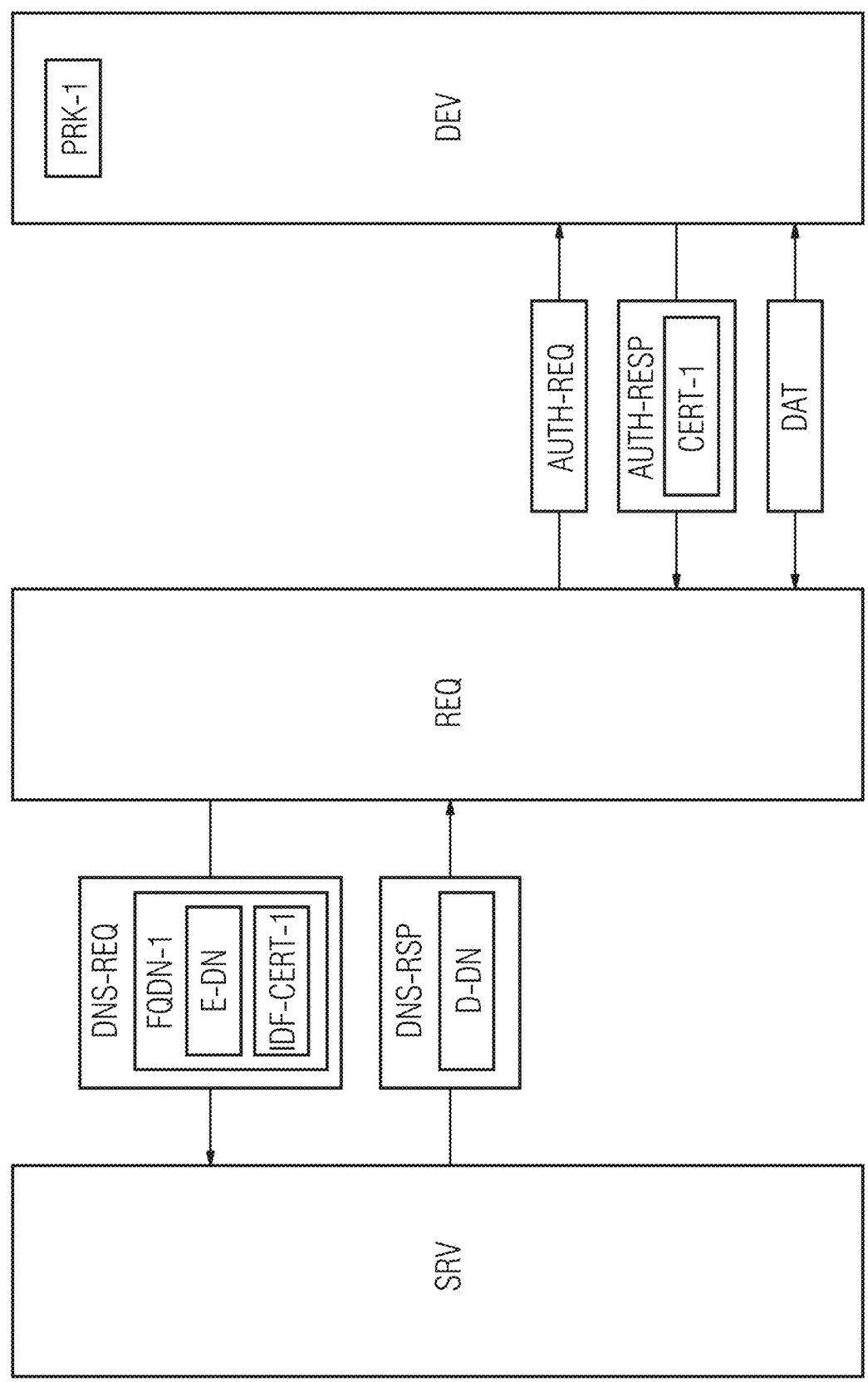

FIG. 12 displays a data flow diagram for a method for providing a DNS response DNS-RSP according to an embodiment of the present invention. In the displayed embodiment, a requester REQ wants to have a DNS response related to a domain name D-DN of a device DEV in order to establish an encrypted communication based on a digital certificate CERT-1 of the device DEV.

In FIG. 12, the data flow is described for an interaction with the device DEV and based on the first digital certificate CERT-1. The same data flow could apply for an interaction with a client CLT based on the second digital certificate CERT-2 without significant changes.

In this embodiment, the requestor REQ creates a DNS request DNS-REQ and sends this DNS request DNS-REQ to the server. The DNS request DNS-REQ is directed to resolving a first fully qualified domain name FQDN-1. The first fully qualified domain name FQDN-1 comprises an encoded domain name E-DN of the device DEV and the first certificate identifier IDF-CERT-1 related to the first digital certificate CERT-1 owned by the device DEV.

After receiving the DNS request DNS-REQ, the server responds with a DNS response DNS-RSP. In this embodiment, the DNS response is a CNAME resource record comprising the decoded domain name D-DN. Examples for encoded domain names E-DN and corresponding decoded domain names D-DN are described with respect to FIG. 17.

Based on the DNS response DNS-RSP, the requestor REQ can established a secured connection between the requestor REQ and the client CLT. In particular, the requestor REQ can send an authentication request AUTH-REQ to the device DEV and receive an authentication response AUTH-RSP from the device DEV, wherein the authentication response AUTH-RSP demonstrates the knowledge of the first private key PRK-1 at the device DEV. An example of this procedure is HTTPS handshake. After authenticating, a secured connection can be established, and data DAT can be exchanged between the requester REQ and the device DEV in an encrypted way.

Figure 13:
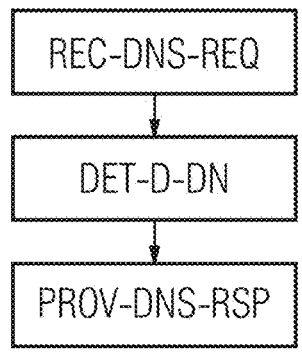

FIG. 13 displays a first process flow diagram of a method for providing a DNS response DNS-RSP according to an embodiment of the present invention.

The first step of the displayed embodiment is receiving REC-DNS-REQ, from a requestor REQ, a DNS request DNS-REQ for resolving a fully qualified domain name FQDN-1, FQDN-2, FQDN-1', FQDN-2'. Here, the fully qualified domain name (FQDN-1, FQDN-2, FQDN-1', FQDN-2') comprises as a label an encoded domain name E-DN. The step of receiving REC-DNS-REQ a DNS request DNS-REQ is executed by a device server SRV, in particular, by an interface SRV.IF of said server.

The second step of the displayed embodiment is determining DET-D-DN a decoded domain name D-DN based on the encoded domain name E-DN. In this embodiment, the step of determining DET-D-DN a decoded domain name D-DN is executed by the server SRV. In particular, the decoded domain name D-DN can be obtained from the encoded domain name E-DN by replacing the special character "- -" or "- - -" by the dot character"." separating different levels in a domain name.

The last step of the displayed embodiment is providing PROV-DNS-RSP, to the requestor REQ, a DNS response DNS-RSP, wherein the DNS response DNS-RSP comprises the decoded domain name D-DN. In particular, the step of providing PROV-DNS-RSP the DNS response DNS-RSP is executed by the server SRV. In particular, the DNS response DNS-RSP corresponds to a CNAME resource record.

Figure 14:
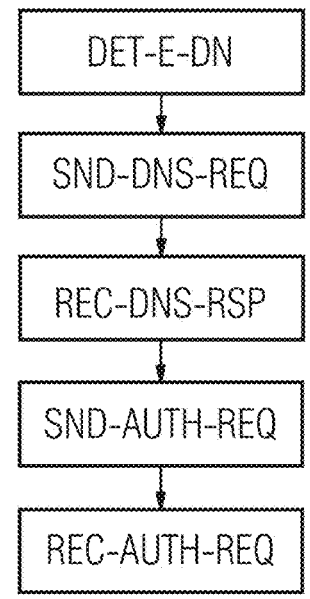

FIG. 14 displays a second process flow diagram of a method for providing a DNS response DNS-RSP according to an embodiment of the present invention.

The second process flow diagram corresponds to the first process flow diagram displayed in FIG. 13, but the second process flow diagram indicates the corresponding step that are executed by the requestor REQ.

Figure 15:
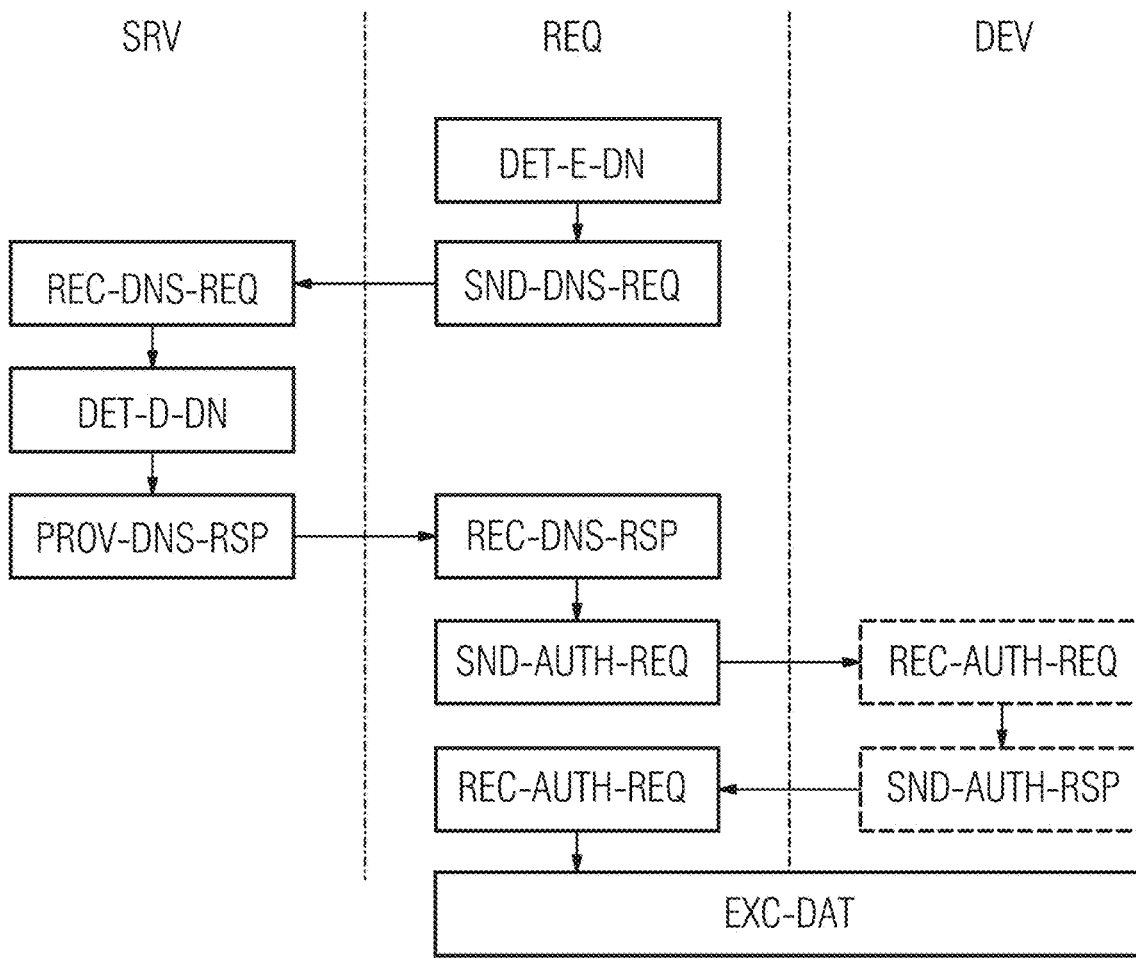

FIG. 15 displays a third process flow diagram of a method for providing a DNS response DNS-RSP according to an embodiment of the present invention. The third process flow diagram is a combination of the first process flow diagram displayed in FIG. 13 and the second process flow diagram displayed in FIG. 14 and additionally comprises steps executed by the device DEV.

Figure 16:
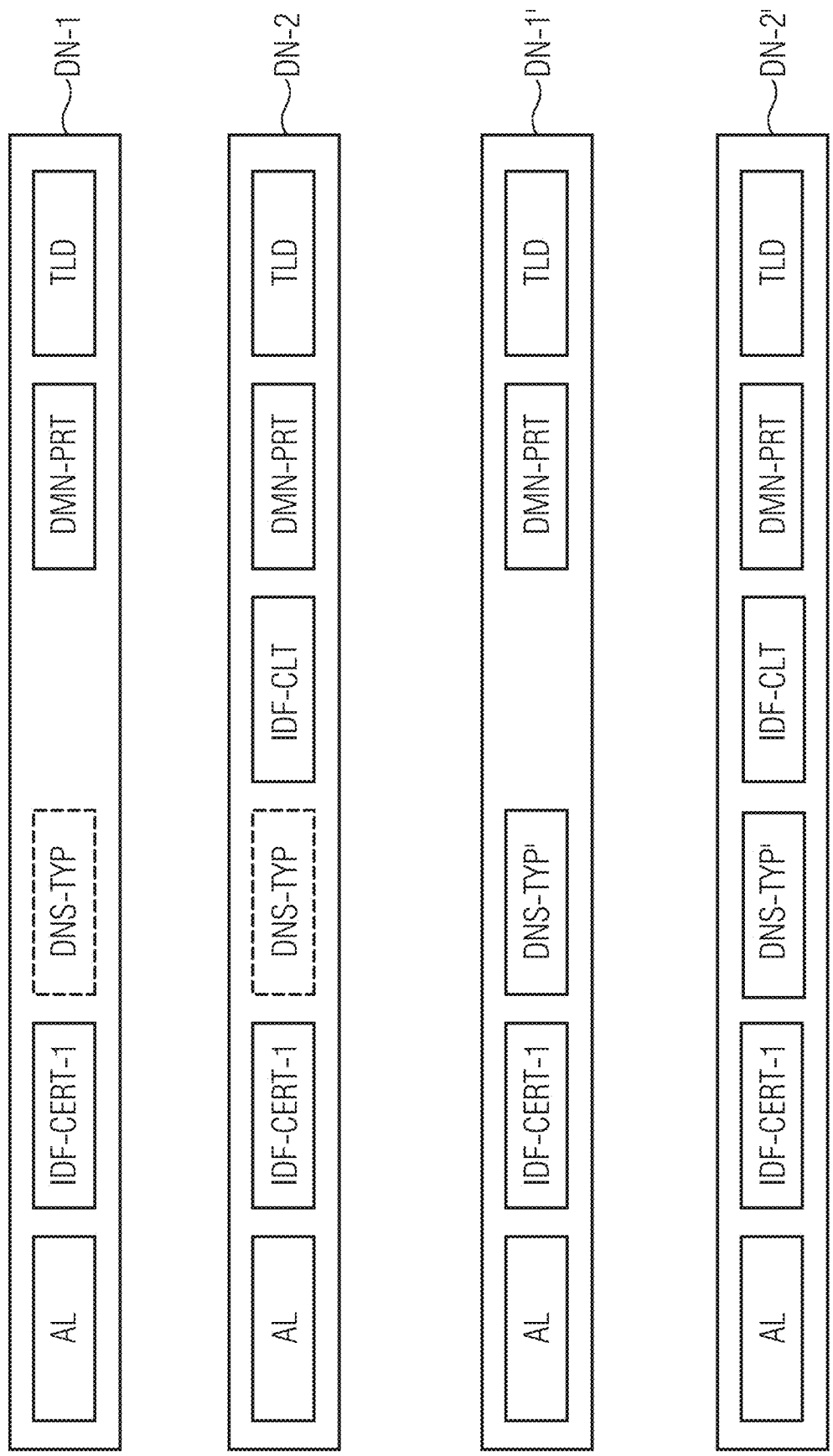

FIG. 16 displays domain names DN-1, DN-2, DN-1', DN-2' used in different embodiments of the present invention. In particular, the domain names DN-1, DN-2, DN-1', DN-2' are wildcard domain names and used as subject within a digital certificate CERT-1, CERT-2, CERT-1', CERT-2'.

In this embodiment, the first domain name DN-1 is equivalent to the string "*.cald5f5f7ba45.cert.example.com". The first domain name DN-1 comprises an asterisk label "*" the first certificate identifier IDF-CERT-1 ("cald5f5f7ba45"), a domain part DMN-PRT ("cert.example") and a top-level domain "com". The first domain name DN-1 does not comprise a DNS type identifier DNS-TYP. In an alternative embodiment, the first domain name DN-1 does comprise an DNS type identifier DNS-TYP ("a", to indicate that DNS requests are to be resolved to an A resource record). In this alternative embodiment, the first domain name DN-1 can be equivalent to the string "*.cald5f5f7ba45.a.cert.example.com" or to the string "*.a.cald5f5f7ba45.cert.example.com", because the order of the first certificate identifier IDF-CERT-1 and the DNS type identifier DNS-TYP can be interchanged. However, it has to be noted that in any case different strings in the first domain name DN-1 would correspond to different first digital certificate CERT-1, since the first domain name DN-1 is normally included as the subject of the first digital certificate CERT-1.

In the displayed embodiment, the second domain name DN-2 is equivalent to the string "*.cald5f5f7ba45.client-abc. cert.example.com". The second domain name DN-2 comprises an asterisk label "*", the first certificate identifier IDF-CERT-1 ("cald5f5f7ba45"), the client identifier IDF-CLT "client-abc", the domain part DMN-PRT ("cert.example") and the top-level domain "com". In particular, the domain part DMN-PRT ("cert.example") and the top-level domain "com" are equivalent with the respective parts of the first domain name DN-1. As the first domain name DN-1, the second domain name DN-2 can optionally comprise the DNS type identifier DNS-TYP. The first certificate identifier IDF-CERT-1 ("cald5f5f7ba45") and the client identifier IDF-CLT "client-abc" form the second certificate identifier IDF-CERT-2.

In an alternative, not displayed embodiment, the second domain name DN-2 can comprise a second certificate identifier IDF-CERT-2 (here "6c15b0f00a08") different form the first certificate identifier IDF-CERT-1 and not comprising the first certificate identifier IDF-CERT-1. In particular, in this alternative, the second domain name DN-2 do not comprise the client identifier CLT-IDF. In this alternative, the second domain name DN-2 is equivalent to the string "*.6c15b0f00a08.cert.example.com".

In this embodiment, the modified first domain name DN-1' is equivalent to the string "*.cald5f5f7ba45.cname. cert.example.com". The first domain name DN-1 comprises an asterisk label "*", the first certificate identifier IDF-CERT-1 ("cald5f5f7ba45"), a domain part DMN-PRT ("cert.example"), a top-level domain "com" and a DNS type identifier DNS-TYP' ("cname", to indicate that DNS requests are to be resolved to an CNAME resource record). In an alternative embodiment, the modified first domain name DN-1 can also be equivalent to the string "*.cname.cald5f5f7ba45.cert. example.com", because the order of the first certificate identifier IDF-CERT-1 and the DNS type identifier DNS-TYP' can be interchanged. However, it has to be noted that in any case different strings as modified first domain name DN-1' would correspond to different modified first digital certificates CERT-1', since the modified first domain name DN-1' is normally included as the subject of the modified first digital certificate CERT-1'.

In the displayed embodiment, the modified second domain name DN-2' is equivalent to the string "*.cald5f5f7ba45.client-abc.cname.cert.example.com". The second domain name DN-2 comprises an asterisk label "*", the first certificate identifier IDF-CERT-1 ("cald5f5f7ba45"), the client identifier IDF-CLT "client-abc", the domain part DMN-PRT ("cert.example") and the top-level domain "com". In particular, the domain part DMN-PRT ("cert.example") and the top-level domain "com" are equivalent with the respective parts of the first domain name DN-1. As the modified first domain name DN-1', the modified second domain name DN-2' comprises the DNS type identifier DNS-TYP'. The first certificate identifier IDF-CERT-1 ("cald5f5f7ba45") and the client identifier IDF-CLT "client-abc" form the second certificate identifier IDF-CERT-2.

In an alternative, not displayed embodiment, the modified second domain name DN-2' can comprise the second certificate identifier IDF-CERT-2 (here "6c15b0f00a08") different form the first certificate identifier IDF-CERT-1 and not comprising the first certificate identifier IDF-CERT-1. In particular, in this alternative, the modified second domain name DN-2' does not comprise the client identifier CLT-IDF. In this alternative, the modified second domain name DN-2' is equivalent to the string "*.6c15b0f00a08.cname. cert.example.com".

Figure 17:
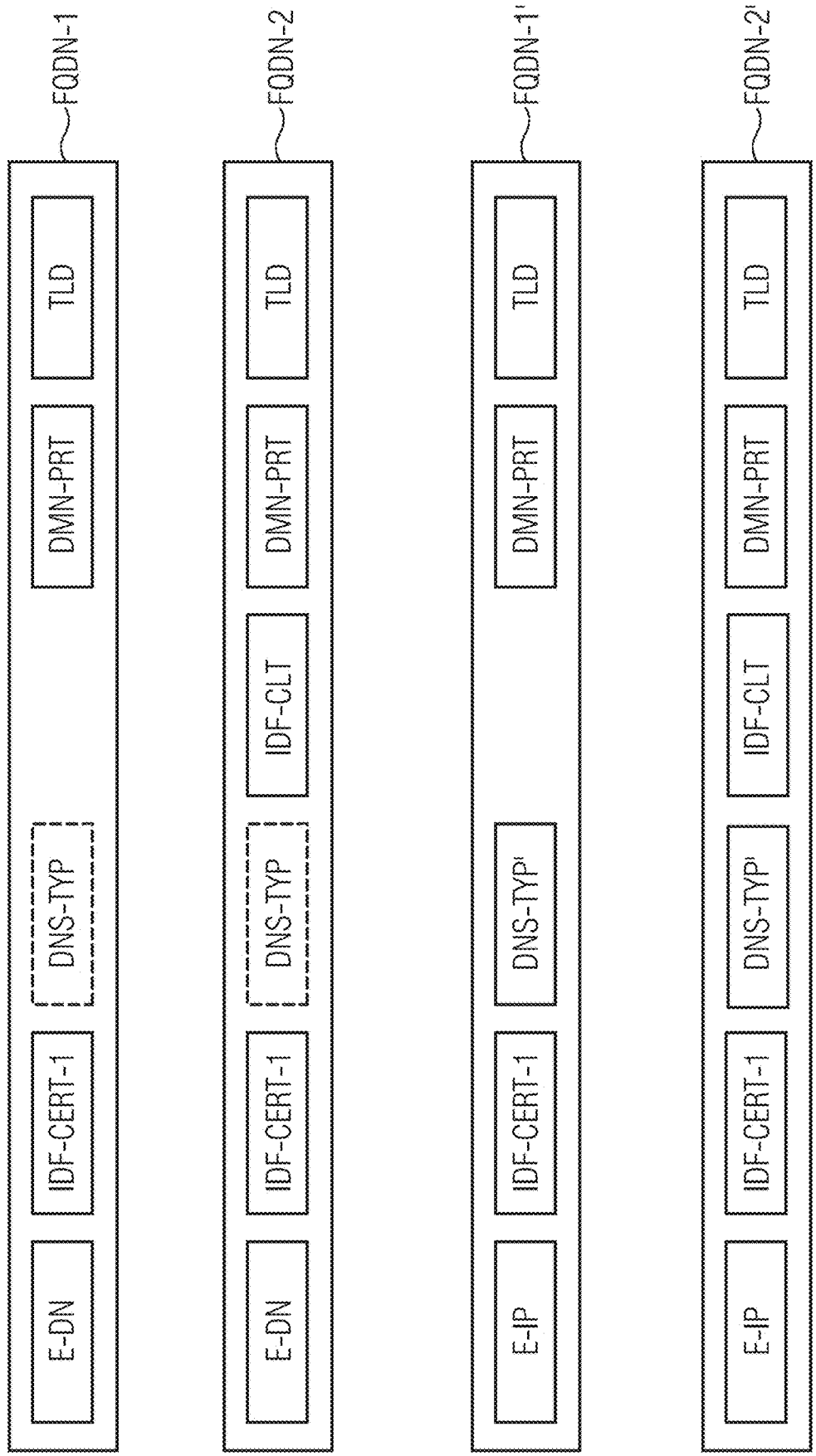

FIG. 17 displays fully qualified domain names FQDN-1, FQDN-2, FQDN-1', FQDN-2' used in different embodiments of the present invention. In particular, the fully qualified domain names FQDN-1, FQDN-2, FQDN-1', FQDN-2' are used in DNS requests.

The first fully qualified domain name FQDN-1 and the second fully qualified domain name FQDN-2 are based on the first domain name DN-1 and the second domain name DN-2, wherein the asterisk label AL of the first domain name DN-1 and the second domain name DN-2 are replaced with an encoded domain name E-DN. The modified first fully qualified domain name FQDN-1' and the modified second fully qualified domain name FQDN-2' are based on the modified first domain name DN-1' and the modified second domain name DN-2', wherein the asterisk label AL of the modified first domain name DN-1' and the modified second domain name DN-2' are replaced with an encoded IP address name E-IP.

An encoded domain name E-DN is based on a corresponding decoded domain name D-DN. In particular, all dot characters "." In the decoded domain name D-DN (which are separating different levels of the decoded domain name D-DN) need to be replaced with a special character or a special sequence of characters (e.g. a double dash "- -" or a triple dash "- - -", so that the encoded domain name E-DN does not span different levels of the corresponding fully qualified domain name FQDN-1, FQDN-2. For example, if the decoded domain name D-DN corresponds to the string "pacs. hospital-abc. com", the encoded domain name E-DN can correspond to the string "pacs- -hospital-abc- -com" or "pacs- - - hospital-abc- - -com".

An encoded IP address E-IP is based on a corresponding decoded IP address D-IP. In particular, all dot characters "." In the decoded IP address D-IP (which are separating different subnets of the decoded IP address D-IP) need to be replaced with a special character or a special sequence of characters (e.g. a single dash "-"), so that the encoded IP address E-IP does not span different levels of the corresponding fully qualified domain name FQDN-1', FQDN-2'. For example, if the decoded IP address D-IP corresponds to the string "192.168.2.1", the encoded IP address E-IP can correspond to the string "192-168-2-1".

In the displayed embodiment, for determining which DNS response type to use, the existence and/or the content of the DNS type identifier DNS-TYP, DNS-TYP' within the fully qualified domain name FQDN-1, FQDN-2, FQDN-1', FQDN-2' is used, wherein the DNS type identifier DNS-TYP, DNS-TYP' is a separate label of the fully qualified domain name FQDN-1, FQDN-2, FQDN-1', FQDN-2'. Alternatively, the DNS type identifier DNS-TYP, DNS-TYP' can also be part of the encoded IP address E-IP and/or the encoded domain name E-DN, in particular, the DNS type identifier DNS-TYP, DNS-TYP' can be part of the lowest level of the fully qualified domain name FQDN-1, FQDN-2, FQDN-1', FQDN-2'. For example, the first two characters of the lowest label can correspond to the characters "ip" to indicate that an A record resource or an AAAA record resource is expected as an response, and the first two characters of the lowest label can correspond to the characters "dn" to indicate that an CNAME record resource is expected as an response.

Figure 18:
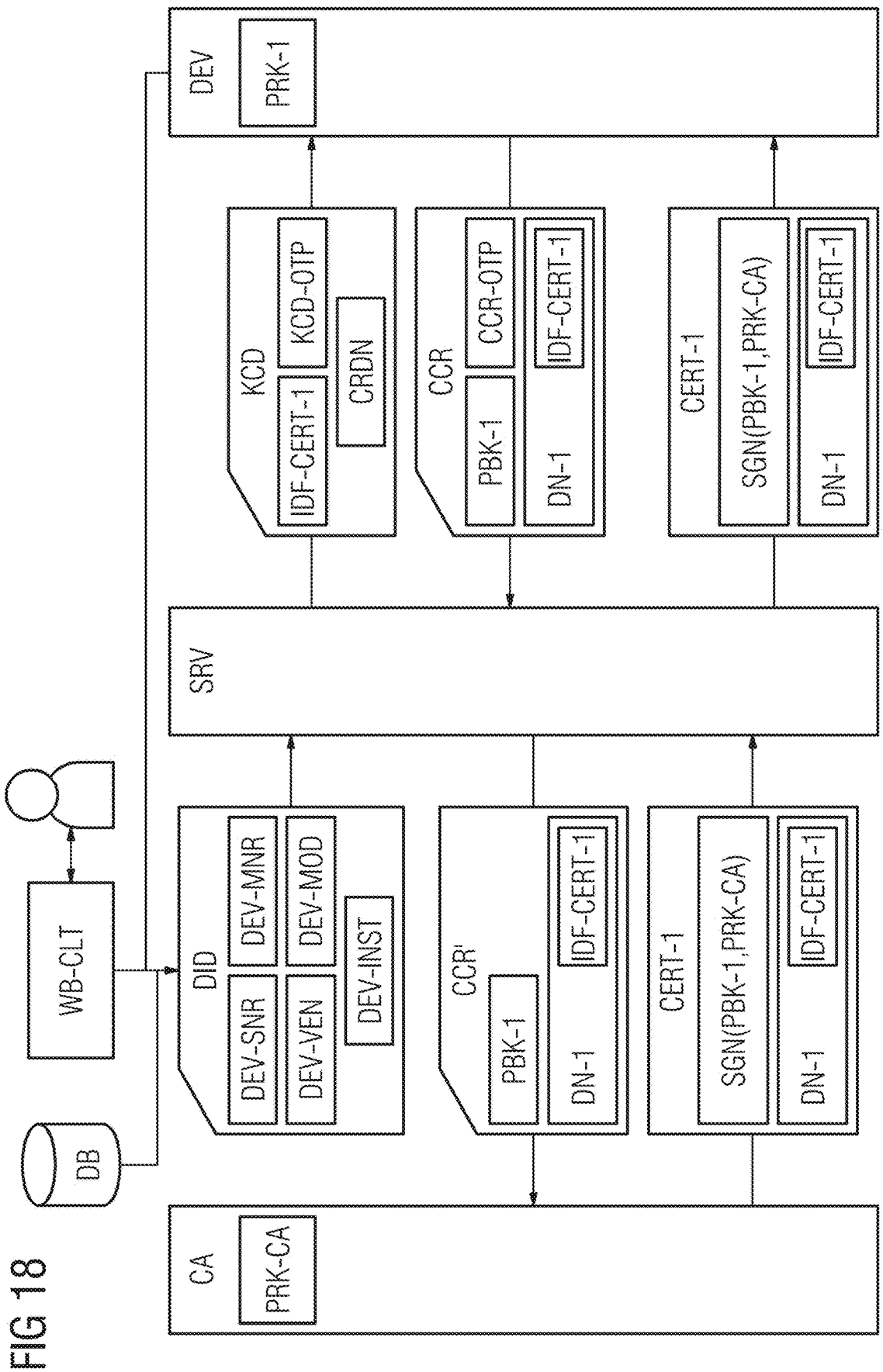

FIG. 18 displays a third data flow diagram for a method for providing a digital certificate CERT-1 and/or for a method for installing a digital certificate CERT-1 according to an embodiment of the present invention. In this embodiment, data is exchanged between a server SRV, a device DEV and a certificate authority CA.

In this embodiment, the server SRV receives device identification dataset DID. Three possibilities for receiving the device identification dataset DID are indicated within the third data flow diagram. The first possibility is that the device identification dataset DID is stored within a database DB accessible by the server SRV. The second possibility is that the device identification dataset DID is entered by a user USR by using a web client WB-CLT. The third possibility is that the device identification dataset DID is transmitted from the device DEV to the server SRV. It is also possible to combine those possibilities for different parts of the device identification dataset DID, e.g., by receiving a serial number DEV-SNR via the web client WB-CLT, and to access the remaining information stored in the database DB based on the serial number DEV-SNR received as index column.

In this embodiment, the device identification dataset DID comprises five components: the serial number DEV-SNR of the device DEV, the material number DEV-MNR of the device DEV, the vendor DEV-VEN of the device DEV, the model name DEV-MOD of the device DEV and the institution identifier DEV-INST related to the device DEV. Alternatively, the device identification dataset DID can only comprise a subset of those five components, and it is also possible that the device identification dataset DID comprises additional elements beyond those five elements.

Furthermore, a key creation dataset KCD is transmitted from the server SRV to the device DEV. Transmitting the key creation dataset KCD can be done by a direct connection between the server SRV and the device DEV, or manually via a removable data storage. In this embodiment, the key creation dataset KCD comprises a certificate identifier IDF-CERT-1, a pre-shared secret KCD-OTP and a certificate request domain name CRDN. In alternative embodiments, the key creation dataset KCD can comprise only a subset of these elements, and the key creation dataset KCD can also comprise additional elements. The certificate identifier IDF-CERT-1 in this embodiment is a hash value based on the device identification dataset DID, for example, the SHA256 hash of the device identification dataset DID. Furthermore, the pre-shared secret KCD-OTP is a random one-time password used to verify responses of the device DEV. In particular, the certificate request domain name CRDN is a domain where a certificate can be requested, in this embodiment, the certificate request domain name CRDN is a domain that can be used to access the server SRV. In particular, the certificate request domain name CRDN can be used in cases where the key creation dataset KCD is transferred manually via a removable data storage, because there it might not be possible for the device DEV to infer a domain of the server SRV.

Furthermore, a certificate creation request CCR is transmitted from the device DEV to the certificate authority CA. In this embodiment, the certificate creation request CCR is transmitted from the device DEV to the server SRV, and a modified certificate creation request CCR' is transmitted from the server SRV to the certificate authority CA. Alternatively, an unmodified certificate creation request CCR can be transmitted from the server SRV to the certificate authority. Alternatively, the certificate creation request can be transmitted directly from the device DEV to the certificate authority CA without being routed through the server SRV.

In this embodiment, the certificate creation request CCR comprises a public key PBK-1. The public key PBK-1 corresponds to a private key PRK-1 being stored within the device DEV. The public key PBK-1 and the private key PRK-1 form an asymmetric key pair. The asymmetric key pair was created by the device DEV. The private key PRK-1 can be used to prove ownership of any digital certificate based on the public key PBK-1. The certificate creation request CCR furthermore comprises a pre-shared secret CCR-OTP, which is identical with the pre-shared secret KCD-OTP within the key creation dataset KCD. The certificate creation request CCR furthermore comprises a domain name DN-1. The domain name DN-1 comprises an asterisk label AL and the certificate identifier IDF-CERT-1. In particular, the domain name DN-1 can have the structure described with respect to the previous figures. In alternative embodiments, the certificate creation request CCR can comprise only a subset of these elements, and the certificate creation request CCR can also comprise additional elements.

In this embodiment, the server SRV modifies the certificate creation request CCR and creates a modified certificate creation request CCR'. Here, the modified certificate creation request CCR' does not comprise the pre-shared secret CCR-OTP anymore, because the check for the pre-shared secret CCR-OTP is performed at the server SRV. The modified certificate creation request CCR' is transmitted to the certificate authority. In particular, the modified certificate creation request CCR' can be a certificate signing request CSR, CSR-1 as described in the previous Figures.

As a response, the certificate authority CA sends a digital certificate CERT-1 to the server SRV. The digital certificate CERT-1 comprises the domain name DN-1, in particular, the domain name DN-1 is the subject of the digital certificate CERT-1. Further-more, the digital certificate CERT-1 comprises a signature SGN (PBK-1, PRK-CA) based on the public key PBK-1 of the device DEV signed with a private key PRK-CA of the certificate authority CA.

The server SRV receives the digital certificate CERT-1 and sends the digital certificate CERT-1 to the device DEV. Alternatively, the certificate authority CA can directly provide the digital certificate CERT-1 to the device DEV.

Figure 19:
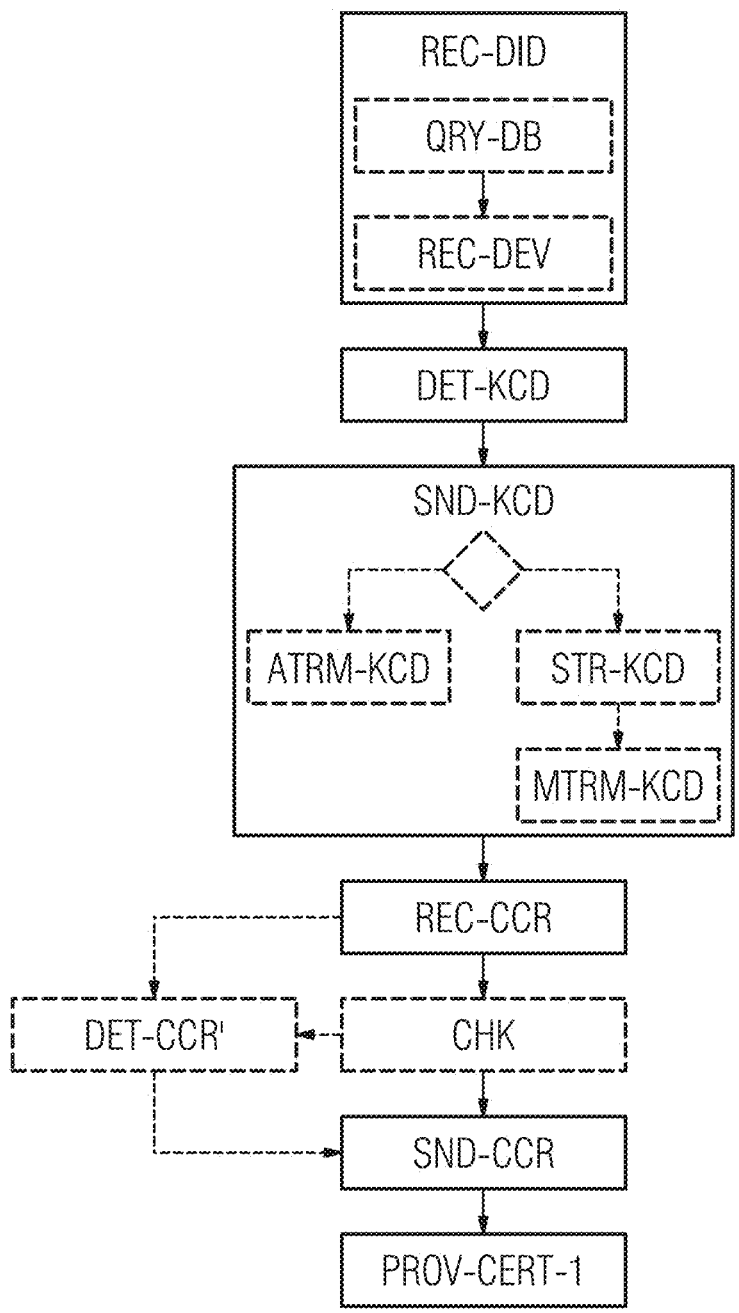

FIG. 19 displays a sixth process flow diagram of a method for providing a digital certificate CERT-1 according to an embodiment of the present invention. The displayed sixth process flow diagram is based on the data flow diagram displayed in FIG. 18. In particular, the device identification dataset DID, the key creation dataset KCD and the certificate creation dataset CCD can have the same advantageous embodiments and features as described with respect to FIG. 18.

The first step of the displayed embodiment is receiving REC-DID a device identification dataset DID, the device identification dataset DID uniquely identifying the device DEV. In this embodiment, this step is executed by an interface SRV.IF of the server SRV.

In the displayed embodiment, the step of receiving REC-DID the device identification dataset DID comprises the optional steps of querying QRY-DB a database DB for information related to the device DEV and receiving REC-DEV the serial number DEV-SNR of the device DEV, the material number DEV-MNR of the device DEV, the vendor name DEV-VEN of the device DEV and/or the model name DEV-MOD of the device DEV from the database DB.

Alternatively or additionally, different elements of the device identification dataset DID can also be entered by a user USR using a web client WB-CLT. Alternatively or additionally, different elements of the device identification dataset DID can also be received directly from the device DEV.

Within the displayed embodiment, the device identification dataset DID also comprises an institution identifier DEV-INST, wherein the institution identifier DEV-INST identifies an institution hosting the device DEV. Here, the institution identifier DEV-INST is determined based on the credentials of an active user USR. In particular, there can be an association between user credentials and institution identifiers DEV-INST stored within the database DB.

A further step of the displayed embodiment is determining DET-KCD a key creation dataset KCD comprising a certificate identifier IDF-CERT-1, the certificate identifier IDF-CERT-1 being based on the device identification dataset DID. In particular, the step of determining DET-KCD the key creation dataset KCD is executed by the computation unit SRV.CU of the server SRV. In this embodiment, the certificate identifier IDF-CERT-1 is a hash based on the device identification dataset DID, for example, SHA256 (DID). In particular, a salted hash function can be used. In order to calculate the hash value, the device identification dataset DID can be stored as a file with a standardized format. For example, the JSON format can be used, which is a text file format. The hash of the device identification dataset DID is then equivalent with the hash of the file within the file system, and/or with the hash of the string representing the text file.

A further step of the displayed embodiment is sending SND-KCD the key creation dataset KCD to the device DEV, in particular, by using the interface SRV.IF of the server SRV. As a response to sending SND-KCD the key creation dataset KCD, the next step of the displayed embodiment is receiving REC-CCR a certificate creation request CCR related to a first domain name DN-1 based on the key creation dataset KCD from the device DEV, in particular, by using the interface SRV.IF of the server SRV. Here the first domain name DN-1 comprises the certificate identifier IDF-CERT-1. In this embodiment, the certificate creation request CCR is an EST ("Enrollment over Secure Transport") request. In particular, the certificate identifier IDF-CERT-1 can be used as username within the EST request, and the pre-shared secret CCR-OTP can be used as password within the EST request.

In this embodiment, sending SND-KCD the key creation dataset KCD to the device DEV can have different optional sub-steps, depending on whether there is a preexisting secure communication channel SCC between the server SRV and the device DEV. If there is a preexisting secure communication channel SCC between the server SRV and the device DEV, the step of sending SND-KCD the key creation dataset comprises automatically transmitting ATRM-KCD the key creation dataset KCD to the device DEV via the secure communication channel SCC. If there is no pre-existing secure communication channel SCC between the server SRV and the device DEV, the step of sending SND-KCD the key creation dataset comprises storing STR-KCD the key creation dataset KCD on a portable storage medium and transmitting MTRM-KCD the key creation dataset KCD to the device DEV via the portable storage medium, in particular, by a user USR.

A further optional step of the displayed method is determining DET-CCR' a modified certificate creation request CCR' based on the certificate creation request CCR. In particular, the modified certificate creation request CCR' does not contain the further pre-shared secret CCR-OTP. A further step of the displayed method is sending SND-CCR the certificate creation request CCR or the modified certificate creation request CCR' to a certificate authority CA. In particular, if the optional step of determining DET-CCR' is present, the modified certificate creation request CCR' is sent to the certificate authority CA. In particular, if the optional step of determining DET-CCR' is not present, the (unmodified) certificate creation request CCR is sent to the certificate authority CA. In particular, the step of sending SND-CCR the certificate creation request CCR or the modified certificate creation request CCR' can comprise all advantageous features and embodiments of the step of sending SND-CSR-1 a first certificate signing request CSR-1 as described with respect to FIG. 4 and FIG. 5.

A further optional step of the displayed method is performing CHK, as response to receiving the certificate creation request CCR, a check whether the further pre-shared secret CCR-OTP of the certificate creation request CCR matches the pre-shared secret KCD-OTP of the key creation dataset KCD. In this case, the later step of sending SND-CCR the certificate creation request CCR or the modified certificate creation request CCR' is only executed in case of a positive check. Advantageously, the certificate creation request CCR comprises the certificate identifier IDF-CERT-1, and performing CHK the check furthermore comprises checking that the further pre-shared secret CCR-OTP of the certificate creation request CCR is related to the certificate identifier IDF-CERT-1. This can be done by comparing with associations stored in a database DB. In particular, the check is only positive if the further pre-shared secret CCR-OTP of the certificate creation request CCR matches the pre-shared secret KCD-OTP of the key creation dataset KCD and if the further pre-shared secret CCR-OTP of the certificate creation request CCR is related to the certificate identifier IDF-CERT-1.

A further optional step of the displayed embodiment is receiving the digital certificate CERT-1 from the certificate authority CA, wherein the digital certificate CERT-1 is a wildcard certificate based on the first domain name DN-1 signed by the certificate authority CA. In particular, this step can comprise all advantageous embodiments and features of the step of receiving REC-CERT-1 the first digital certificate CERT-1 as described with respect to FIG. 4.

A further step of the displayed embodiment is providing PROV-CERT-1 the digital certificate CERT-1 to the device DEV, wherein the digital certificate CERT-1 is a wildcard certificate based on the first domain name DN-1 signed by the certificate authority CA. In particular, this step can comprise all advantageous embodiments and features of the step of providing PROV-CERT-1 the first digital certificate CERT-1 as described with respect to FIG. 4.

Figure 20:
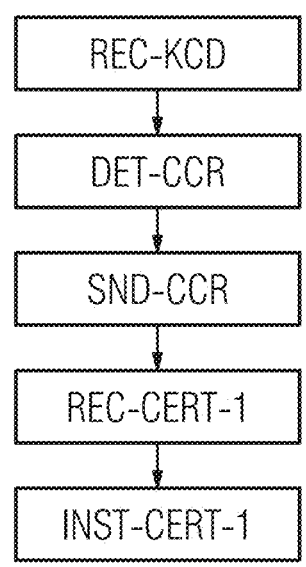

FIG. 20 displays a second process flow diagram of a method for installing a digital certificate CERT-1 according to an embodiment of the present invention. The displayed second process flow diagram is based on the data flow diagram displayed in FIG. 18. In particular, the device identification dataset DID, the key creation dataset KCD and the certificate creation dataset CCD can have the same advantageous embodiments and features as described with respect to FIG. 18. Furthermore, the displayed second process flow diagram is the complementary process executed by the device DEV when the server SRV executes the method as displayed in FIG. 19.

The first step of the displayed method is receiving REC-KCD, from a server SRV, a key creation dataset KCD comprising a certificate identifier IDF-CERT-1, the certificate identifier IDF-CERT-1 being based on a device identification dataset DID being related to the device DEV. In particular, the key creation dataset KCD is received by the interface DEV.IF of the device DEV.

A further step of the displayed method is determining DET-CCR a certificate creation request CCR related to a first domain name DN-1 based on the key creation dataset KCD, wherein the first domain name DN-1 comprises the certificate identifier IDF-CERT-1. The step of determining DET-CCR the certificate creation request CCR is executed by the computation unit DEV.CU of the device DEV. In this embodiment, the certificate creation request CCR is an EST ("Enrollment over Secure Transport") request. In particular, the certificate identifier IDF-CERT-1 can be used as username within the EST request, and a further pre-shared secret CCR-OTP contained in the key creation dataset KCD can be used as password within the EST request.

A further step of the displayed method is sending SND-CCR the certificate creation request CCR to a certificate authority CA via the server SRV. In this embodiment, the certificate creation request CCR is transmitted from the device DEV to the server SRV, and a modified certificate creation request CCR' is transmitted from the server SRV to the certificate authority CA. Alternatively, an unmodified certificate creation request CCR can be transmitted from the server SRV to the certificate authority. Alternatively, the certificate creation request CCR can be transmitted directly from the device DEV to the certificate authority CA without being routed through the server SRV.

A further step of the displayed method is receiving REC-CERT-1 the digital certificate CERT-1, wherein the digital certificate CERT-1 is a wildcard certificate based on the first domain name DN-1 signed by the certificate authority CA, and installing INST-CERT-1 the digital certificate CERT-1. The step of receiving REC-CERT-1 the digital certificate CERT-1 is executed by the interface DEV.IF of the device DEV, and the step of installing INST-CERT-1 the digital certificate CERT-1 is executed by the computation unit DEV.CU of the device DEV.

Figure 21:
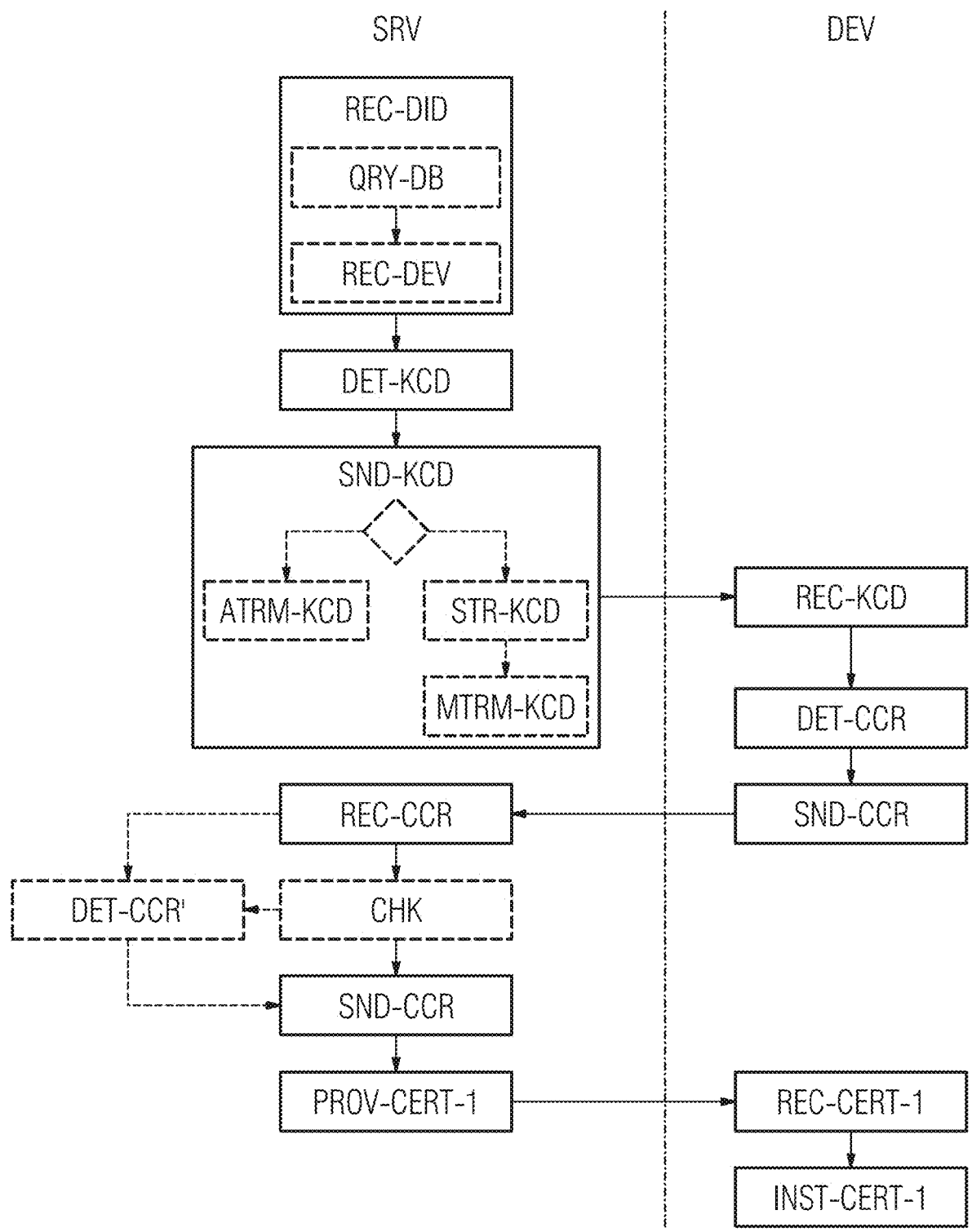

FIG. 21 displays a seventh process flow diagram of a method for providing a digital certificate according to an embodiment of the present invention. The seventh process flow diagram is a combination of the steps executed by the server SRV in the sixth process flow diagram as displayed within and described with respect to FIG. 19, and of the second process flow diagram as displayed within and described with respect to FIG. 20. In particular, the single methods steps can have the same advantageous embodiments and features as described with respect to FIG. 19 and FIG. 20.

Figure 22:
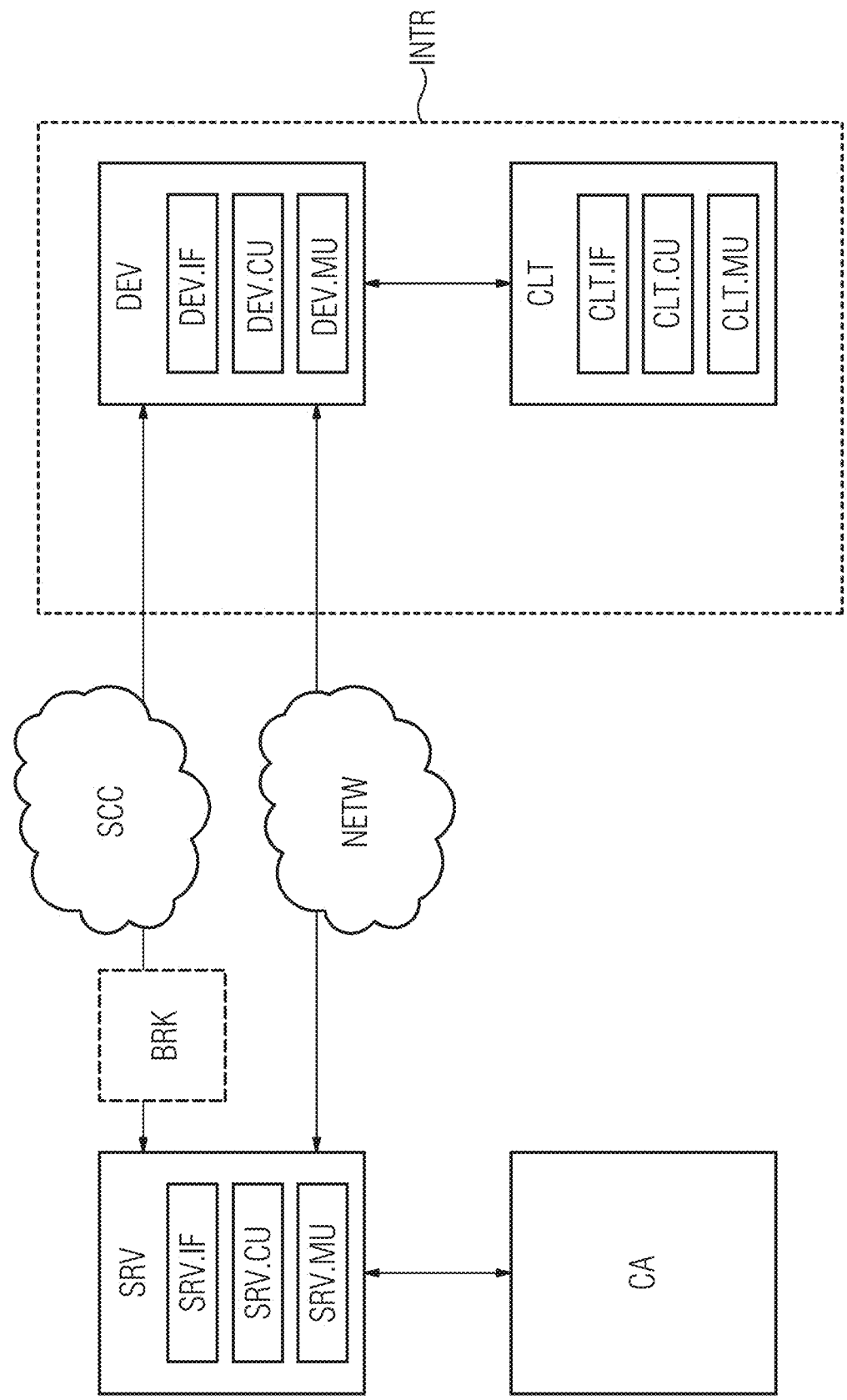
Figure 23:
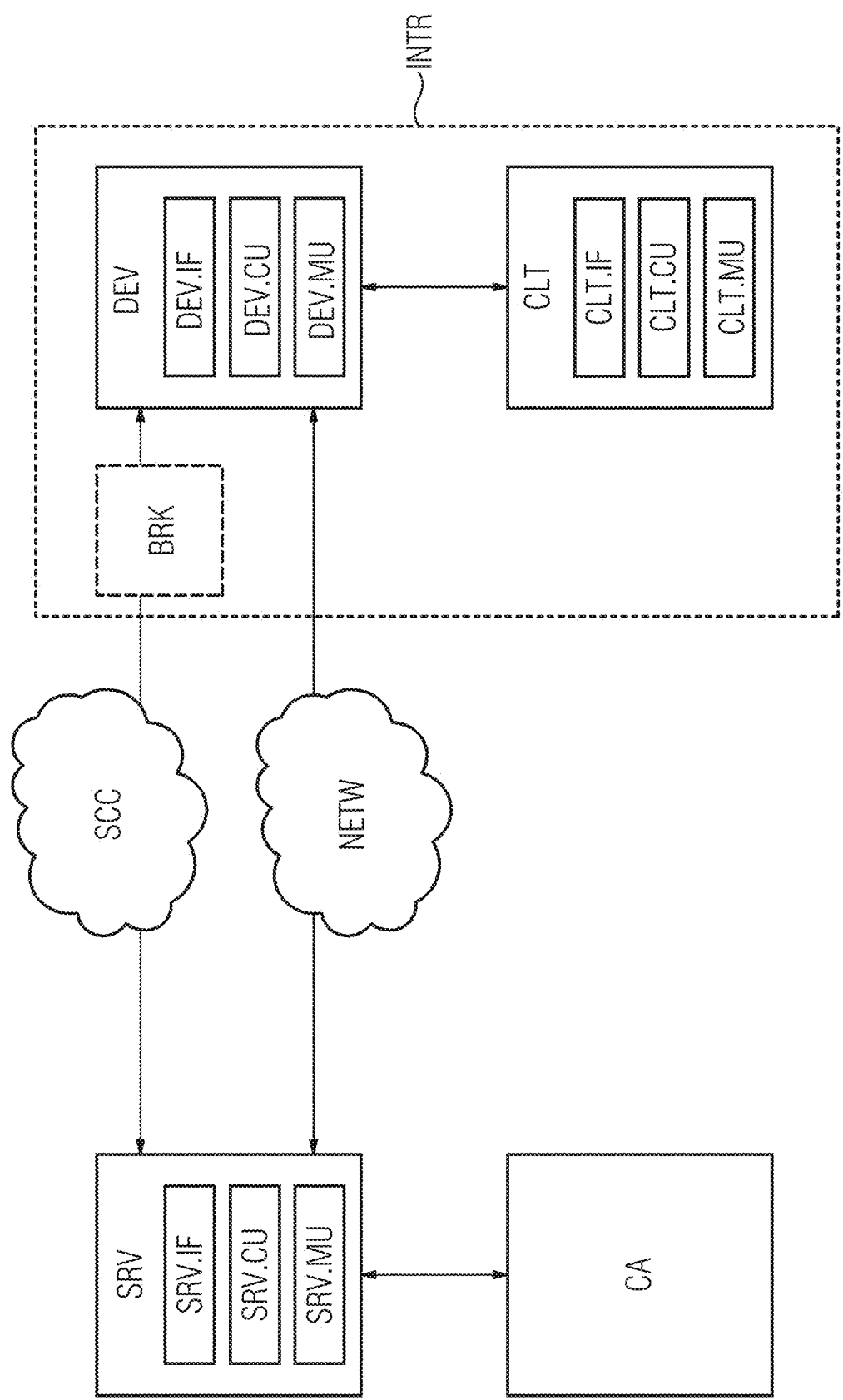
Figure 24:
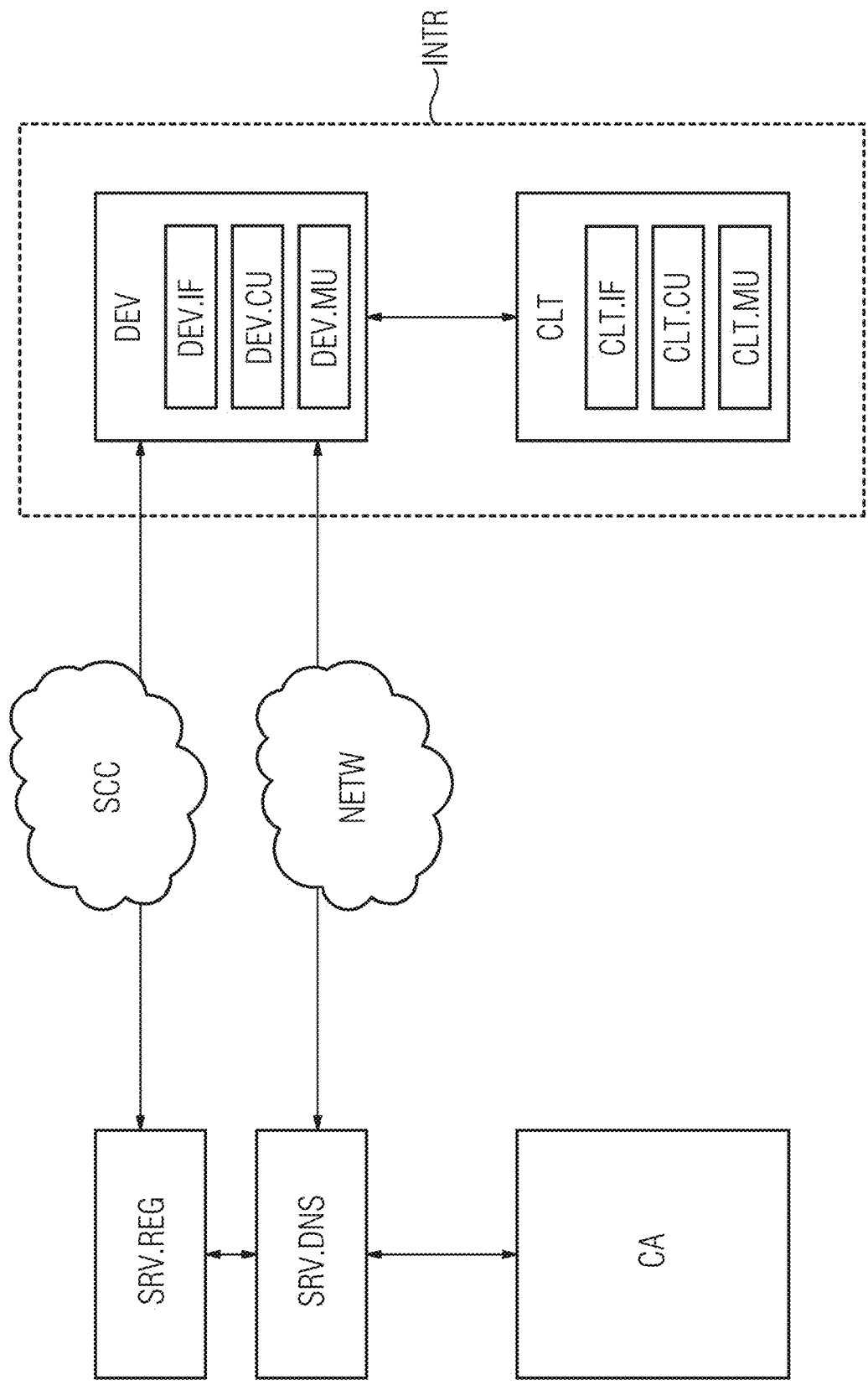

FIG. 22 displays a first embodiment of a server SRV, a device DEV, a certificate authority CA, a requestor REQ and a client CLT according to an embodiment of the present invention. FIG. 23 displays a second embodiment of a server SRV, a device DEV, a certificate authority CA, a requestor REQ and a client CLT according to an embodiment of the present invention. FIG. 24 displays a third embodiment of a server SRV, a device DEV, a certificate authority CA, a requestor REQ and a client CLT according to an embodiment of the present invention.

In the first embodiment displayed in FIG. 22, and in the second embodiment displayed in FIG. 23, the server SRV is configured for executing the methods for providing a first digital certificate CERT-1 according to embodiments of the present invention and/or for executing the methods for providing a DNS response DNS-RSP according to embodiments of the present invention. Optionally, the system displayed in FIG. 22 or FIG. 23 can comprise a broker BRK. The broker BRK can be interpreted as part of the server SRV, and is configured for receiving the authentication data AD and/or for validating the authentication data AD. The broker BRK can be located at the internal network of the server SRV or be a physical part of the server SRV (as displayed in FIG. 22), alternatively the broker BRK can be a device located inside the intranet INTR of the device DEV (as displayed in FIG. 23).

In the third embodiment displayed in FIG. 24, the server SRV comprises two independent entities, a registration server SRV.REG configured for executing the methods for providing a first digital certificate CERT-1 according to embodiments of the present invention, and a DNS server SRV.DNS configured for executing the methods for providing a DNS response DNS-RSP according to embodiments of the present invention.

In the displayed embodiments of FIG. 22, FIG. 23 and FIG. 24, the device DEV, the client CLT and the requestor REQ are located in an intranet network INTR. Alternatively, the requestor REQ can be located outside of the intranet network INTR.

The server SRV, the registration server SRV.REG, the DNS server SRV.DNS the device DEV, the certificate authority CA, the broker BRK, the requestor REQ and/or the client CLT can be a (personal) computer, a workstation, a virtual machine running on host hardware, a microcontroller, or an integrated circuit. In particular, the server SRV, the registration server SRV.REG, the DNS server SRV.DNS the device DEV, the certificate authority CA, the broker BRK and/or the client CLT can be mobile devices, e.g. a smartphone or a tablet. As an alternative, the server SRV, the registration server SRV.REG, the DNS server SRV.DNS the device DEV, the certificate authority CA, the broker BRK and/or the client CLT can be a real or a virtual group of computers (the technical term for a real group of computers is "cluster", the technical term for a virtual group of computers is "cloud").

The device DEV and the server SRV can communicate either via a secure communication channel SCC and/or another network NETW. The network NETW can be realized as a LAN (acronym for "local area network"), in particular a WiFi network, or any other local connection. Alternatively, the network NETW can be the internet. The secure communication channel SCC can be a part of the connection via the network NETW, or it can be separated from the network. In particular, the secure communication channel SCC could be realized as a VPN (acronym for "virtual private network").

Each of the server SRV, the registration server SRV.REG, the DNS server SRV.DNS the device DEV, the certificate authority CA, the broker BRK and/or the client CLT can comprise an interface SRV.IF, DEV.IF, CLT.IF, a computation unit SRV.CU, DEV.CU, CLT.CU and a memory unit SRV.MU, DEV.MU, CLT.MU. An interface SRV.IF, DEV.IF, CLT.IF can be a hardware interface or as a software interface (e.g. PCIBus, USB or Firewire). A computation unit SRV.CU, DEV.CU, CLT.CU can comprise hardware elements and software elements, for example a microprocessor, a CPU (acronym for "central processing unit"), a GPU (acronym for "graphical processing unit"), a field programmable gate array (an acronym is "FPGA") or an ASIC (acronym for "application-specific integrated circuit"). A computation unit SRV.CU, DEV.CU, CLT.CU can be configured for multithreading, i.e. the computation unit can host different computation processes at the same time, executing the either in parallel or switching between active and passive computation processes.

FIG. 25 displays a fourth embodiment of a server SRV, a device DEV and a certificate authority CA according to an embodiment of the present invention. The server SRV and the device DEV are configured for executing the methods for providing a digital certificate CERT-1 and/or for installing a digital certificate CERT-1 according to the present invention and its embodiments. The server SRV and the device DEV can comprise an interface SRV.IF, DEV.IF, a computation unit SRV.CU, DEV.CU, and a memory unit SRV.MU, DEV.MU (not displayed in FIG. 25), as displayed and described with respect to FIG. 22, FIG. 23 and FIG. 24.

In the fourth embodiment, the server SRV is located within a cloud environment CLD and comprises an EST server EST-SRV as a submodule. In particular, the EST server EST-SRV can be a software module installed on the server SRV.

In the fourth embodiment, there is a database DB located within the cloud environment CLD. The database can be a dedicated hardware module, or can be installed as a software module on standard hardware within the cloud environment CLD. The database DB stores information related to different devices DEV, for example, the serial number DEV-SNR and/or the material number DEV-MNR of different devices DEV. The database DB can be accessed from the server SRV to access information related to a certain device DEV.

In the fourth embodiment, there is a service module SVC-MOD located within the cloud environment CLD. The service module SVC-MOD can be a dedicated hardware module, or can be installed as a software module on standard hardware within the cloud environment CLD. The service module SVC-MOD can be used to establish a secure communication channel SCC with devices DEV, e.g., for establishing remote access to a device DEV for maintenance purposes. The service module SVC-MOD can implement a remote desktop protocol for communication with the device DEV, e.g., Apple Remote Desktop Protocol (acronym ARD), PC-over-IP (acronym PCoIP), Remote Desktop Protocol (acronym RDP) and/or X Window System (acronym X11).

In the fourth embodiment, the device DEV is located within an intranet INTR, which can be the intranet INTR of a hospital or a hospital group. In this embodiment, the device DEV comprises a medical modality MDLT, e.g., an imaging modality (e.g., computed tomography apparatus, X-ray apparatus, magnetic resonance imaging apparatus, C-arm apparatus), laboratory diagnostic modality, point-of-care diagnostic modalities, an electrocardiography modality, or a ventilator. In particular, the device DEV can also be identical with the medical modality MDLT, or the device DEV can be a subcomponent of the medical modality MDLT. Furthermore, the device DEV comprises an EST client EST-CLT as a submodule. In particular, the EST client EST-CLT can be a software module installed on the device DEV.

In the fourth embodiment, there is a gateway GTW located within the intranet INTR. The gateway GTW can be a dedicated hardware module, or can be installed as a software module on standard hardware within the intranet INTR. In particular, the gateway GTW is an edge device that can be managed from the server SRV. In particular, the communication between the device DEV and the server SRV can be routed through the gateway GTW.

Within the fourth embodiment, the cloud CLD, the intranet INTR and the certificate authority CA are connected by a network NTW, in particular, by the internet.

Within the fourth embodiment, there is a web client WB-CLT that can be used by a user USR to interact with the server SRV. The web client WB-CLT can be a dedicated hardware module, or can be installed as a software module (e.g., as a browser) on standard hardware of the user USR. For example, the web client WB-CLT can be used for inputting device identification information DID to the server SRV. In particular, the interaction between the web client WB-CLT and the server SRV can be based on the Hypertext Transfer Protocol (acronym HTTP).

CLAUSES

The following clauses are also part of the disclosure:
Clause 1.1: A computer-implemented method for providing, by a server SRV, a first digital certificate CERT-1 to a device DEV, comprising:
receiving REC-AD, from the device DEV, authentication data AD via a secure communication channel SCC, receiving REC-IDF-CERT, from the device DEV, or determining DET-IDF-CERT, by the server SRV, a first certificate identifier IDF-CERT-1, in particular, wherein the first certificate identifier IDF-CERT-1 is a hash value, verifying VRF-AD the authentication data AD, receiving REC-PBK-1, from the device DEV, a first public key PBK-1 created by the device DEV, sending SND-CSR-1 a first certificate signing request CSR-1 related to a first domain name DN-1 based on the first public key PBK-1 to a certificate authority CA, wherein the first domain name DN-1 comprises the certificate identifier IDF-CERT-1, receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA, providing PROV-CERT-1 the first digital certificate CERT-1 to the device DEV.

Clause 1.2: The method according to clause 1.1, wherein the first domain name DN-1 comprises an asterisk label AL.

Clause 1.3: The method according to clause 1.2, wherein the asterisk label AL is the last label of the first domain name DN-1.

Clause 1.4: The method according to clause 1.1 or clause 1.2, wherein the first certificate identifier IDF-CERT-1 is a label of the first domain name DN-1 different from the last label of the first domain name DN-1.

Clause 1.5: The method according to clause 1.4, wherein the first certificate identifier IDF-CERT-1 is the second last label of the first domain name DN-1.

Clause 1.6: The method according to one of the clauses 1.1 to 1.4, furthermore comprising:
proving ownership PRV-OWN of the domain related to the first domain name DN-1.

Clause 1.7: The method according to clause 1.6, wherein the step of proving ownership PRV-OWN comprises at least one of the following substeps:
receiving REC-CLG a challenge from the certificate authority CA,
determining DET-RSP a response related to the challenge, wherein the response demonstrates control over the domain related to the first domain name DN-1,
providing PROV-RSP the response to the certificate authority CA,
informing INF-CA the certificate authority CA that the response has been provided.

Clause 1.8: The method according to one of the clauses 1.1 to 1.7, wherein the authentication data AD comprises a pre-shared secret, in particular, wherein the pre-shared secret is based on at least one of:
a pre-shared one-time password,
a pre-shared key,
a pre-shared hardware token.

Clause 1.9: The method according to one of the clauses 1.1 to 1.8, wherein the authentication data AD comprises a device identifier IDF-DEV of the device DEV, in particular, wherein the device identifier IDF-DEV is based on a material number of the device DEV and/or a serial number of the device DEV.

Clause 1.10: The method according to one of the clauses 1.1 to 1.9, furthermore comprising
sending SND-CSR-1' a modified first certificate signing request CSR-1' related to a modified first domain name DN-1' based on the first public key PBK-1 to the certificate authority CA, wherein the modified first domain name DN-1' comprises the certificate identifier IDF-CERT-1,
receiving REC-CERT-1' a modified first digital certificate CERT-1' from the certificate authority CA, wherein the modified first digital certificate CERT-1' is a wildcard certificate based on the modified first domain name DN-1' and the first public key PBK-1 signed by the certificate authority CA,
providing PROV-CERT-1' the modified first digital certificate CERT-1' to the device DEV.

Clause 1.11: The method according to one of the clauses 1.1 to 1.10, furthermore comprising
creating CRT-DNS a DNS resource record for the first domain name DN-1 and/or for the modified first domain name DN-1'.

Clause 1.12: The method according to one of the clauses 1.1 to 1.11, furthermore comprising
storing STR-USG a usage information related to the authentication data AD to prevent re-using the authentication data AD.

Clause 1.13: The method according to one of the clauses 1.1 to 1.12, furthermore comprising:
optionally, authenticating AUTH-DEV the device DEV based on the first digital certificate CERT-1,
receiving REC-RD registration data RD from the device DEV, wherein the registration data RD comprise a second certificate identifier IDF-CERT-2,
receiving REC-PBK-1 a second public key PBK-2 created by a client CLT of the device DEV,
sending SND-CSR-2 a second certificate signing request CSR-2 related to a second domain name DN-2 based on the second public key PBK-2 to the certificate authority CA, wherein the second domain name DN-2 comprises the second certificate identifier IDF-CERT-2,
receiving REC-CERT-2 a second digital certificate CERT-2 from the certificate authority CA, wherein the second digital certificate CERT-2 is a wildcard certificate based on the second domain name DN-2 signed by the certificate authority CA,
providing PROV-CERT-2 the second digital certificate CERT-2 to the device DEV and/or to the client CLT.

Clause 1.14: The method according to clause 1.13, wherein the second certificate identifier IDF-CERT-2 comprises the first certificate identifier IDF-CERT-1 and a client identifier IDF-CLT related to the client CLT.

Clause 1.15: The method according to clause 1.14, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 1.16: The method according to clause 1.14, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 1.17: The method according to one of the clauses 1.1 to 1.16, furthermore comprising:
creating a DICOM node configuration based on the first digital certificate CERT-1 and/or the second digital certificate CERT-2.

Clause 2.1: A computer-implemented method for installing a first digital certificate CERT-1 on a device DEV, comprising:
- determining DET-AD, by the device DEV, authentication data for authenticating the device DEV at a server SRV
- sending SND-AD, by the device DEV, the authentication data to the server SRV via a secure communication channel SCC,
- receiving REC-AD, by the server SRV, the authentication data AD via the secure communication channel SCC,
- verifying VRF-AD, by the server SRV, the authentication data AD,
- sending SND-IDF-CERT, by the device DEV, a first certificate identifier REC-IDF-CERT to the server SRV, in particular, wherein the first certificate identifier IDF-CERT-1 is a hash value or a random value,
- receiving REC-IDF-CERT, by the server SRV, the first certificate identifier IDF-CERT-1,
- creating CRT-AKP-1, by the device DEV, a first asymmetric key pair, the asymmetric key pair comprising a first public key PBK-1 and a first private key PRK-1,
- sending SND-PBK-1, by the device DEV, the first public key PBK-1 to the server SRV,
- receiving REC-PBK-1, by the server SRV, the first public key PBK-1 created by the device DEV,
- sending SND-CSR-1, by the server SRV a first certificate signing request CSR-1 related to a first domain name DN-1 based on the first public key PBK-1 to a certificate authority CA, wherein the first domain name DN-1 comprises the certificate identifier IDF-CERT-1,
- receiving REC-CERT-1, by the server SRV, the first digital certificate CERT-1 from the certificate authority CA, wherein the first digital certificate CERT-1 is a wildcard certificate based on the first domain name DN-1 and the first public key PBK-1 signed by the certificate authority CA,
- providing PROV-CERT-1, by the server SRV the first digital certificate CERT-1 to the device DEV,
- installing INST-CERT-1, by the device DEV, the first digital certificate CERT-1 on the device DEV.

Clause 2.2: The method according to clause 2.1, wherein the first domain name DN-1 comprises an asterisk label AL.

Clause 2.3: The method according to clause 2.2, wherein the asterisk label AL is the last label of the first domain name DN-1.

Clause 2.4: The method according to clause 2.1 or clause 2.2, wherein the first certificate identifier IDF-CERT-1 is a label of the first domain name DN-1 different from the last label of the first domain name DN-1.

Clause 2.5: The method according to clause 2.4, wherein the first certificate identifier IDF-CERT-1 is the second last label of the first domain name DN-1.

Clause 2.6: The method according to one of the clauses 2.1 to 2.4, furthermore comprising:
- proving ownership PRV-OWN of the domain related to the first domain name DN-1.

Clause 2.7: The method according to clause 2.6, wherein the step of proving ownership PRV-OWN comprises at least one of the following substeps:
- receiving REC-CLG a challenge from the certificate authority CA,
- determining DET-RSP a response related to the challenge, wherein the response demonstrates control over the domain related to the first domain name DN-1,
- providing PROV-RSP the response to the certificate authority CA,
- informing INF-CA the certificate authority CA that the response has been provided.

Clause 2.8: The method according to one of the clauses 2.1 to 2.7, wherein the authentication data AD comprises a pre-shared secret, in particular, wherein the pre-shared secret is based on at least one of:
- a pre-shared one-time password,
- a pre-shared key,
- a pre-shared hardware token.

Clause 2.9: The method according to one of the clauses 2.1 to 2.8, wherein the authentication data AD comprises a device identifier IDF-DEV of the device DEV, in particular, wherein the device identifier IDF-DEV is based on a material number of the device DEV and/or a serial number of the device DEV.

Clause 2.10: The method according to one of the clauses 2.1 to 2.9, furthermore comprising
- sending SND-CSR-1', by the server SRV, a modified first certificate signing request CSR-1' related to a modified first domain name DN-1' based on the first public key PBK-1 to the certificate authority CA, wherein the modified first domain name DN-1' comprises the certificate identifier IDF-CERT-1,
- receiving REC-CERT-1', by the server SRV, a modified first digital certificate CERT-1' from the certificate authority CA, wherein the modified first digital certificate CERT-1' is a wildcard certificate based on the modified first domain name DN-1' and the first public key PBK-1 signed by the certificate authority CA,
- providing PROV-CERT-1', by the server SRV, the modified first digital certificate CERT-1' to the device DEV,
- installing INST-CERT-1, by the device DEV, the modified first digital certificate CERT-1' on the device DEV.

Clause 2.11: The method according to one of the clauses 2.1 to 1.11, furthermore comprising
- creating CRT-DNS a DNS resource record for the first domain name DN-1 and/or for the modified first domain name DN-1'.

Clause 2.12: The method according to one of the clauses 2.1 to 2.11, furthermore comprising
- storing STR-USG a usage information related to the authentication data AD to prevent re-using the authentication data AD.

Clause 2.13: The method according to one of the clauses 2.1 to 2.12, furthermore comprising:
- optionally, authenticating AUTH-DEV the device DEV based on the first digital certificate CERT-1,
- transmitting TRM-RD, by the device DEV, registration data RD to the server SRV, wherein the registration data RD comprise a second certificate identifier IDF-CERT-2,
- receiving REC-RD, by the server SRV, the registration data RD from the device DEV,
- transmitting TRM-PBK-2, by the device DEV, a second public key PBK-2 created by a client CLT of the device DEV to the server SRV,
- receiving REC-PBK-2, by the server SRV, the second public key PBK-2,
- sending SND-CSR-2, by the server SRV, a second certificate signing request CSR-2 related to a second domain name DN-2 based on the second public key PBK-2 to the certificate authority CA, wherein the second domain name DN-2 comprises the second certificate identifier IDF-CERT-2, receiving REC-CERT-2, by the server SRV, a second digital certificate CERT-2 from the certificate authority CA, wherein the second digital certificate CERT-2 is a wildcard certificate based on the second domain name DN-2 signed by the certificate authority CA, providing PROV-CERT-2, by the server SRV, the second digital certificate CERT-2 to the device DEV and/or to the client CLT, optionally comprising transmitting TRM-CERT-2, by the device DEV, the second digital certificate to the client CLT.

Clause 2.14: The method according to clause 2.14, furthermore comprising:

determining DET-RD, by the client CLT, the registration data RD, sending SND-RD, by the client CLT, the registration data RD to the device DEV, creating CRT-AKP-2, by the client CLT, a second asymmetric key pair, the second asymmetric key pair comprising a second public key PBK-1 and a second private key PRK-1, sending SND-PBK-2, by the client CLT, the second public key PBK-2 to the device DEV, installing INST-CERT-2, by the client CLT, the second digital certificate CERT-2.

Clause 2.15: The method according to clause 2.13 or 2.14, wherein the second certificate identifier IDF-CERT-2 comprises the first certificate identifier IDF-CERT-1 and a client identifier IDF-CLT related to the client CLT.

Clause 2.16: The method according to clauses 2.15, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 2.17: The method according to clauses 2.15, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 2.18: The method according to one of the clauses 2.1 to 2.17, furthermore comprising:

creating a DICOM node configuration based on the first digital certificate CERT-1 and/or the second digital certificate CERT-2.

Clause 3.1: A method for providing a second digital certificate to a client CLT and/or a device DEV, comprising:

optionally, authenticating AUTH-DEV the device DEV based on a first digital certificate CERT-1, receiving REC-RD registration data RD from the device DEV, wherein the registration data RD comprise a second certificate identifier IDF-CERT-2, receiving REC-PBK-1 a second public key PBK-2 created by the client CLT of the device DEV, sending SND-CSR-2 a second certificate signing request CSR-2 related to a second domain name DN-2 based on the second public key PBK-2 to a certificate authority CA, wherein the second domain name DN-2 comprises the second certificate identifier IDF-CERT-2, receiving REC-CERT-2 a second digital certificate CERT-2 from the certificate authority CA, wherein the second digital certificate CERT-2 is a wildcard certificate based on the second domain name DN-2 signed by the certificate authority CA, providing PROV-CERT-2 the second digital certificate CERT-2 to the device DEV and/or to the client CLT.

Clause 3.2: The method according to clause 3.1, wherein the second certificate identifier IDF-CERT-2 comprises the first certificate identifier IDF-CERT-1 and a client identifier IDF-CLT related to the client CLT.

Clause 3.3: The method according to clause 3.2, wherein the second domain name DN-2 comprises an asterisk label AL, wherein the asterisk label AL is the last label of the second domain name DN-2, wherein the first certificate identifier IDF-CERT-1 is the second last label of the second domain name DN-2, and wherein the client identifier IDF-CLT is the third last label of the second domain name DN-2.

Clause 3.4: The method according to clause 3.2, wherein the second domain name DN-2 comprises an asterisk label AL, wherein the asterisk label AL is the last label of the second domain name DN-2, wherein the first certificate identifier IDF-CERT-1 is the third last label of the second domain name DN-2, and wherein the client identifier IDF-CLT is the second last label of the second domain name DN-2.

Clause 3.5: The method according to one of the clauses 3.1 to 1.4, furthermore comprising:

creating a DICOM node configuration based on the first digital certificate CERT-1 and/or the second digital certificate CERT-2.

Clause 4.1: A computer-implemented method for providing a DNS response, comprising:

receiving REC-DNS-REQ, from a requestor REQ, an DNS request DNS-REQ for resolving a fully qualified domain name FQDN-1, FQDN-2, FQDN-1', FQDN-2', wherein the fully qualified domain name FQDN-1, FQDN-2, FQDN-1', FQDN-2' comprises as a label an encoded domain name E-DN, determining DET-D-DN a decoded domain name D-DN based on the encoded domain name E-DN, providing PROV-DNS-RSP, to the requestor REQ, a DNS response DNS-RSP, wherein the DNS response DNS-RSP comprises the decoded domain name D-DN.

Clause 4.2: The method according to clause 4.1, wherein the fully qualified domain name FQDN-1, FQDN-2, FQDN-1', FQDN-2' can comprise as alternative to the encoded domain name E-DN an encoded IP address E-IP, furthermore comprising:

determining DET-DNS-TYP, based on the fully qualified domain name FQDN-1, FQDN-2, FQDN-1', FQDN-2', whether DNS request is related to an A resource record, to an AAAA resource record or to a CNAME resource record, in the case that the DNS request is related to a CNAME resource record, determining DET-D-DN the decoded domain name D-DN based on the encoded domain name E-DN, providing PROV-DNS-RSP, to the requestor REQ, the DNS response DNS-RSP, wherein the DNS response DNS-RSP comprises the CNAME resource record, and wherein the DNS response DNS-RSP comprises the decoded domain name D-DN, in the case that the DNS request is related to a A resource record or an AAAA resource record, determining DET-D-IP a decoded IP address D-IP based on the encoded IP address E-IP, providing PROV-DNS-RSP, to the requestor REQ, the DNS response DNS-RSP, wherein the DNS response DNS-RSP comprises the A resource record or the AAAA resource record, and wherein the DNS response DNS-RSP comprises the decoded IP address D-IP.

Clause 4.3: The method according to clause 4.2, wherein the step of determining DET-DNS-TYP, based on the fully qualified domain name FQDN-1, FQDN-2, FQDN-1', FQDN-2', whether the DNS request is related to an A resource record, to an AAAA resource record or to a CNAME resource record, is based on the existence and/or content of a label not being the lowest label of the fully qualified domain name FQDN-1, FQDN-2, FQDN-1', FQDN-2'.

Clause 4.4: The method according to claim 12, wherein the step of determining DET-DNS-TYP, based on the fully qualified domain name FQDN-1, FQDN-2, FQDN-1', FQDN-2', whether the DNS request is related to an A resource record, to an AAAA resource record or to a CNAME resource record, is based on the content of the lowest label of the fully qualified domain name FQDN-1, FQDN-2, FQDN-1', FQDN-2'.

Clause 5.1: A server SRV for providing a first digital certificate CERT-1 to a device DEV, comprising an interface SRV.IF and a computation unit SRV.CU,
  configured for receiving REC-AD, from the device DEV, authentication data AD via a secure communication channel SCC,
  configured for receiving REC-IDF-CERT, from the device DEV, or determining DET-IDF-CERT, by the server SRV, a first certificate identifier IDF-CERT-1, in particular, wherein the first certificate identifier IDF-CERT-1 is a hash value or random value,
  configured for verifying VRF-AD the authentication data AD,
  configured for receiving REC-PBK-1, from the device DEV, a first public key PBK-1 created by the device DEV,
  configured for sending SND-CSR-1 a first certificate signing request CSR-1 related to a first domain name DN-1 based on the first public key PBK-1 to a certificate authority CA,
wherein the first domain name DN-1 comprises the certificate identifier IDF-CERT-1,
and wherein a domain related to the first domain name DN-1 is controlled by the server SRV,
  configured for receiving REC-CERT-1 the first digital certificate CERT-1 from the certificate authority CA, wherein the first digital certificate CERT-1 is a wildcard certificate based on the first domain name DN-1 and the first public key PBK-1 signed by the certificate authority CA,
  configured for providing PROV-CERT-1 the first digital certificate CERT-1 to the device DEV.

Clause 5.2: The server SRV according to clause 5.1, furthermore configured for executing the method according to one of the clauses 1.2 to 1.17.

Clause 5.3: A device DEV comprising an interface DEV.IF and a computation unit DEV.CU, configured for:
  determining DET-AD authentication data for authenticating the device DEV at a server SRV
  optionally sending SND-IDF-CERT a first certificate identifier IDF-CERT-1 to the server SRV, in particular, wherein the first certificate identifier IDF-CERT-1 is a hash value or a random value,
  creating CRT-AKP-1 a first asymmetric key pair, the asymmetric key pair comprising a first public key PBK-1 and a first private key PRK-1,
  sending SND-PBK-1 the first public key PBK-1 to the server SRV,
  receiving and installing INST-CERT-1 a first digital certificate CERT-1 on the device DEV.

Clause 5.4: The device DEV according to clause 5.3, furthermore configured for executing the steps of the methods according to one of the clauses 2.2 to 2.18.

Clause 5.5: A client CLT comprising an interface CLT.IF and a computation unit CLT.CU, the client CLT being a client of a device DEV, configured for
  determining DET-RD registration data RD,
  sending SND-RD the registration data RD to the device DEV,
  creating CRT-AKP-2 a second asymmetric key pair, the second asymmetric key pair comprising a second public key PBK-1 and a second private key PRK-1,
  sending SND-PBK-2 the second public key PBK-2 to the device DEV,
  receiving and installing INST-CERT-2 a second digital certificate CERT-2.

Clause 5.6: A system comprising
  a server SRV according to one of the clauses 5.1 or 5.2,
  a device DEV according to one of the clauses 5.3 or 5.4.

Clause 5.7: The system according to clause 5.6, furthermore comprising:
  a client CLT according to clause 5.5.

Clause 5.8: The system according to clause 5.7, wherein the client CLT and the device DEV are located in an intranet INTR.

Clause 5.9: A DNS server comprising an interface and a computation unit, configured for:
  receiving REC-DNS-REQ, from a requestor REQ, an DNS request DNS-REQ for resolving a fully qualified domain name FQDN-1, FQDN-2, FQDN-1', FQDN-2', wherein the fully qualified domain name FQDN-1, FQDN-2, FQDN-1', FQDN-2' comprises as a label an encoded domain name E-DN,
  determining DET-D-DN a decoded domain name D-DN based on the encoded domain name E-DN,
  providing PROV-DNS-RSP, to the requestor REQ, a DNS response DNS-RSP, wherein the DNS response DNS-RSP comprises the decoded domain name D-DN.

Clause 5.10: The DNS server according to clause 5.9, furthermore configured for executing the method according to one of the clauses 4.2 to 4.4.

Clause 6.1: A computer-implemented method for providing a digital certificate CERT-1 to a device DEV, comprising:
  receiving REC-DID a device identification dataset DID, the device identification dataset DID uniquely identifying the device DEV,
  determining DET-KCD a key creation dataset KCD comprising a certificate identifier IDF-CERT-1, the certificate identifier IDF-CERT-1 being based on the device identification dataset DID,
  sending SND-KCD the key creation dataset KCD to the device DEV,
  receiving REC-KCD a certificate creation request CCR related to a first domain name DN-1 based on the key creation dataset KCD from the device DEV,
wherein the first domain name DN-1 comprises the certificate identifier IDF-CERT-1,
  sending SND-KCD the certificate creation request CCR or a modified certificate creation request CCR' to a certificate authority CA,
  providing PROV-CERT-1 the digital certificate CERT-1 to the device DEV, wherein the digital certificate CERT-1 is a wildcard certificate based on the first domain name DN-1 signed by the certificate authority CA.

Clause 6.2: The method according to clause 6.1, wherein the device identification dataset DID comprises at least one of:
  a serial number DEV-SNR of the device DEV,
  a material number DEV-MNR of the device DEV,
  a vendor name DEV-VEN of the device DEV and/or
  a model name DEV-MOD of the device DEV.

Clause 6.3: The method according to clause 6.2, furthermore comprising:
  querying QRY-DB a database DB for information related to the device DEV,
  receiving REC-DEV the serial number DEV-SNR of the device DEV, the material number DEV-MNR of the device DEV, the vendor name DEV-VEN of the device DEV and/or the model name DEV-MOD of the device DEV from the database DB.

Clause 6.4: The method according to one of the clauses 6.1 to 6.3, wherein the device identification dataset DID comprises an institution identifier DEV-INST, wherein the institution identifier DEV-INST identifies an institution hosting the device DEV, and wherein the institution identifier DEV-INST is determined based on the credentials of an active user.

Clause 6.5: The method according to one of the clauses 6.1 to 6.4, wherein the certificate identifier IDF-CERT-1 is a hash of the device identification dataset DID.

Clause 6.6: The method according to one of the clauses 6.1 to 6.5, wherein the key creation dataset KCD furthermore comprises a pre-shared secret KCD-OTP and/or a certificate request domain name.

Clause 6.7: The method according to one of the clauses 6.1 to 6.6, wherein the pre-shared secret is based on at least one of:
  a pre-shared one-time password,
  a pre-shared key,
  a pre-shared hardware token.

Clause 6.8: The method according to one of the clauses 6.1 to 6.7, wherein the certificate creation request CCR is an Enrollment over Secure Transport, EST, request.

Clause 6.9: The method according to one of the clauses 6.1 to 6.8, wherein the key creation dataset KCD comprises a pre-shared secret KCD-OTP, wherein the certificate creation request CCR comprises a further pre-shared secret CCR-OTP, wherein the method furthermore comprises:
  performing CHK, as response to receiving the certificate creation request CCR, a check whether the further pre-shared secret CCR-OTP of the certificate creation request CCR matches the pre-shared secret KCD-OTP of the key creation dataset KCD,
wherein the step of sending SND-REQ the certificate creation request CCR is only executed in case of a positive check.

Clause 6.10: The method according to clause 6.9, wherein the certificate creation request CCR comprises the certificate identifier IDF-CERT-1, wherein performing the check furthermore comprises checking that the further pre-shared secret CCR-OTP of the certificate creation request CCR is related to the certificate identifier IDF-CERT-1.

Clause 6.11: The method according to one of the clauses 6.1 to 6.10, wherein sending SND-KCD the key creation dataset KCD to the device DEV comprises:
  automatically transmitting ATRM-KCD the key creation dataset KCD to the device DEV via a secure communication channel SCC, or
  storing STR-KCD the key creation dataset KCD on a portable storage medium and transmitting MTRM-KCD the key creation dataset KCD to the device DEV via the portable storage medium.

Clause 6.12: The method according to one of the clauses 6.1 to 6.11, wherein the first domain name DN-1 comprises an asterisk label AL.

Clause 6.13: The method according to clause 6.12, wherein the asterisk label AL is the last label of the first domain name DN-1.

Clause 6.14: The method according to one of the clauses 6.1 to 6.13, wherein the first certificate identifier IDF-CERT-1 is a label of the first domain name DN-1 different from the last label of the first domain name DN-1.

Clause 6.15: The method according to clause 6.14, wherein the first certificate identifier IDF-CERT-1 is the second last label of the first domain name DN-1.

Clause 6.16: The method according to one of the clauses 6.1 to 6.15, furthermore comprising:
  proving ownership PRV-OWN of the domain related to the first domain name DN-1.

Clause 6.17: The method according to clause 6.16, wherein the step of proving ownership PRV-OWN comprises at least one of the following substeps:
  receiving REC-CLG a challenge from the certificate authority CA,
  determining DET-RSP a response related to the challenge, wherein the response demonstrates control over the domain related to the first domain name DN-1,
  providing PROV-RSP the response to the certificate authority CA,
  informing INF-CA the certificate authority CA that the response has been provided.

Clause 6.18: The method according to one of the clauses 6.1 to 6.17, furthermore comprising
  creating CRT-DNS a DNS resource record for the first domain name DN-1.

Clause 6.19: The method according to one of the clauses 6.1 to 6.18, furthermore comprising:
  creating a DICOM node configuration based on the first digital certificate CERT-1 and/or the second digital certificate CERT-2.

Clause 6.20: The method according to one of the clauses 6.1 to 6.19, furthermore comprising:
  determining DET-CCR' a modified certificate creation request CCR' based on the certificate creation request,
  Wherein the modified certificate creation request CCR' is sent to the certificate authority CA.

Clause 6.21: The method according to clause 6.20, wherein the modified certificate creation request CCR' does not contain the pre-shared secret CCR-OTP.

Clause 7.1: A computer-implemented method for installing a digital certificate CERT-1 on a device DEV, comprising:
  receiving REC-KCD, from a server SRV, a key creation dataset KCD comprising a certificate identifier IDF-CERT-1, the certificate identifier IDF-CERT-1 being based on a device identification dataset DID being related to the device DEV,
  determining DET-CCR a certificate creation request CCR related to a first domain name DN-1 based on the key creation dataset KCD,
wherein the first domain name DN-1 comprises the certificate identifier IDF-CERT-1,
  sending SND-CCR the certificate creation request CCR to a certificate authority CA via the server SRV, receiving REC-CERT-1 the digital certificate CERT-1, wherein the digital certificate CERT-1 is a wildcard certificate based on the first domain name DN-1 signed by the certificate authority CA, installing INST-CERT-1 the digital certificate.

Clause 7.2: The method according to clause 7.1, wherein the device identification dataset DID comprises at least one of:
- a serial number DEV-SNR of the device DEV,
- a material number DEV-MNR of the device DEV,
- a vendor name DEV-VEN of the device DEV and/or
- a model name DEV-MOD of the device DEV.

Clause 7.3: The method according to clauses 7.1 or 7.2, wherein the device identification dataset DID comprises an institution identifier DEV-INST, wherein the institution identifier DEV-INST identifies an institution hosting the device DEV, and wherein the institution identifier DEV-INST is determined based on the credentials of an active user.

Clause 7.4: The method according to one of the clauses 7.1 to 7.3, wherein the certificate identifier IDF-CERT-1 is a hash of the device identification dataset DID.

Clause 7.5: The method according to one of the clauses 7.1 to 7.4, wherein the key creation dataset KCD furthermore comprises a pre-shared secret KCD-OTP and/or a certificate request domain name CRDN.

Clause 7.6: The method according to one of the clauses 7.1 to 7.5, wherein the key creation dataset KCD furthermore comprises a pre-shared secret KCD-OTP, wherein the pre-shared secret KCD-OTP is based on at least one of:
- a pre-shared one-time password,
- a pre-shared key,
- a pre-shared hardware token.

Clause 7.7: The method according to one of the clauses 7.1 to 7.6, wherein the certificate creation request CCR is an Enrollment over Secure Transport, EST, request.

Clause 7.8: The method according to one of the clauses 7.1 to 7.7, wherein receiving REC-KCD the key creation dataset KCD from the server SRV comprises:
- automatically receiving the key creation dataset KCD from the server SRV via a secure communication channel SCC, or
- storing STR-KCD the key creation dataset KCD on a portable storage medium and receiving the key creation dataset KCD from the server SRV via the portable storage medium.

Clause 7.9: The method according to one of the clauses 7.1 to 7.8, wherein the first domain name DN-1 comprises an asterisk label AL.

Clause 7.10: The method according to clause 7.9, wherein the asterisk label AL is the last label of the first domain name DN-1.

Clause 7.11: The method according to one of the clauses 7.1 to 7.10, wherein the first certificate identifier IDF-CERT-1 is a label of the first domain name DN-1 different from the last label of the first domain name DN-1.

Clause 7.12: The method according to clause 7.11, wherein the first certificate identifier IDF-CERT-1 is the second last label of the first domain name DN-1.

Clause 7.13: The method according to one of the clauses 7.1 to 7.12, furthermore comprising:
- creating a DICOM node configuration based on the first digital certificate CERT-1.

Clause 8.1. A server SRV configured to for providing a digital certificate CERT-1 to a device DEV, configured to:

receiving REC-DID a device identification dataset DID, the device identification dataset DID uniquely identifying the device DEV, determining DET-KCD a key creation dataset KCD comprising a certificate identifier IDF-CERT-1, the certificate identifier IDF-CERT-1 being based on the device identification dataset DID, sending SND-KCD the key creation dataset KCD to the device DEV, receiving REC-KCD a certificate creation request CCR related to a first domain name DN-1 based on the key creation dataset KCD from the device DEV, wherein the first domain name DN-1 comprises the certificate identifier IDF-CERT-1, sending SND-KCD the certificate creation request CCR to a certificate authority CA, providing PROV-CERT-1 the digital certificate CERT-1 to the device DEV, wherein the digital certificate CERT-1 is a wildcard certificate based on the first domain name DN-1 signed by the certificate authority CA.

Clause 8.2: The server SRV according to clause 8.1, furthermore configured to execute the method according to one of the clauses 6.2 to 6.19.

Clause 9.1. A device DEV for installing a digital certificate CERT-1, configured to:

receiving REC-KCD, from a server SRV, a key creation dataset KCD comprising a certificate identifier IDF-CERT-1, the certificate identifier IDF-CERT-1 being based on a device identification dataset DID being related to the device DEV, determining DET-CCR a certificate creation request CCR related to a first domain name DN-1 based on the key creation dataset KCD, wherein the first domain name DN-1 comprises the certificate identifier IDF-CERT-1, sending SND-CCR the certificate creation request CCR to a certificate authority CA via the server SRV, receiving REC-CERT-1 the digital certificate CERT-1, wherein the digital certificate CERT-1 is a wildcard certificate based on the first domain name DN-1 signed by the certificate authority CA, installing INST-CERT-1 the digital certificate.

Clause 9.2: The device DEV according to clause 9.1, furthermore configured to execute the method according to one of the clauses 7.2 to 7.13.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Wherever not already described explicitly, individual embodiments, or their individual aspects and features, can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

What is claimed is:

1. A computer-implemented method for providing a digital certificate to a device, the computer-implemented method comprising:
   receiving a device identification dataset at a server, the device identification dataset uniquely identifying the device;
   determining a key creation dataset including a certificate identifier and a pre-shared secret at the server, the certificate identifier being a hash of the device identification dataset, a processor of the device being configured to initiate creation of the digital certificate based on the key creation dataset, and the pre-shared secret being installed on the device during manufacturing of the device;
   sending the key creation dataset from the server to the device;
   receiving a certificate creation request related to a first domain name based on the key creation dataset at the server from the device, the first domain name including the certificate identifier;
   sending the certificate creation request or a modified certificate creation request from the server to a certificate authority; and
   providing the digital certificate from the server to the device, the digital certificate being a wildcard certificate based on the first domain name and the wildcard certificate being signed by the certificate authority.

2. The computer-implemented method according to claim 1, wherein the device identification dataset comprises at least one of:
   a serial number of the device,
   a material number of the device,
   a vendor name of the device, or
   a model name of the device.

3. The computer-implemented method according to claim 2, further comprising:
   querying a database for information related to the device; and
   receiving, from the database, at least one of the serial number of the device, the material number of the device, the vendor name of the device or the model name of the device.

4. The computer-implemented method according to claim 1, wherein the device identification dataset comprises:
   an institution identifier, wherein
      the institution identifier identifies an institution hosting the device, and
      the institution identifier is determined based on credentials of an active user.

5. The computer-implemented method according to claim 1, wherein the key creation dataset further includes a certificate request domain name.

6. The computer-implemented method according to claim 5, wherein the certificate request domain name corresponds to at least one of a uniform resource locator, a uniform resource identifier, or an internet protocol address.

7. The computer-implemented method according to claim 5, wherein the certificate request domain name is a domain name used to request the digital certificate.

8. The computer-implemented method according to claim 1, wherein the certificate creation request is an Enrollment over Secure Transport request.

9. The computer-implemented method according to claim 1, wherein
   the certificate creation request includes a further pre-shared secret;
   the method further includes performing, in response to receiving the certificate creation request, a check whether the further pre-shared secret of the certificate creation request matches the pre-shared secret of the key creation dataset; and
   the sending of the certificate creation request is executed only in case of the further pre-shared secret of the certificate creation request matching the pre-shared secret of the key creation dataset.

10. The computer-implemented method according to claim 9, wherein
    the certificate creation request includes the certificate identifier; and
    the performing of the check further includes checking that the further pre-shared secret of the certificate creation request is related to the certificate identifier.

11. The computer-implemented method according to claim 1, wherein the sending the key creation dataset to the device comprises:
    automatically transmitting the key creation dataset to the device via a secure communication channel, or
    storing the key creation dataset on a portable storage medium and transmitting the key creation dataset to the device via the portable storage medium.

12. A computer-implemented method for installing a digital certificate on a device, the computer-implemented method comprising:
    receiving, from a server, a key creation dataset including a certificate identifier and a pre-shared secret, the certificate identifier being a hash of a device identification dataset related to the device and the pre-shared secret being installed on the device during manufacturing of the device;
    determining a certificate creation request related to a first domain name based on the key creation dataset, the first domain name including the certificate identifier and a processor of the device being configured to initiate creation of the digital certificate based on the key creation dataset;
    sending the certificate creation request to a certificate authority via the server;
    receiving the digital certificate, the digital certificate being a wildcard certificate based on the first domain name and the wildcard certificate being signed by the certificate authority; and
    installing the digital certificate.

13. A server configured to provide a digital certificate to a device, the server comprising:
    a memory storing computer-executable instructions; and
    at least one processor configured to execute the computer-executable instructions to cause the server to
       receive a device identification dataset, the device identification dataset uniquely identifying the device,
       determine a key creation dataset including a certificate identifier and a pre-shared secret, the certificate identifier being a hash of the device identification dataset, a processor of the device being configured to initiate creation of the digital certificate based on the key creation dataset, and the pre-shared secret being installed on the device during manufacturing of the device, send the key creation dataset to the device, receive a certificate creation request related to a first domain name based on the key creation dataset from the device, the first domain name including the certificate identifier, send the certificate creation request to a certificate authority, and provide the digital certificate to the device, the digital certificate being a wildcard certificate based on the first domain name and the wildcard certificate being signed by the certificate authority.

14. A device for installing a digital certificate, the device comprising:

a memory storing computer-executable instructions; and at least one processor configured to execute the computer-executable instructions to cause the device to receive, from a server, a key creation dataset including a certificate identifier and a pre-shared secret, the certificate identifier being a hash of a device identification dataset related to the device and the pre-shared secret being installed on the device during manufacturing of the device, determine a certificate creation request related to a first domain name based on the key creation dataset, the first domain name including the certificate identifier and a processor of the device being configured to initiate creation of the digital certificate based on the key creation dataset, send the certificate creation request to a certificate authority via the server, receive the digital certificate, the digital certificate being a wildcard certificate based on the first domain name and the wildcard certificate being signed by the certificate authority, and install the digital certificate.

15. A non-transitory computer program product storing instructions which, when executed by a computer, cause the computer to carry out the computer-implemented method of claim 1.

16. A non-transitory computer-readable storage medium storing instructions which, when executed by a computer, cause the computer to carry out the computer-implemented method of claim 1.

17. The computer-implemented method according to claim 3, wherein the device identification dataset comprises:

an institution identifier, wherein the institution identifier identifies an institution hosting the device, and the institution identifier is determined based on credentials of an active user.

18. The computer-implemented method according to claim 3, wherein the certificate creation request includes a further pre-shared secret;

the method further includes performing, in response to receiving the certificate creation request, a check whether the further pre-shared secret of the certificate creation request matches the pre-shared secret of the key creation dataset; and the sending of the certificate creation request is executed only in case of the further pre-shared secret of the certificate creation request matching the pre-shared secret of the key creation dataset.

19. The computer-implemented method according to claim 18, wherein the certificate creation request includes the certificate identifier; and the performing of the check further includes checking that the further pre-shared secret of the certificate creation request is related to the certificate identifier.

20. The computer-implemented method according to claim 18, wherein the sending the key creation dataset to the device comprises:

automatically transmitting the key creation dataset to the device via a secure communication channel, or storing the key creation dataset on a portable storage medium and transmitting the key creation dataset to the device via the portable storage medium.

21. A non-transitory computer program product storing instructions which, when executed by a computer, cause the computer to carry out the computer-implemented method of claim 12.

22. A non-transitory computer-readable storage medium storing instructions which, when executed by a computer, cause the computer to carry out the computer-implemented method of claim 12.

* * * * *